United States Patent [19]

Fujita et al.

[11] Patent Number: 4,493,885
[45] Date of Patent: Jan. 15, 1985

[54] PHOTOGRAPHIC MATERIAL WITH METAL COMPLEXED DYES

[75] Inventors: Shinsaku Fujita; Yukio Maekawa; Shigetoshi Ono, all of Kanagawa, Japan

[73] Assignee: Fuji Photo Film Co., Ltd., Kanagawa, Japan

[21] Appl. No.: 491,788

[22] Filed: May 10, 1983

Related U.S. Application Data

[63] Continuation of Ser. No. 285,245, Jul. 20, 1982, abandoned, which is a continuation of Ser. No. 111,067, Jan. 10, 1980, abandoned, which is a continuation-in-part of Ser. No. 962,729, Nov. 21, 1978, abandoned, which is a continuation of Ser. No. 774,173, Mar. 3, 1977, abandoned.

[30] Foreign Application Priority Data

Mar. 3, 1976 [JP] Japan ................................. 51-22779
Mar. 2, 1977 [GB] United Kingdom ................. 8879/77

[51] Int. Cl.$^3$ .......................... G03C 5/54; G03C 1/40
[52] U.S. Cl. .................................. 430/223; 430/222; 430/226; 430/562
[58] Field of Search ............... 430/222, 223, 225, 226, 430/562

[56] References Cited

U.S. PATENT DOCUMENTS

| B 351,673 | 1/1975 | Fleckenstein et al. | 430/223 |
|---|---|---|---|
| 3,227,550 | 1/1966 | Whitmore et al. | 430/223 |
| 3,453,107 | 7/1969 | Idelson | 430/225 |
| 3,551,406 | 12/1970 | Idelson | 430/224 |
| 3,563,739 | 2/1971 | Idelson | 430/225 |
| 3,954,476 | 5/1976 | Krutak et al. | 430/223 |
| 4,053,312 | 10/1977 | Fleckenstein | 430/223 |
| 4,055,428 | 10/1977 | Koyama et al. | 430/223 |

OTHER PUBLICATIONS

"Photographic Systems", Fleckenstein, *Research Disclosure*, No. 13024, 2/1975, pp. 37–42.
"A Fundementally . . . Instant Photography", Hanson, *Photo Sci. & Engrg.*, vol. 20, No. 4, Jul.–Aug. 1976, p. 155.
"Folografisches . . . ", *Research Disclosure*, No. 15654, 4/1977, pp. 33–39.

*Primary Examiner*—Richard L. Schilling
*Attorney, Agent, or Firm*—Sughrue, Mion, Zinn, Macpeak and Seas

[57] ABSTRACT

A color photographic element for the diffusion transfer process comprising a support having thereon at least one photosensitive silver halide emulsion layer, the silver halide emulsion layer having associated therewith a dye releasing redox compound or a dye releasing coupler and the dye releasing redox compound or the dye releasing coupler releasing a diffusible metal complex having coordinated therewith a dye or a dye precursor and a cyclic or straight or branched chain multidenate ligand by reaction with the oxidation product of a developing agent.

10 Claims, No Drawings

PHOTOGRAPHIC MATERIAL WITH METAL COMPLEXED DYES

CROSS REFERENCE TO RELATED APPLICATIONS

This application is a continuation, of application Ser. No. 285,245, filed July 20, 1982 abandoned, which is a continuation of U.S. Ser. No. 111,067 filed Jan. 10, 1980, now abandoned, which in turn is a continuation-in-part application of U.S. Ser. No. 962,729 filed Nov. 21, 1978, now abandoned, which in turn is a continuation application of U.S. Ser. No. 774,173 filed Mar. 3, 1977 (now abandoned), both in the names of the present inventors and both having the same title.

BACKGROUND OF THE INVENTION

1. Field of the Invention

This invention relates generally to photographic elements and, more particularly, to color diffusion transfer photographic materials.

2. Description of the Prior Art

A color diffusion transfer process using dye developers is described in U.S. Pat. No. 2,983,606. In the color photographic system, a color photographic element is, after imagewise exposure, developed by applying a liquid developing composition onto the surface of the photographic emulsion layer, whereby dye developers are oxidized and immobilized in proportion to the amount of developed silver and, on the other hand, unoxidized dye developers diffuse into the image receiving layer of the photographic element to provide transferred dye images. However, in such a color photographic system, frequently the immobilization of the oxidized dye developers is imperfect and the transfer of dye developers occurs to some extent in the areas in which the dye developers must be immobilized. This results in reducing color separation. Moreover, since the developer moieties of the dye developers transferred into the image receiving layer tend to be oxidized by air and the like, if a stabilization treatment is not employed, frequently the transferred dye images deteriorate and stains form. Therefore, it is desired to transfer dye moieties only in the color diffusion transfer system.

U.S. Pat. Nos. 3,931,144, 3,928,312 and 3,932,380 describe color diffusion transfer processes using dye releasing redox compounds, i.e., nondiffusible compounds in which diffusible dye moieties only are released therefrom by development. Also, U.S. Pat. Nos. 3,227,550 and 3,644,498 and British Pat. No. 1,330,524, describe color diffusion transfer processes using dye releasing couplers, i.e., nondiffusible couplers in which diffusible dye moieties only are released therefrom by development. A "dye releasing redox compound" and a "dye releasing coupler" are essentially different from a "dye developer" because the former type compound or coupler releases the dye moiety only and also differ in reaction mechanism. In these patents and patent applications as indicated above, azo dye moieties are employed as the diffusible magenta dye moieties to be released from the dye releasing redox compounds or the dye releasing couplers. However, such azo dyes have the disadvantage that they fade, after being transferred, due to the action of light or heat, in particular, in a wet condition. Furthermore, these monoazo dyes have also the disadvantage that the hues thereof vary with changes of pH.

Therefore, in the two color diffusion transfer systems described above, it is desired to develop new nondiffusible compounds having dye moieties which have improved fastness to light and heat, whose hues do not vary with changes of pH and moreover which have improved mordantability. In addition, these known azo dyes in many cases exhibit the property of undesired "after-diffusion" from a mordanting layer.

SUMMARY OF THE INVENTION

A first object of this invention is, therefore, to proride nondiffusible compounds which release diffusible dye moieties only.

A second object of this invention is to provide nondiffusible compounds capable of releasing diffusible dye moieties which have improved mordantability and fastness to light or heat and whose hues are not changed by variation in pH.

A third object of this invention is to provide color diffusion transfer photographic elements using the above-described nondiffusible compounds.

It has now been discovered that the above-described objects are attained by a diffusion transfer photographic element comprising a support having thereon at least one silver halide photosensitive emulsion layer having associated therewith a redox compound or a coupler capable of releasing a diffusible metal complex having coordinated therewith a dye or a dye precursor (hereinafter, such a precursor is referred to as a "dye" and is, along with a dye per se, included within the scope of such term) by reaction with the oxidation product of a color developing agent, the metal complex being coordinated with a metal, a dye and a cyclic or straight- or branched-chain multidentate ligand, (hereinafter, the metal complex is referred to by the term "metal chelate dye" for simplicity).

DETAILED DESCRIPTION OF THE INVENTION

The dye per se in the metal chelate dye used in this invention may be a yellow, magenta, or cyan dye or may be a material which forms a yellow magenta, or cyan dye group by coordination with a metal.

Examples of multidentate ligands which can be used in this invention are, for example, bidentate ligands each having therein the grouping

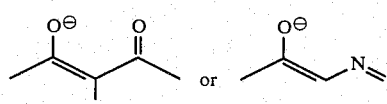

The above described group may have the structure

as well as the keto type structure

Also, the term "redox compound" as used herein in the description of this invention is a compound which is oxidized by an oxidation product such as, for example, the oxidation product of a color developing agent and is decomposed (e.g., is hydrolyzed) subsequently to the oxidation.

Dye releasing compounds (redox compounds and couplers) releasing the metal chelate dyes used in this invention may be represented by the following general formula (I)

A-(Link)-B  (I)

wherein A represents a coupler moiety or a redox compound moiety; (LINK) represents a divalent linking group; and B represents a metal chelate dye moiety. (LINK) is preferably represented by $(K)_k$-$(L)_l$-$(M)_m$, wherein K represents a divalent aliphatic group (for example, an alkylene group having 1 to 8 carbon atoms) or a divalent aromatic group (for example, an arylene group (such as a phenylene type group (e.g., a phenylene group or a substituted phenylene group having 6 to 15 carbon atoms, a naphthylene type group, preferably a phenylene type group); L represents a divalent group having therein at least one arylene moiety, a divalent group having therein at least one aliphatic moiety, or a divalent aliphatic group; M represents an oxygen atom, a carbonyl group, a carboxyamido group, a carbamoyl group, a sulfonamido group, a sulfamoyl group, or a sulfonyl group; and k, l, and m, which may be the same or different, each represents 0 or 1.

More specifically, suitable examples of divalent aliphatic groups represented by K are a straight chain alkylene group represented by $-(CH_2)_p-$ (wherein p is an integer of from 1 to 8) and a branched chain alkylene group such as $-CH_2-C(CH_3)_2-CH_2-$, $-CH_2-CH(CH_3)-CH_2-$, $-CH_2-CH(CH_3)-$, and .

Examples of suitable phenylene groups represented by K are o-, m-, and p-phenylene groups and examples of suitable substituted phenylene groups represented by K are o-, m-, and p-phenylene groups substituted with one or more of a halogen atom (e.g., a chlorine atom, a bromine atom, etc.), an alkoxy group (e.g., having up to about 5 carbon atoms such as a methoxy group, an ethoxy group, a butoxy group, etc.), a cyano group, a nitro group, an alkyl group (e.g., having up to about 5 carbon atoms such as a methyl group, an ethyl group, etc.) a carboxy group, a sulfo group, an amino group, etc.

Examples of suitable divalent groups having at least one arylene group therein represented by L are o-, m-, and p-phenylene groups, $-O-(CH_2)_{p'}C_6H_4-$, $-CO-(CH_2)_{p'}C_6H_4-$, $-CH-NH-(CH_2)_{p'}C_6H_4-$, $-NH-CO-(CH_2)_{p'}C_6H_4-$, $-SO_2-NH-(CH_2)_{p'}C_6H_4-$, $-NH-SO_2-(CH_2)_{p'}C_6H_4-$ etc., (wherein p' represents an integer of 0 to 8). Further, the bonding for the $C_6H_4$ group shown above can be ortho, meta or para and the phenylene group and $-C_6H_4-$ moiety indicated above may contain one or more substituents as described in regard to K.

Examples of suitable divalent aliphatic groups represented by L are straight chain and branched chain alkylene groups as described for K and examples of suitable divalent groups having at least one aliphatic moiety therein represented by L are an —O-alkylene group, a —CO-alkylene group, a —CONH-alkylene-NHCO-alkylene group, a —SO$_2$NH-alkylylene group, a —NH-SO$_2$-alkylene group, etc. In this case, the alkylene moiety may be a straight chain alkylene moiety or a branched chain alkylene moiety as described above for K.

Of the groups represented by M, the carboxamido group, the carbamoyl group, the sulfonamido group and the sulfamoyl group may be substituted with a lower alkyl group having 1 to 4 carbon atoms, such as a methyl group, an ethyl group, etc.

Also, preferred examples of the central metal ion of the metal chelate dye moiety represented by B are transition metal ions such as chromium ion, cobalt ion, copper ion, nickel ion, iron ion, zinc ion, manganese ion, etc., preferably a transition metal ion capable of forming a complex with a coordination number of 6, such as $Cr^{+3}$ and $Co^{+3}$.

When, all of k, l, and m in general formula (I) are 0, A and B are, as a matter of course, directly linked together and such a compound as in this case, i.e., a compound represented by A-B is also included in the scope of the compounds of general formula (I) used in this invention.

The compound represented by general formula (I) described above is initially a nondiffusible compound and at least a part of the compound is converted into a diffusible or mobile material by oxidation under alkaline conditions, e.g., a pH of 7 or higher. This capability is due to the chemical properties of the coupler moiety or the redox compound moiety represented by A in general formula (I). That is, the moiety represented by A is a portion of the compound having the function of rendering the compound nondiffusible initially and releasing a diffusible material by oxidation under alkaline conditions. The term "oxidation under alkaline conditions as used herein" means all oxidation reactions based on the oxidative action of silver halide including black and white development, color development, oxidative coupling, cross oxidation (redox reaction), etc.

Furthermore, in preferred compounds of general formula (I), B in the formula is represented by the formula (LIG)-Me-(DYE). That is, the preferred compounds of general formula (I) are further represented by the following general formula (IIa) or (IIb);

A-(LINK)-(LIG)-Me-(DYE)  (IIa)

A-(LINK)-(DYE)-Me-(LIG)  (IIb)

wherein A and LINK have the same significance as in general formula (I); (LIG) represents the above-described multidentate ligand capable of being coordinated with a metal ion; Me represents a transition metal ion; and (DYE) represents a multidentate dye moiety, preferably a tridentate or tetradentate dye moiety.

Suitable examples of Me are chromium, cobalt, copper, nickel, zinc, iron, manganese, etc., ions.

Preferred examples of (DYE) are o,o'-dihydroxyazo dye residues and o,o'-dihydroxyazomethine dye residues. These o,o'-dihydroxyazo dyes and o,o'-dihydroxyazomethine dyes can be represented by the following formulae (IIIa) and (IIIb) respectively;

(IIIa)

(IIIb)

wherein X represents an arylene group (such as a phenylene group, a naphthylene group, etc.), and Y represents an arylene group (such as a phenylene group, a naphthylene group, etc.), or a 5-membered or 6-membered nitrogen-containing heterocyclic ring (e.g., a divalent heterocyclic group such as an unsaturated heterocyclic group containing 2 nitrogen atoms, e.g., pyrazole, 2,4-dioxypyrimidine, etc.,). In this case, the hydroxyl group substituted at X or Y is in the ortho-position to the azo linkage and further the arylene group and the divalent heterocyclic group each includes the substituted derivatives thereof, e.g., a substituted phenylene group, a substituted naphthylene group, and substituted pyrazole (the substituents are the same as those described above in connection with the phenylene group).

Specific examples of these o,o'-dihydroxyazo dyes are shown below:

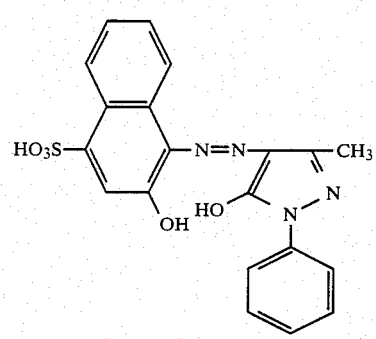

D-1

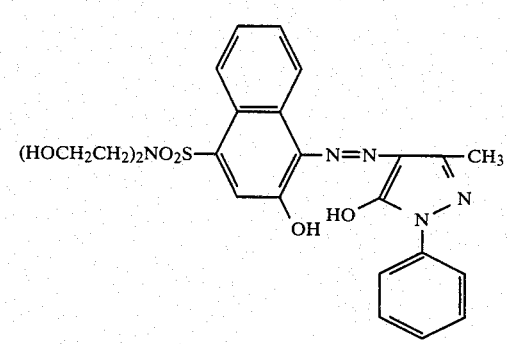

D-2

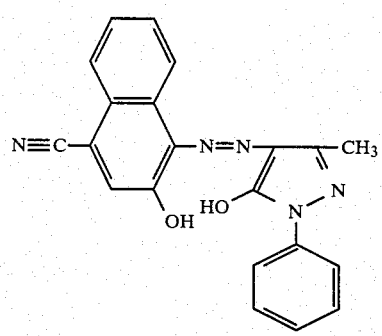

D-3

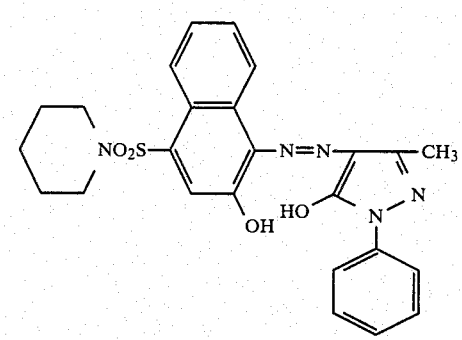

D-4

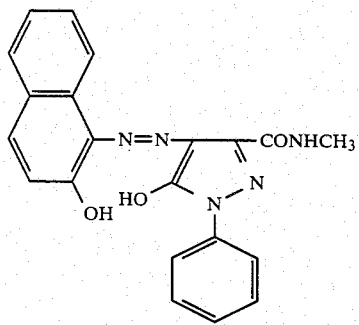

D-5

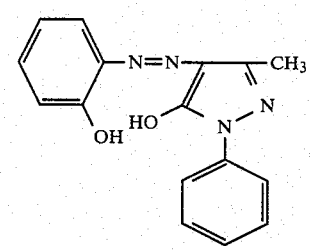

D-6

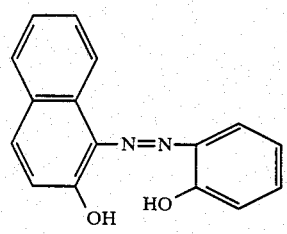

D-7

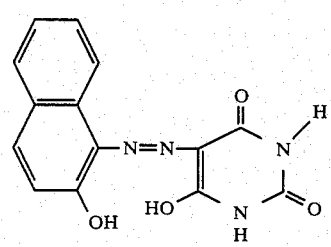

D-8

-continued
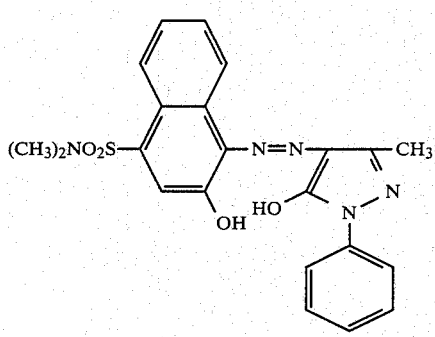 D-9
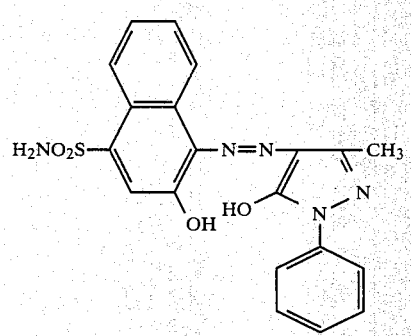 D-10
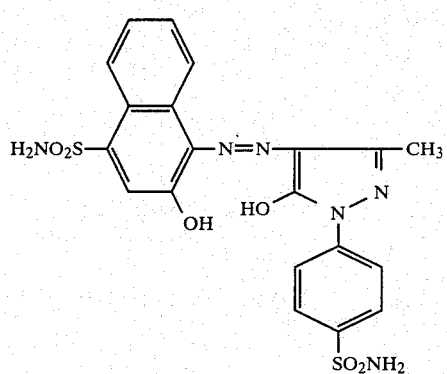 D-11
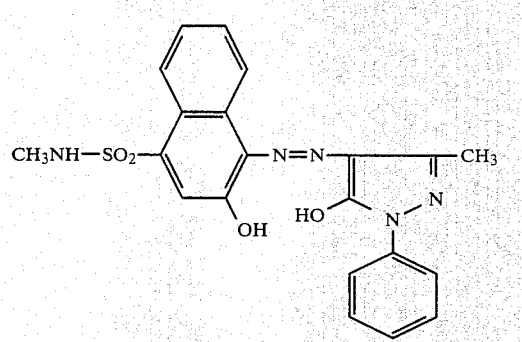 D-12
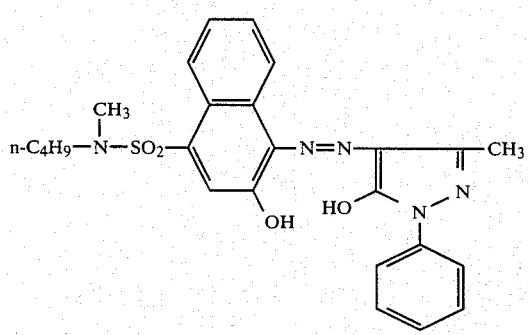 D-13
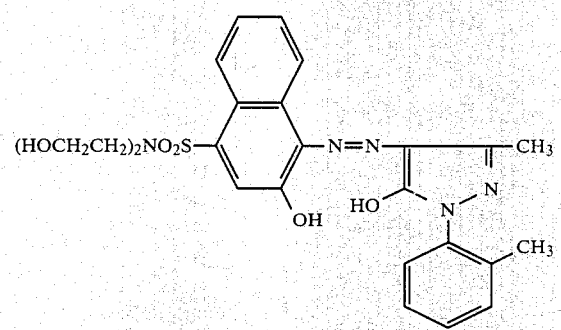 D-14
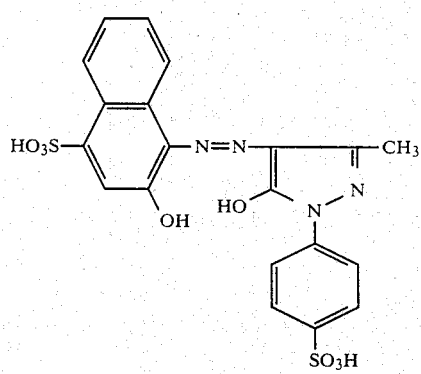 D-15
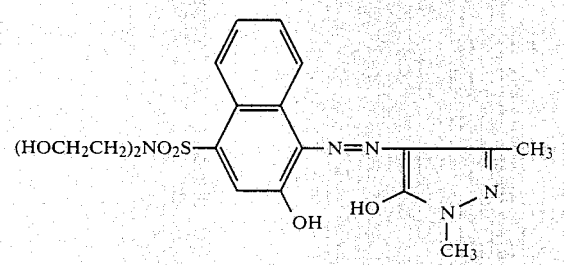 D-16

-continued

D-17
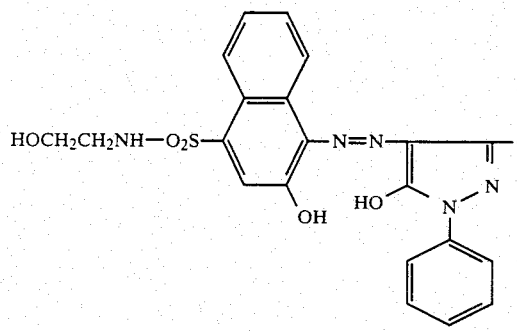

D-18
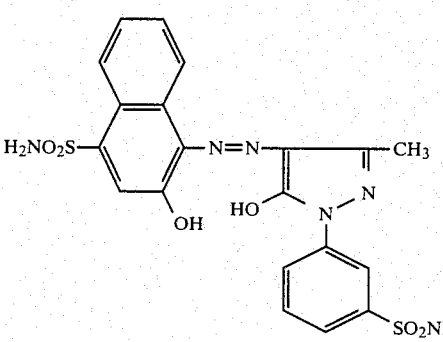

D-19
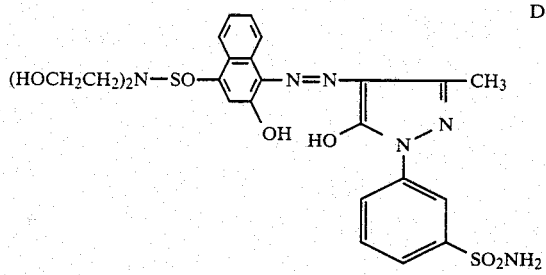

D-20
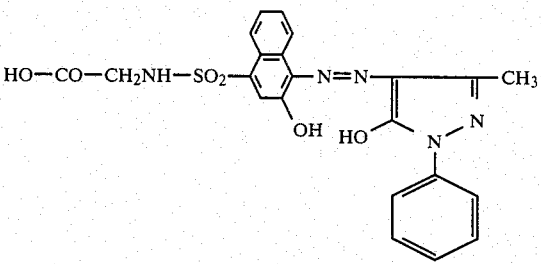

D-21
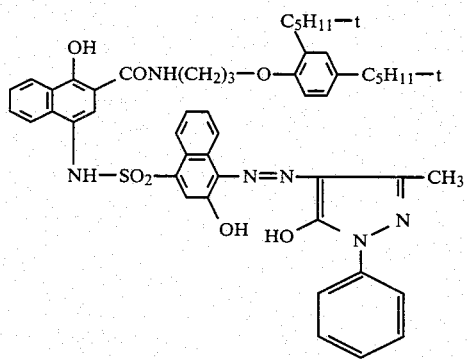

D-22
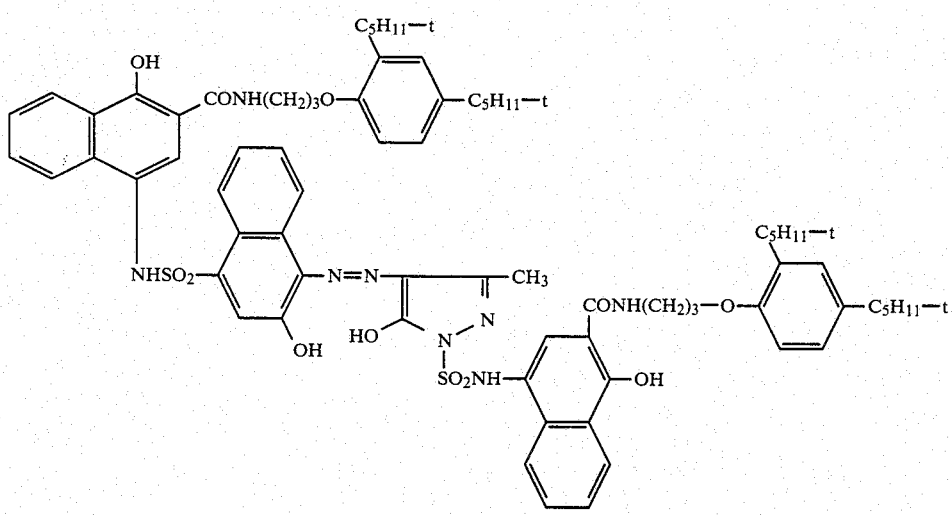

Moreover, additional examples of effective o,o'-dihydroxyazo dyes which can be used in this invention are described in, for example, H. Bauman & H. R. Hensel; "Neue Metallkomplexfarbstoffe, Struktur und färberishe Eigenshaften", (*Die Fortschritte der Chemischen Forshung*), Vol. 7, No. 4, 679–707(1969) published by Springer-Verlag, Heidelberg; G. Schetty; *J. Soc. Dyers and Colourists;* Vol. 71, 705–724(1955); K. Venkataraman, edit.; *Synthetic Dyes,* Vol. 1, Chapter 14, published by Academic Press(1952); and R. Price; *The Chemistry of Synthetic Dyes* (edit. by K. Venkataraman), Vol. 3, Chapter 7, published by Academic Press(1970), and German Pat. No. 954,188 and British Pat. Nos. 692,073 and 796,759.

Specific examples of the o,o'-dihydroxyazomethine dyes represented by formula (IIIb) are shown below:

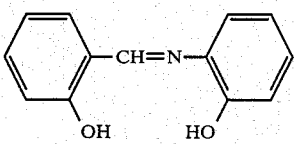 D-23
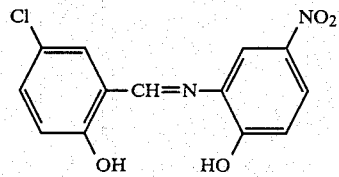 D-24
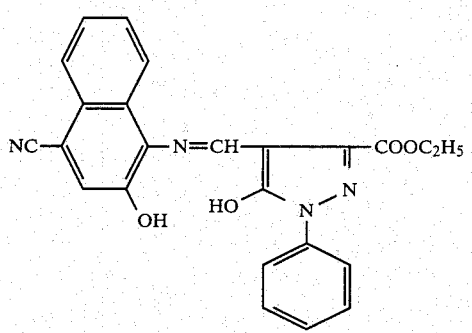 D-25
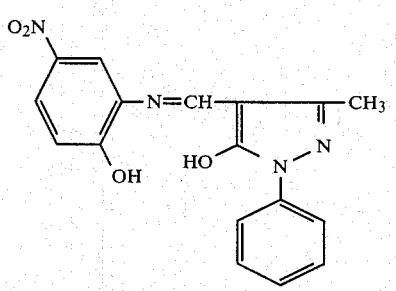 D-26
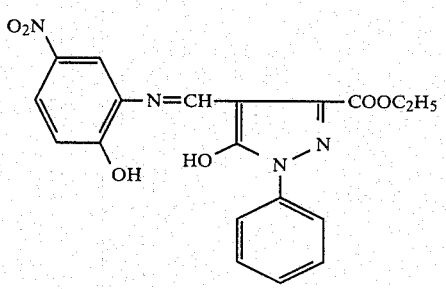 D-27
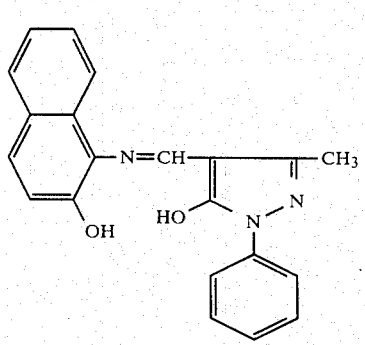 D-28
-continued
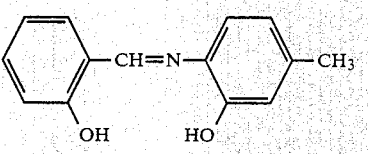 D-29
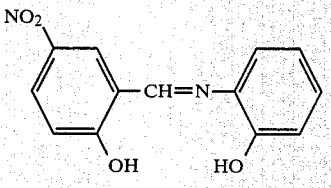 D-30
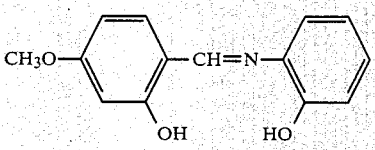 D-31
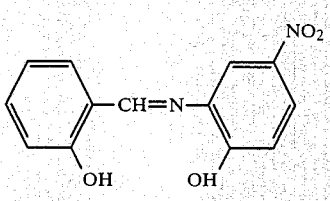 D-32
D-33
D-34
 D-35
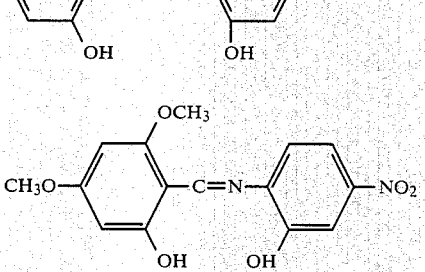 D-36
D-37

-continued

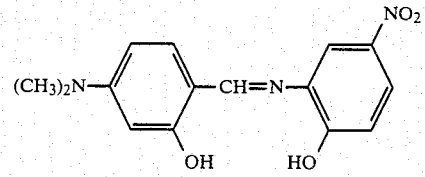 D-38

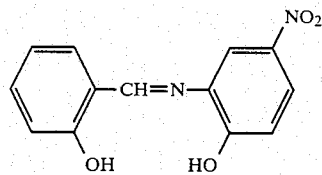 D-39

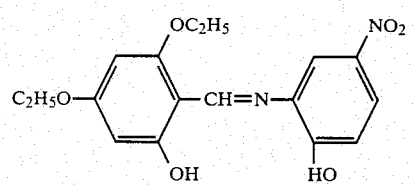 D-40

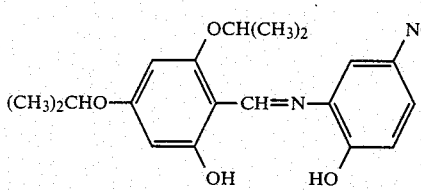 D-41

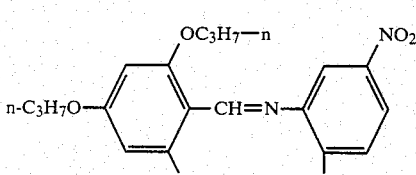 D-42

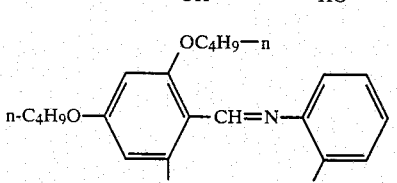 D-43

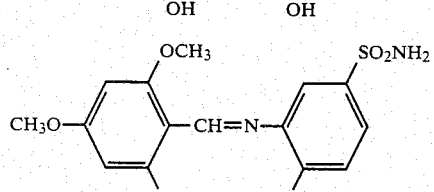 D-44

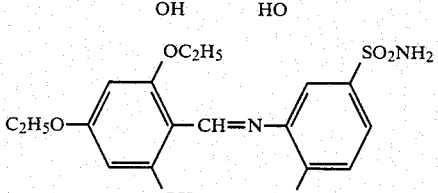 D-45

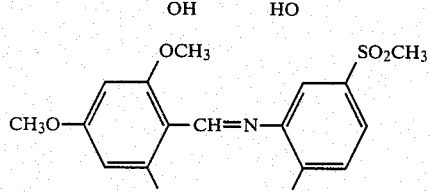 D-46

Furthermore, other examples of o,o'-dihydroxyazomethine dyes which can be effectively used in this invention are described in Belgian Pat. No. 617,164; U.S. Pat. No. 2,735,344; German Pat. No. 964,977; French Pat. No. 1,217,247; German Patent Application (OLS) Nos. 2,025,111 and 2,027,279; German Pat. Nos. 1,054,195 and 1,186,572; British Pat. No. 877,461, etc. Still further, the complex-forming dyes as described in German Pat. No. 846,142 can be also used as the dye moieties in this invention.

(LIG) is derived from a compound having therein a

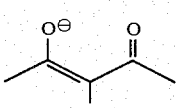

grouping or a

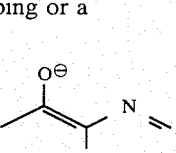

grouping. Examples of compounds providing a

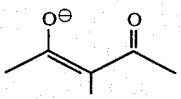

grouping or a

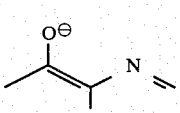

grouping include a β-dicarbonyl compound, a phenol-o-carbonyl compound, a naphthol-o-carbonyl compound, and tautomers of these compounds and the 8-hydroxyquinoline derivatives of these compounds.

These compounds can be represented by following general formulae (IVa), (IVb), and (IVc) (including the ketoenol tautomers thereof);

 (IVa)

 (IVb)

 (IVc)

wherein R and $R^1$, which may be the same or different, represents a hydrogen atom, a lower alkyl group having up to about 8 carbon atoms, a lower alkoxyalkyl group having up to about 10 carbon atoms, an alkylamino group having up to, for instance, about 8 carbon atoms, an aryl group having up to, for instance, about 15 carbon atoms, or an arylamino group having up to, for instance, about 15 carbon atoms; each of these groups may be substituted by one or more substituents as described above in regard to K; $R^2$ represents a hydrogen atom, an alkyl group having up to, for instance, about 8 carbon atoms, or an aryl group having up to, for instance, about 15 carbon atoms; Z represents the atoms necessary to complete an aliphatic, aromatic, or heterocyclic ring, preferably a 5- or 6-membered aliphatic ring or a benzene ring which may be substituted; Z' represents an alkyl group having up to, for instance, about 8 carbon atoms, an aryl group having up to, for instance, about 15 carbon atoms, a hydroxy group, or a hydrogen atom; Z' may be bonded to Z at the ortho position to form a 5- or 6-membered ring; and $R^3$ represents an alkyl group having up to, for instance, about 8 carbon atoms.

When R, $R^1$, $R^2$, $R^3$, or Z' in the above-described formulae is an alkyl group, it is preferred that the alkyl group be selected from alkyl groups having 1 to 4 carbon atoms, such as a methyl group, an ethyl group, a propyl group, an isopropyl group, a butyl group, a sec-butyl group, a t-butyl group, etc.

The lower alkoxyalkyl group represented by R or $R^1$ has preferably 1 to 6 carbon atom and suitable examples are, for example, a methoxymethyl group, a methoxyethyl group, an ethoxyethyl group, an ethoxymethyl group, a propoxymethyl group, a butoxymethyl group, etc. Also, the alkylamino group represented by R or $R^1$ has preferably 1 to 4 carbon atoms and examples include a methylamino group, an ethylamino group, a propylamino group, an isopropylamino group, a butylamino group, a sec-butylamino group, a t-butylamino group, etc. Also, examples of the aryl group represented by R, $R^1$, $R^2$, or Z' are selected from a phenyl group and substituted phenyl groups (e.g., phenyl groups substituted with one or more of a halogen such as chlorine, etc., an alkyl group having 1 to 4 carbon atoms, or an alkoxy group having 1 to 4 carbon atoms).

Furthermore, particularly preferred compounds of those represented by formula (IVa), (IVb), or (IVc) above are represented by the following formula (Va) or (Vb);

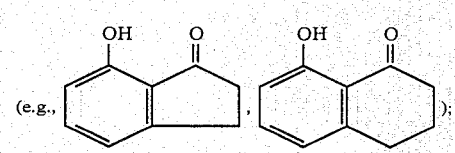

wherein $R^4$ represents a lower alkyl group having up to about 8 carbon atoms, preferably 1 to 4 carbon atoms (such as a methyl group, an ethyl group, a propyl group, an isopropyl group, a butyl group, a sec-butyl group, a t-butyl group, etc.); a lower alkoxy group having up to about 8 carbon atoms, preferably 1 to 4 carbon atoms (such as a methoxy group, an ethoxy group, a propoxy group, an isopropoxy group, a butoxy group, a sec-butoxy group, a t-butoxy group, etc.); a halogen atom (such as, preferably a chlorine atom); or a hydrogen atom; Z' has the same significance as in formula (IVb); Z' may be bonded to the ortho-position of the benzene ring to form a 5-membered ring or a 6-membered ring which constitutes a 1-indanone or α-tetralone derivative (e.g., 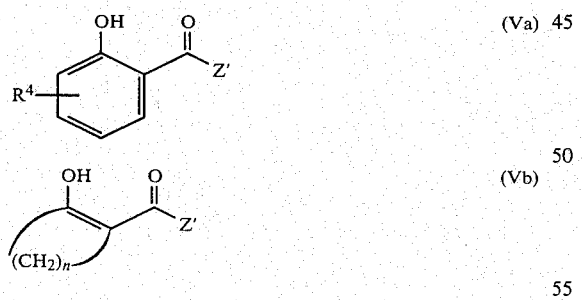 );

and n is 3 or 4. It is preferred to employ compounds of formula (Va) in terms of their ready availability.

Specific examples of ligands represented by formula (IVa), (IVb) or (IVc) are illustrated below:

 L-1

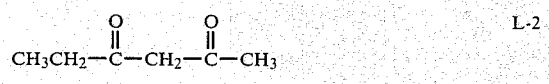 L-2

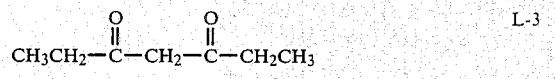 L-3

 L-4

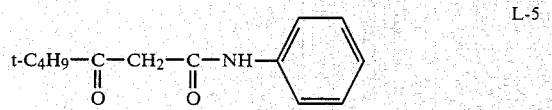 L-5

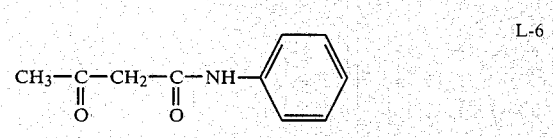 L-6

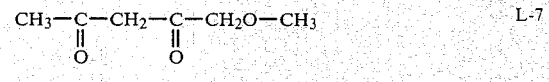 L-7

 L-8

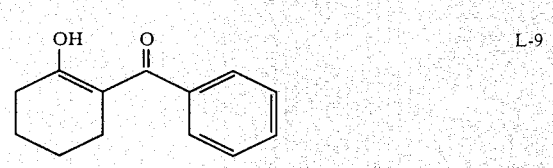 L-9

 L-10

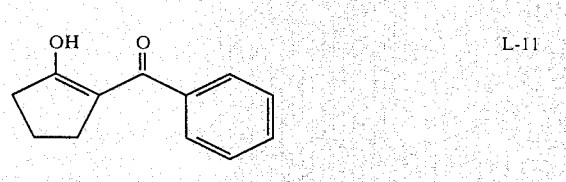 L-11

-continued

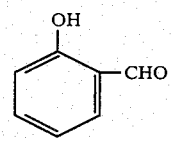

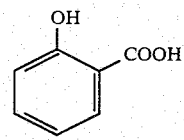

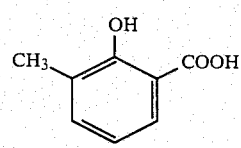

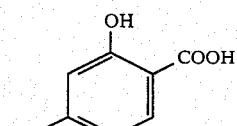

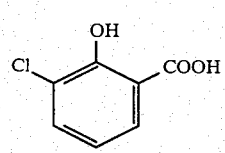

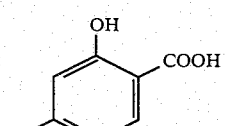

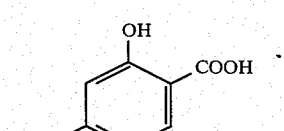

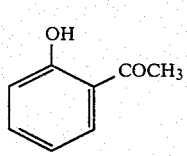

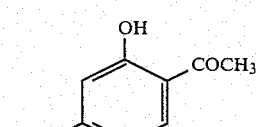

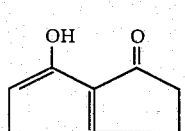

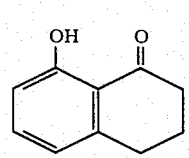

-continued

L-23
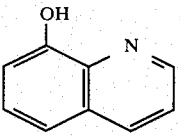

L-24
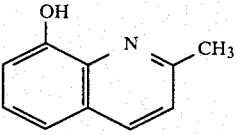

Furthermore, other compounds which can be effectively used as the ligands in this invention are described in Keihei Ueno, edit.; *Chelate Chemistry*, Vol. 6, Chapter 1, published by Nankaido, Tokyo(1975), K. B. Yatsimirskii and V. P. Vasil'ev; *Instability Constants of Complex Compounds*, published by Pergamon Press, London(1960), etc.

In general formula (IVa) or (IVb) described above, the linkage group (LINK) may, as a matter of course, be connected to one of R, $R^1$ and $R^2$ or to one of Z and Z' by a substitution of the linkage group for the hydrogen atom thereof. In the case of formula (IVc), the linkage group (LINK) may be connected to the quinoline ring at a position other than the positions in which the —OH and $R^3$ groups are substituted.

Examples of preferred compounds which can be used in this invention are dye releasing redox compounds represented by formula (VIa)

wherein (BALL) represents a photographically inert ballast group which renders the compounds nondiffusible; T represents the atoms necessary for completing a benzene nucleus or a naphthalene nucleus (including substituted benzene or substituted naphthalene nuclei, e.g., substituted with one or more substituents as described above for these type groups for K); when T represents a carbon atom or atoms necessary for completing the naphthalene nucleus, (BALL) may be connected to either of the rings of the naphthalene nucleus; and (LINK); (LIG); Me; and (DYE) have the same significance as in formula (IIa).

The —OH group in the formula (VIa) may be replaced by a group capable of forming an —OH group by hydrolysis, such as, for example, an alkyl-SO₂—O— group and an $$\text{alkyl-}\overset{\overset{\displaystyle O}{\|}}{C}\text{—O—}\text{ group.}$$

There are no particular restrictions on the properties of the ballast group (BALL—) of the above-described dye releasing compounds and any groups which can render the compounds nondiffusible can be employed as the ballast group in this invention. The term "nondiffusible" used in this invention denotes materials which do not move or diffuse in or through photographic layers containing an organic colloid such as gelatin.

Examples of typical ballast groups which can be used include long chain alkyl groups (including branched chain alkyl groups) and benzene series and naphthalene series aromatic groups, these groups being connected directly or indirectly to the redox compounds. Specific examples of typical ballast groups are described in typical examples of compounds which can be used in this invention, e.g., appearing in the specific examples of redox compound moieties given hereafter.

Useful ballast groups have at least 8 carbon atoms and examples include unsubstituted or substituted alkyl groups having 8 to 30 carbon atoms, unsubstituted or substituted alkoxy groups having 8 to 30 carbon atoms, amido groups having 8 to 30 carbon atoms, and alkylcarbonyl or arylcarbonyl groups having 8 to 30 carbon atoms. It is particularly preferred for the ballast group to be connected to a benzene nucleus or a naphthalene nucleus through a carbamoyl group (—NHCO—), a sulfamoyl group (—NHSO$_2$—), or an oxygen atom and for the ballast group to be connected, when it is connected through a nitrogen-containing group, adjacent the nitrogen atom of the group.

Particularly useful examples of the ballast groups are an alkyl-NH—CO group; an aryloxy-alkylene-NHCO— group; an alkyl-NH—SO$_2$ group; an aryloxy-alkylene-NH—CO— group; an alkyl group; alkyloxy group; an aralkyl group; an aryl-NH—CO group; an aryloxy group; and an aryloxy-alkoxy group; each of these groups having 8 to 30 carbon atoms. The alkyl and alkylene moieties in these groups may be a straight chain moiety or a branched chain moiety. The alkyl, alkylene or aryl moiety or group may have one or more substituents such as a halogen atom (e.g., chlorine bromine, etc.), an alkoxy group having up to about 20 carbon atoms, an alkyl group having up to about 20 carbon atoms, a cyano group and an amino group.

In the dye releasing compound represented by the above described formula (VIa), the moiety represented by the following formula (VIIa) is, as a matter of course, the redox compound moiety represented by A of the formula (I):

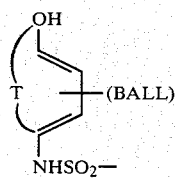

(VIIa)

Wherein T and BALL have the same segnificance as described above, Specific examples of these redox compound moieties are as follows:

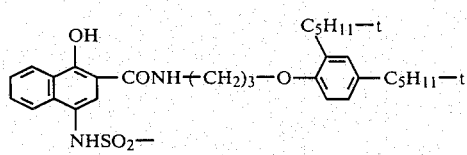

Ra-1

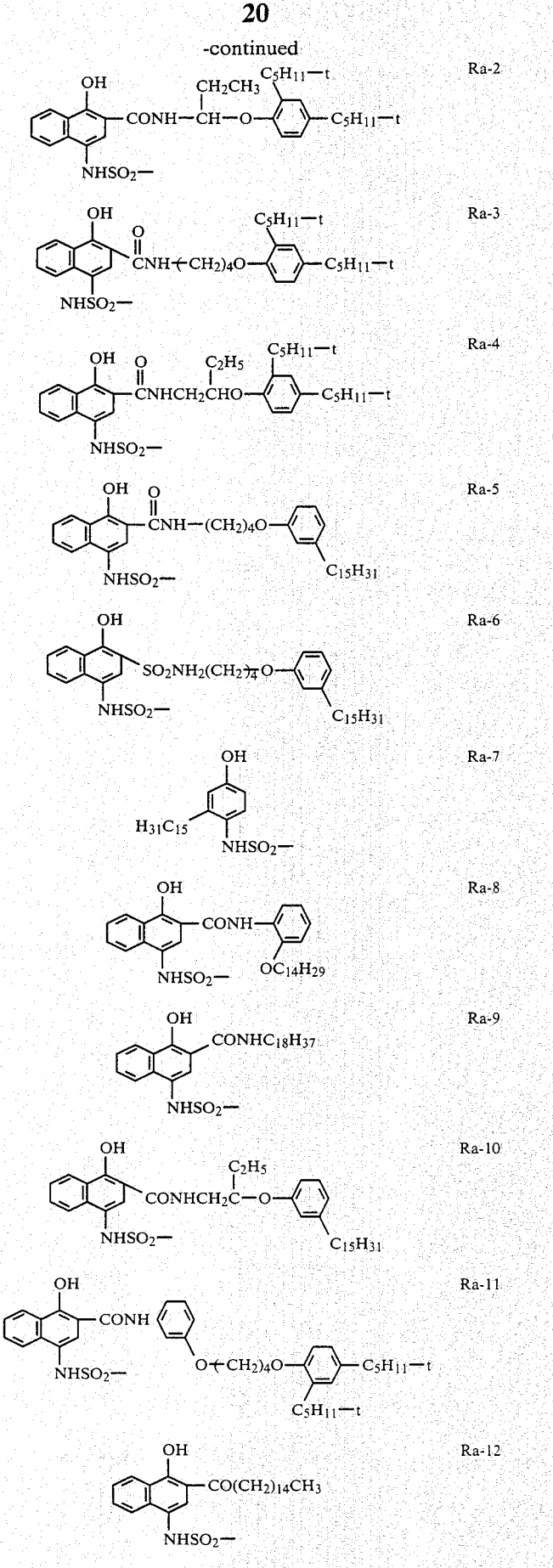

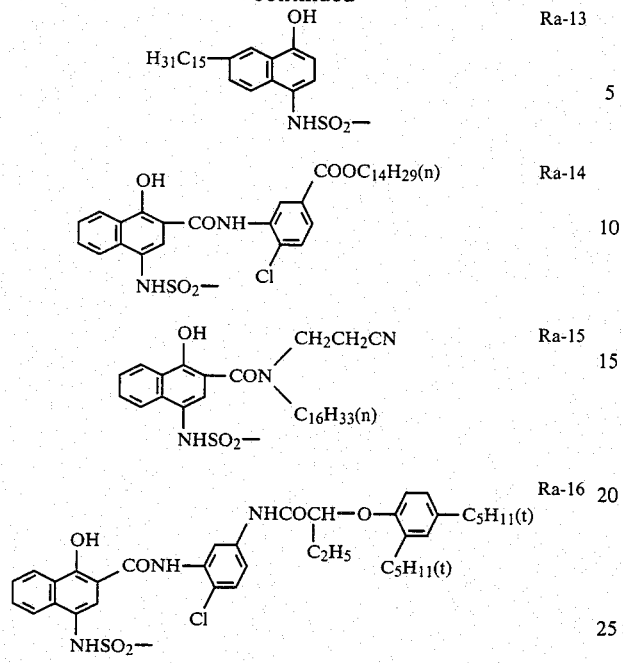

Other examples of preferred compounds which can be used in this invention are dye releasing redox compounds represented by the following formula (VIb):

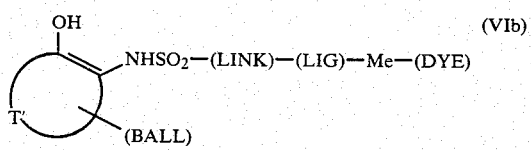

wherein T' represents the atoms necessary to complete a benzene nucleus or a naphthalene nucleus, each of which may be substituted with one or more substituents as described in regard to these types of groups for K, e.g., alkyl groups, alkoxy groups, aryloxyalkoxy groups, halogen atoms, etc., preferably an alkoxy or aryloxyalkoxy group at the para-position to the phenol nucleus and, in addition, an alkyl group or a halogen (e.g., chlorine) atom at the ortho-or meta-position thereto and (BALL), (LINK), (LIG), Me, and (DYE) have the same significance as in the formula (VIa). Furthermore, the OH group in the formula (VIb) may be replaced by a group forming a hydroxyl group by hydrolysis as described above for the formula (VIa).

It should also be clearly understood that in the dye releasing compound represented by the formula (VIb) described above, the moiety represented by the following formula (VIIb) is the redox compound moiety represented by A of the general formula (I);

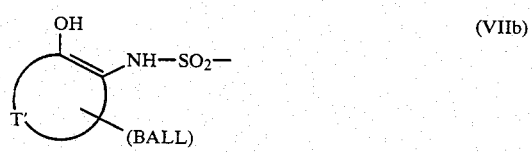

wherein T' and BALL are as described above. Specific examples of the redox compound moiety represented by the above-described general formula (VIIb) are shown below:

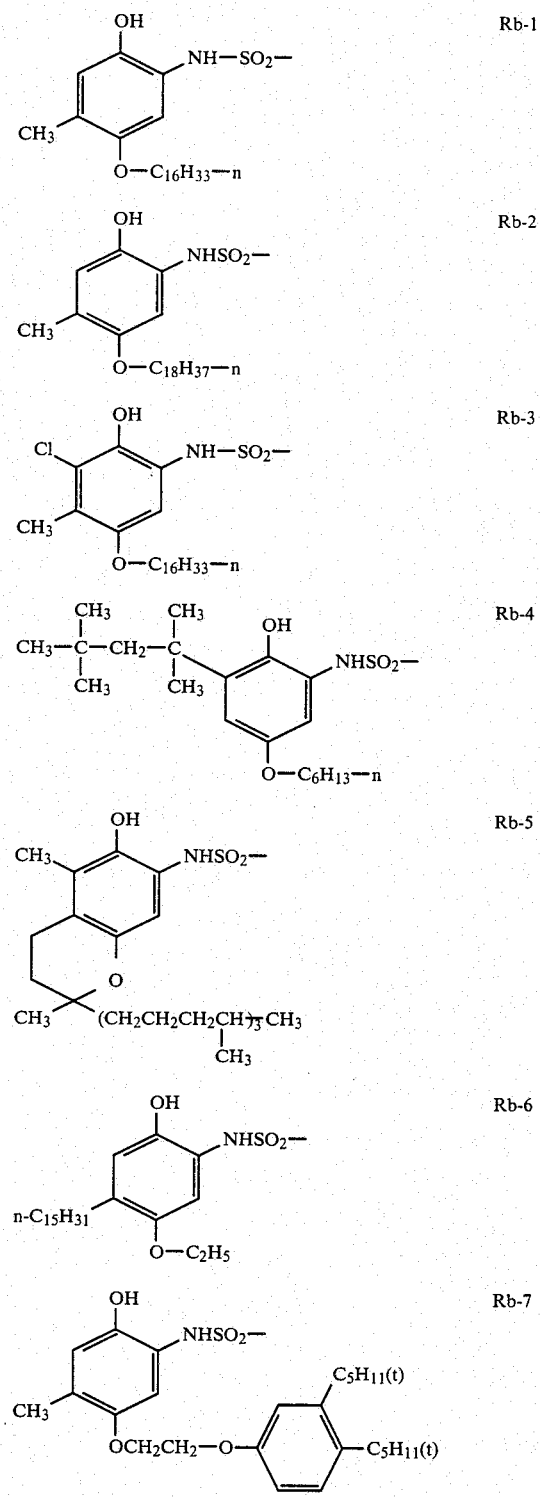

Also, the compounds and the redox compound moieties described in *Research Disclosure;* No. 13,024 (1975), U.S. Pat. No. 3,737,316, etc., U.S. published patent application No. B 351,673, etc., can be effectively used in this invention.

Each of these dye releasing redox compounds releases H₂N—SO₂-(LINK)-(LIG)-Me-(DYE) by an oxidizing action such as development under alkaline conditions, which results in the diffusion of the metal chelate dye.

Furthermore, other examples of preferred compounds which can be used in this invention are the dye releasing couplers represented by the general formula (IIa) wherein A— (a coupler moiety in this case) is represented by (BALL)-(COUP)-Q— (i.e., formula VIIc), that is, the dye releasing couplers represented by the following formula (VIc)

(BALL)-(COUP)-Q-(LINK)-(LIG)-Me-(DYE)  (VIc)

wherein (COUP) represents an open-chain keto methylene coupler residue, a phenol coupler residue, a naphthol coupler residue, or a pyrazolone coupler residue; (COUP) is connected to Q at the coupling position thereof; (BALL) represents a photographically inert ballast group which renders the coupler nondiffusible; Q represents an oxygen atom or a sulfur atom; and (LINK), (LIG), Me, and (DYE) have the same significance as in the formula (VIa). Suitable examples of such couplers from which such residues are derived are well known in the art, e.g., open chain ketomethylene couplers: U.S. Pat. Nos. 2,875,057, 3,265,506, 3,408,194, 3,551,155, 3,582,322, 3,725,072 and 3,891,445, West German Patent No. 1,547,868, West German Patent application (OLS) Nos. 2,213,461, 2,219,917, 2,261,361, 2,263,875 and 2,414,006; pyrazolone couplers: U.S. Pat. Nos. 2,600,788, 2,983,608, 3,062,653, 3,127,269, 3,311,476, 3,419,391, 3,519,429, 3,558,319, 3,582,322, 3,615,506, 3,834,908 and 3,891,445, West German Patent No. 1,810,464, West German Patent Application (OLS) Nos. 2,408,665, 2,417,945, 2,418,959 and 2,424,467, Japanese Patent Publication 6031/'65; phenol or naphthol couplers: U.S. Pat. Nos. 2,369,929, 2,434,272, 2,474,293, 2,521,908, 2,895,826, 3,034,892, 3,311,476, 3,458,315, 3,476,563, 3,583,971, 3,591,383 and 3,767,411, West German Patent Application (OLS) Nos. 2,414,830 and 2,454,329, Japanese Patent Application (OPI) 59,838/'73.

The term "coupling position" in regard to the coupler residue (COUP-) is used herein in the same manner employed generally in the photographic art and the meaning thereof is well known to one skilled in the photographic art. For example, a 5-pyrazolone coupler residue couples at the carbon atom disposed at the 4-position, a phenol series (including an α-naphthol) coupler residue couples at the carbon atom disposed at the 4-position, and an open-chain methylene coupler residue couples at the active methylene or active methine position. (For example,

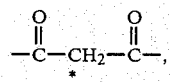

wherein (*) shows the coupling position).

The dye releasing coupler represented by the formula (VIc) releases ⊖Q-(LINK)-(LIG)-Me-(DYE) by reaction with the oxidation product of a color developing agent, which results in the diffusion of the metal chelate dye. The moiety (COUP)-(BALL) forms a nondiffusible azomethine compound by coupling with the oxidation product of a color developing agent and the azomethine compound thus formed remains in the photosensitive emulsion layer. Examples of nondiffusible coupler moieties which can be effectively used in this invention as (COUP)-(BALL) are described in, for example, British Pat. Nos. 980,507 and 1,330,524 and U.S. Pat. Nos. 3,644,498; 3,227,550; and 3,765,886.

Specific examples of the coupler moiety represented by (BALL)-(COUP)-Q— are shown below:

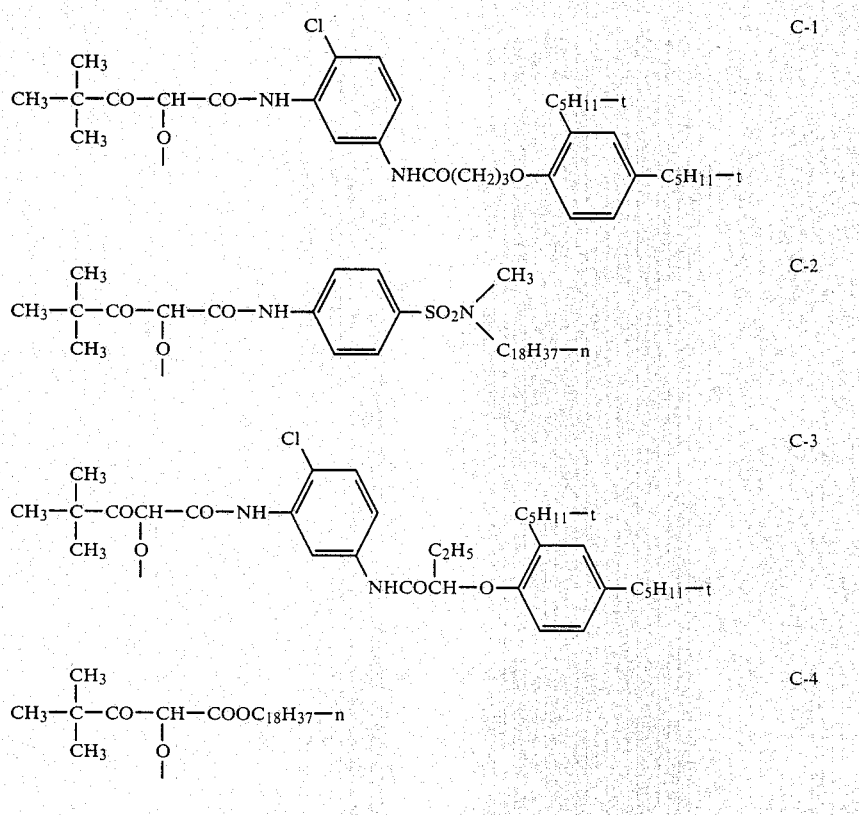

-continued
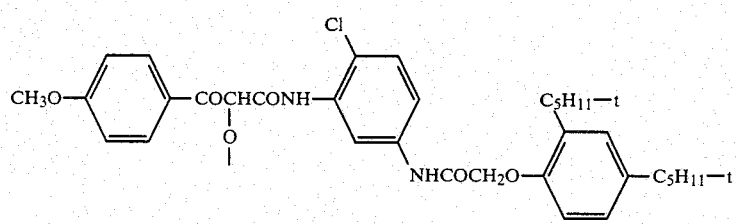
C-5
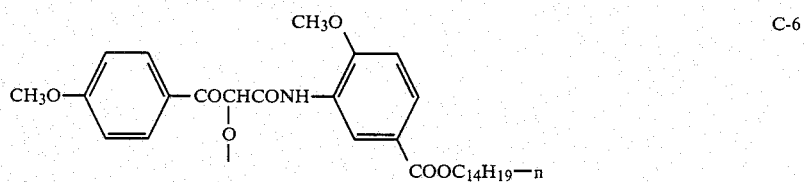
C-6
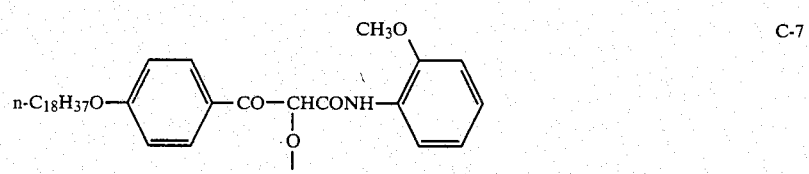
C-7
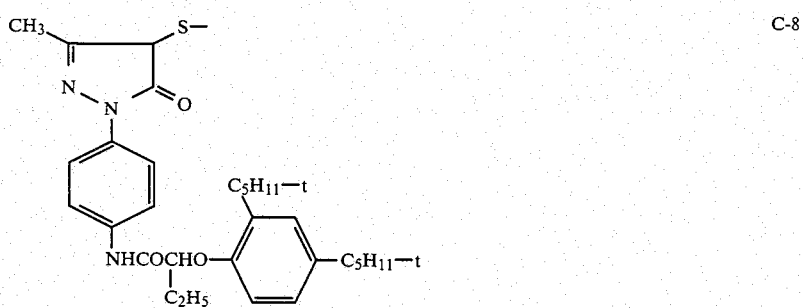
C-8
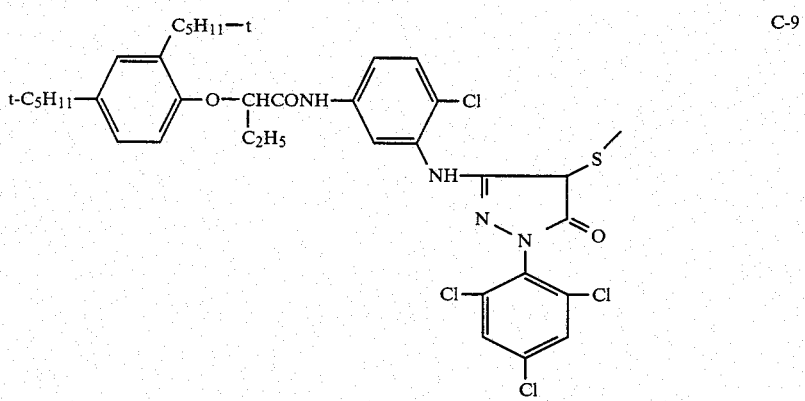
C-9
C-10        C-11
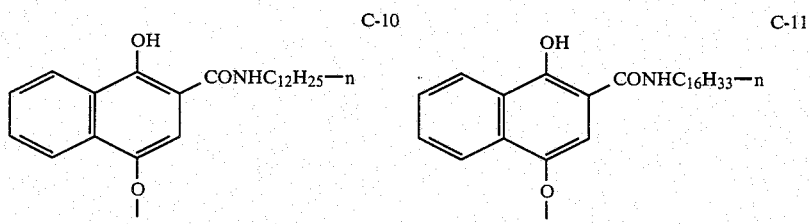

-continued

C-12
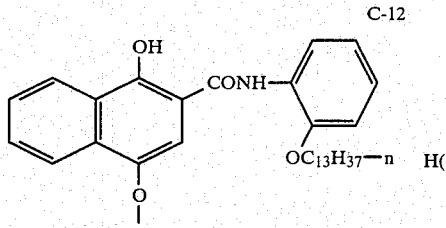

C-13
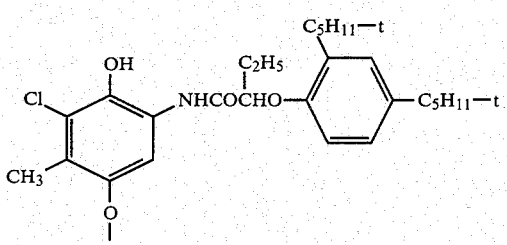

C-14
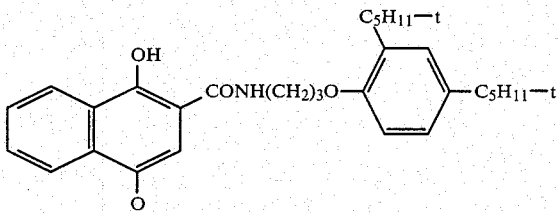

C-15
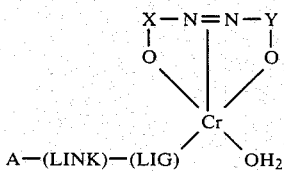

In a further preferred embodiment of this invention, a "1:1 metal complex" wherein (LIG) is coordinated with a metal ion as a bidenate ligand and, for example, an o,o'-dihydroxyazo dye moiety (DYE) is coordinated as a tridenate ligand is preferably used. The term "1:1 metal complex" as used herein describes a complex having one metal atom per one dye molecule as commonly known in the dye chemistry art. A particularly preferred metal ion is chromium ion and in this case the dye releasing compound which can be used in this invention is represented by the following formula (VIII):

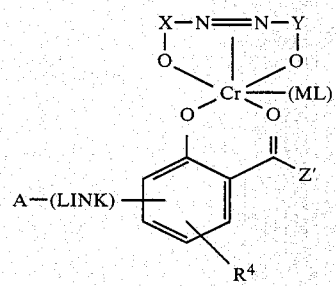 (VIII)

wherein A represents a redox compound moiety represented by the formula (VIIa) or (VIIb) or represents a coupler moiety represented by the formula (VIIc); (LINK) and (LIG) have the same significance as in the formula (IIa) or (IIb); and X and Y have the same significance as in the formula (IIIa) or (IIIb).

In the dye releasing compound represented by the formula (VIII), a ligand having an oxygen atom as the coordinating atom, such as a water molecule can be replaced by a monodentate ligand, for example, an amine having a nitrogen atom as the coordinating atom, such as pyridine, triethylamine, $NH_3$, etc.

More preferred dye releasing compounds which can be used in this invention are represented by the following formula (VIIIa):

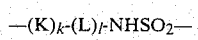

wherein A represents a redox compound moiety represented by the formula (VIIa) or (VIIb); (LINK) has the same meanings as in the formula (I); Z' has the same meanings as in the formula (IVb); $R^4$ has the same meanings as in the formula (Va); X and Y each has the same meanings as in the formula (IIIa) or (IIIb); and (ML) represents a monodentate ligand with an oxygen atom or a nitrogen atom as a coordination atom such as $H_2O$ and an amine (e.g., pyridine, triethylamine, $NH_3$, etc.).

Most preferred among the dye releasing compounds of the formula (VIIIa), are compounds wherein (LINK) is represented by the formula:

—$(K)_k$-$(L)_l$-$NHSO_2$— wherein K, k, L and l each has the same meaning as in the formula (I), K being connected with A of the formula (VIIa).

Specific examples of dye releasing redox compounds and dye releasing coupler releasing metal chelate dyes which can be used in this invention are show below:

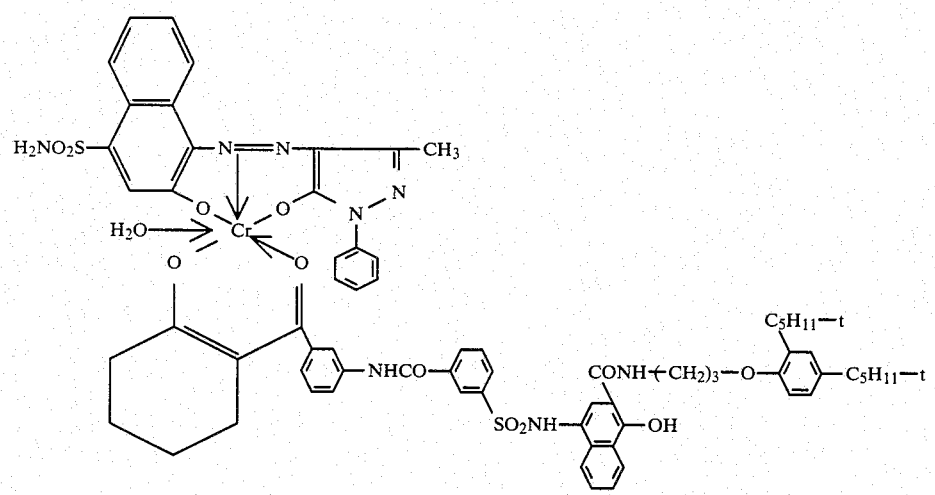
P-1
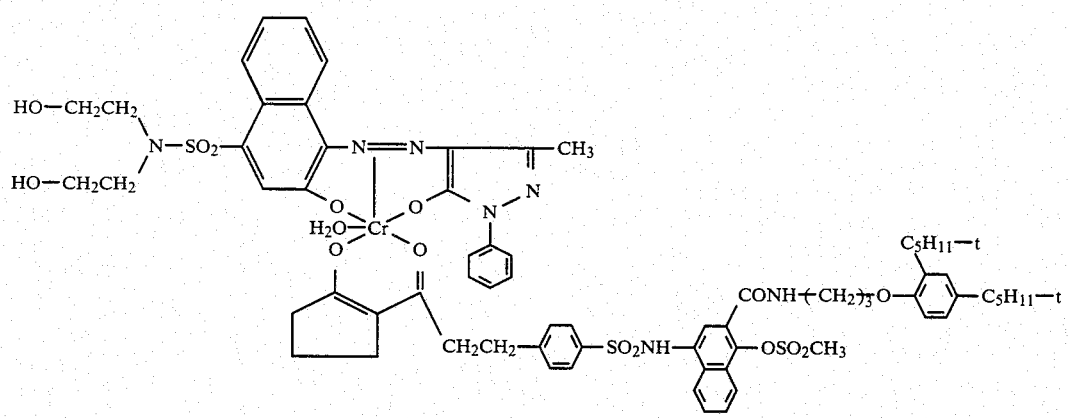
P-2
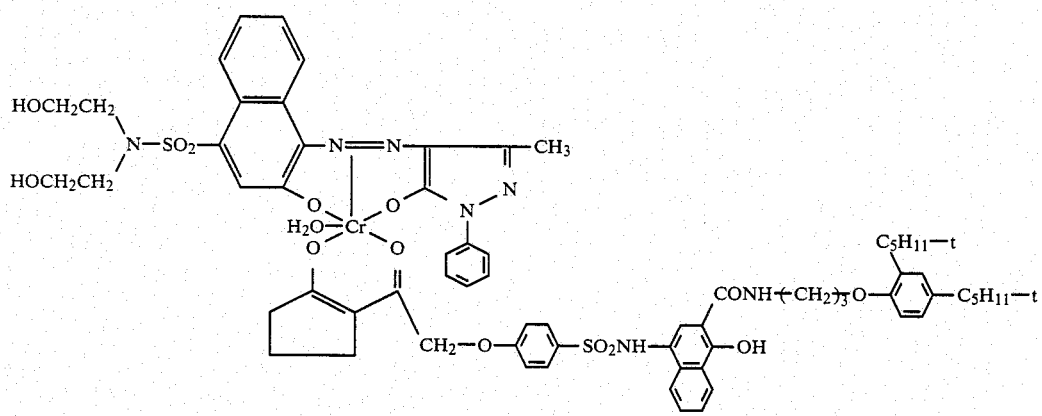
P-3

P-4
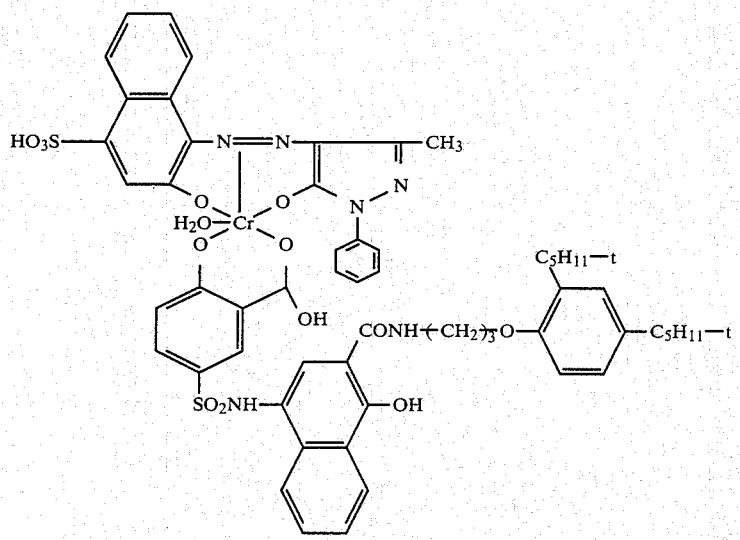
P-5
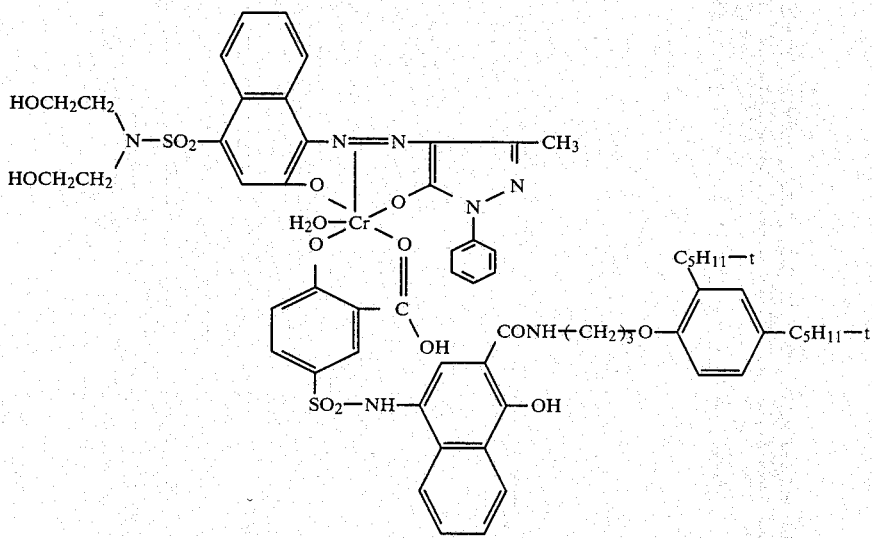
P-6
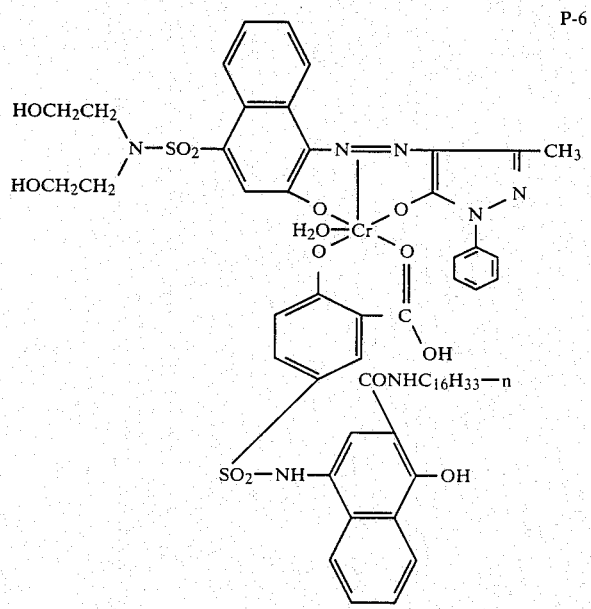
P-7
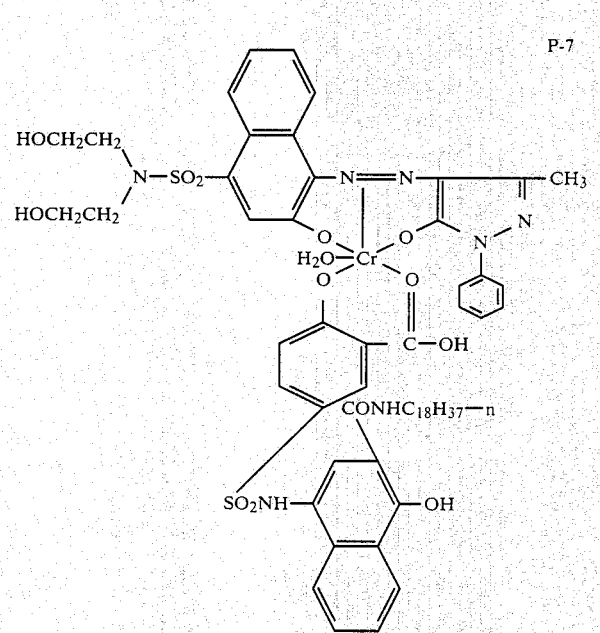

P-8
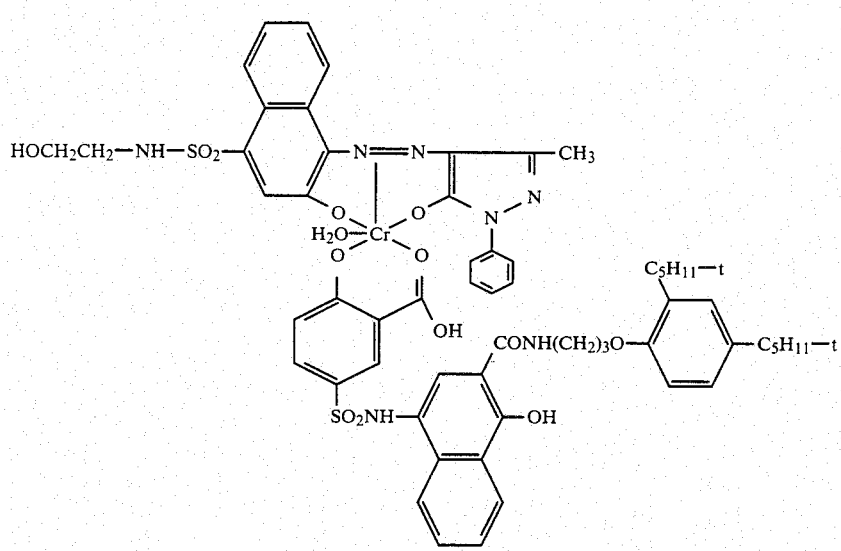
P-9
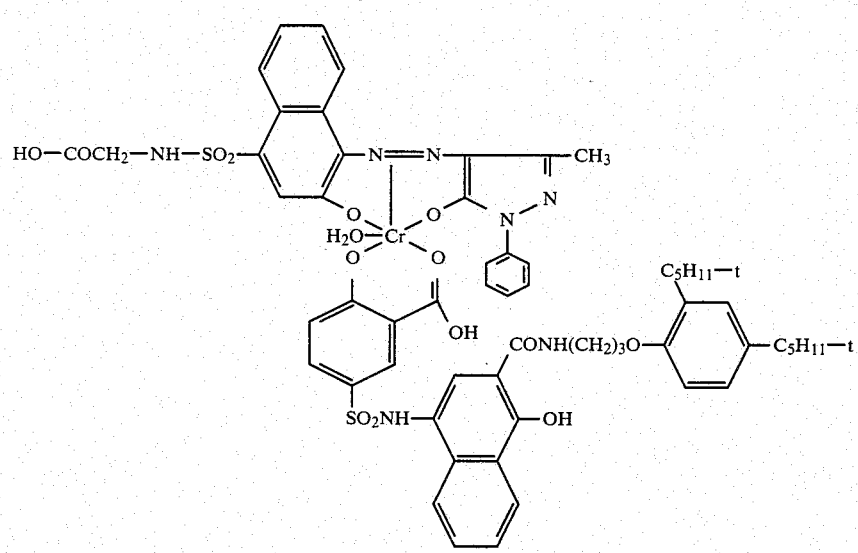
P-10 P-11
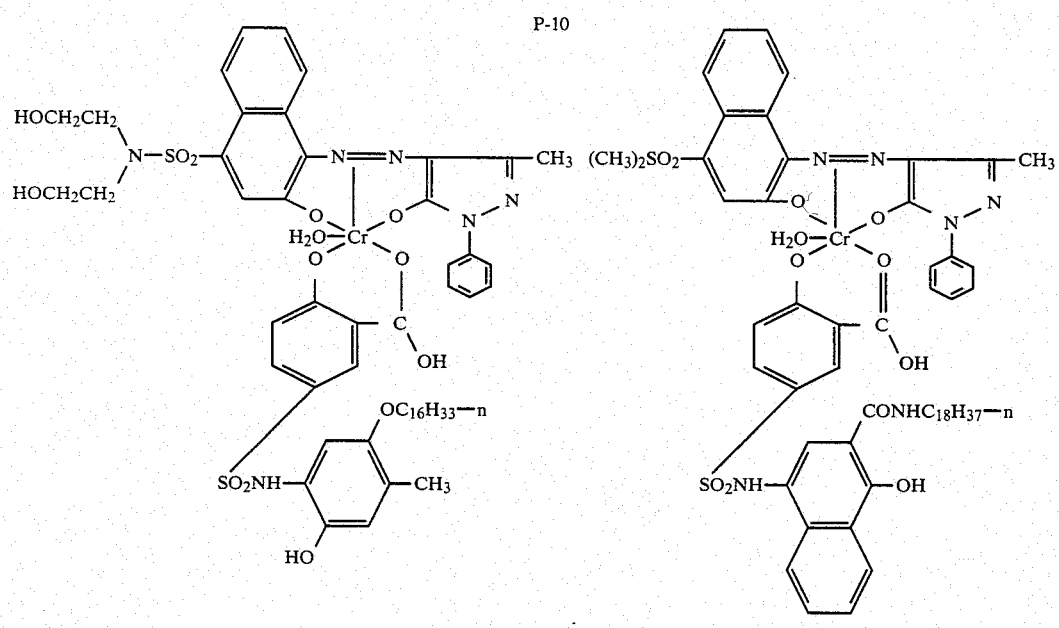

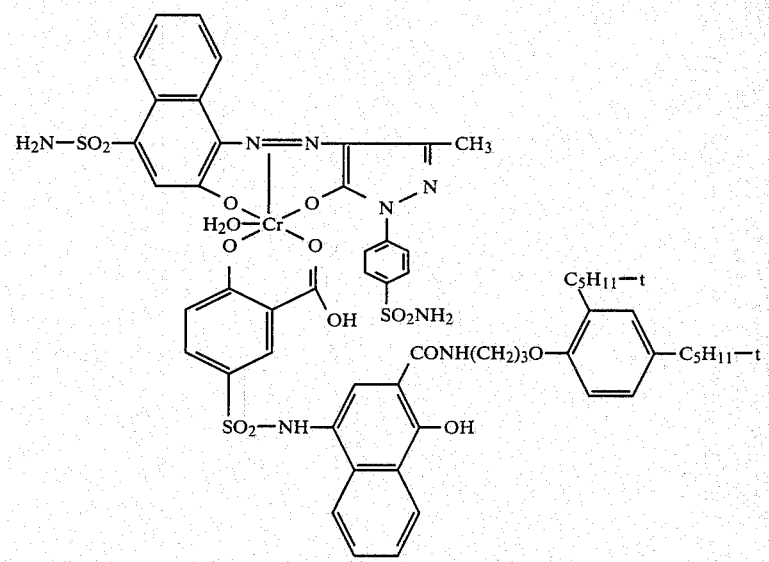
P-12
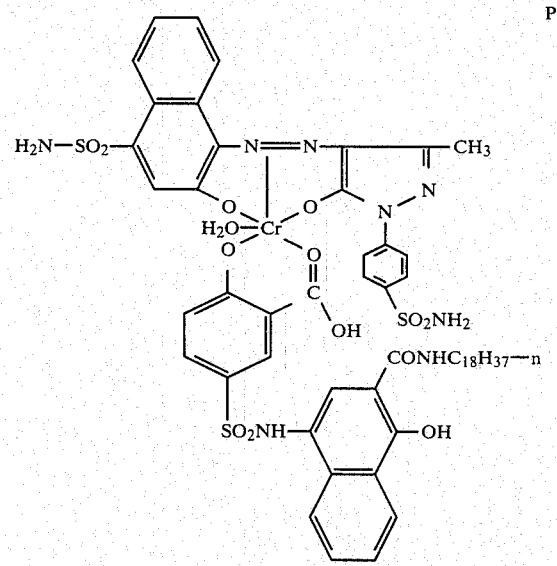
P-13
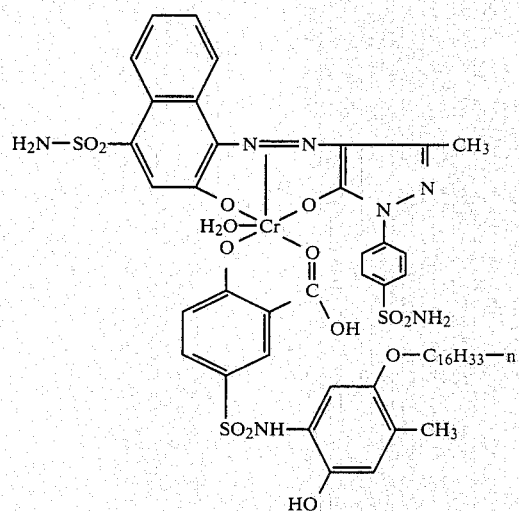
P-14
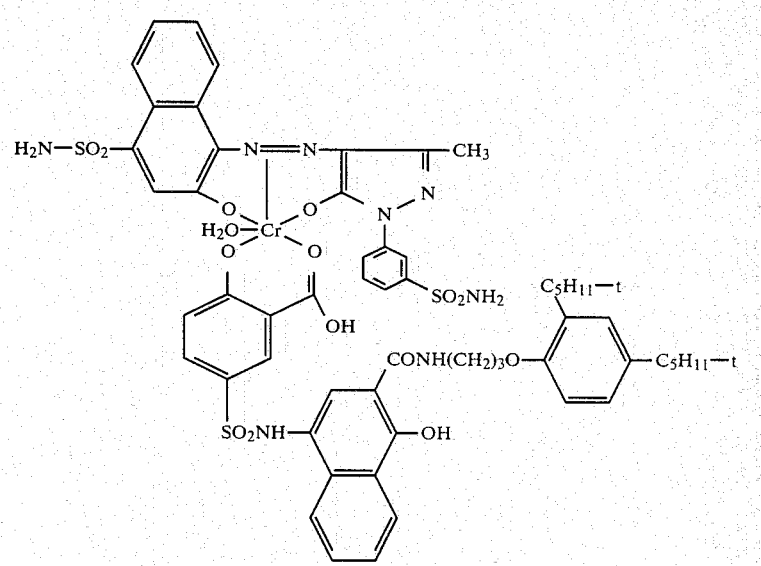
P-15

-continued
P-16
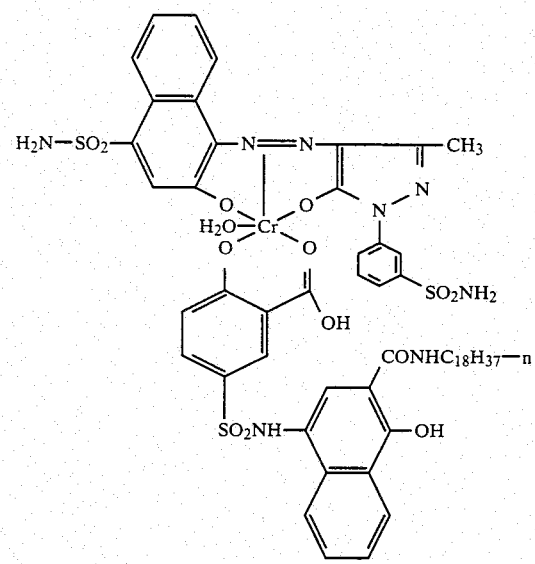
P-17
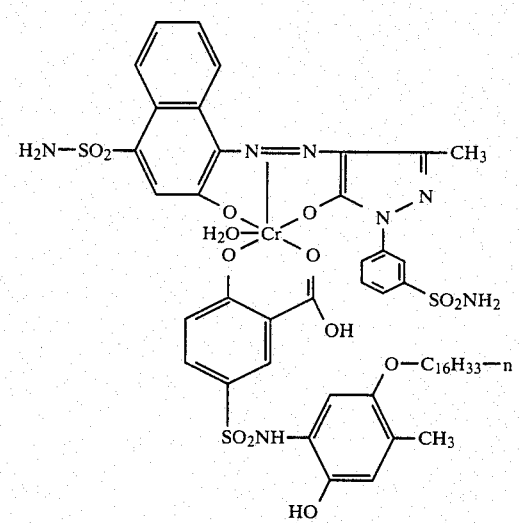
P-18
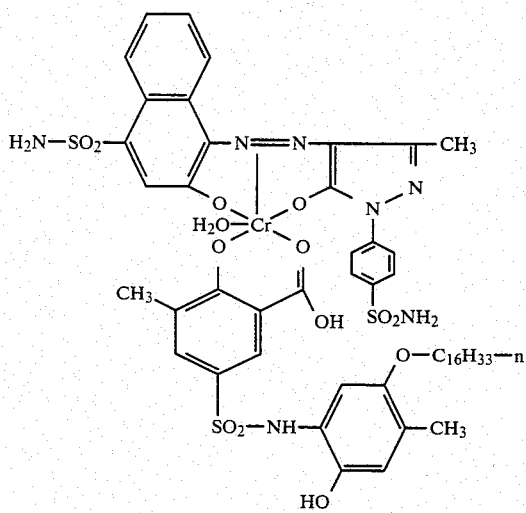
P-19
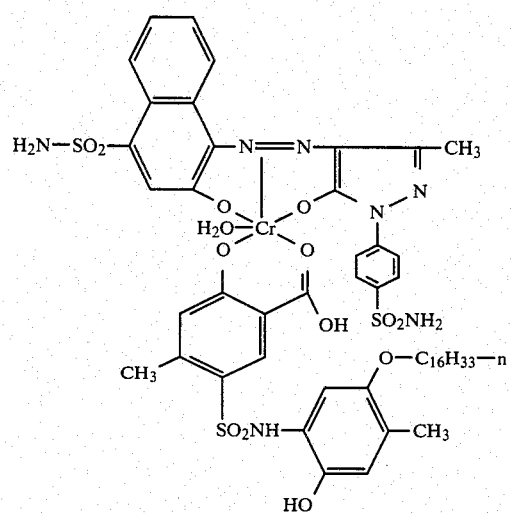
P-20
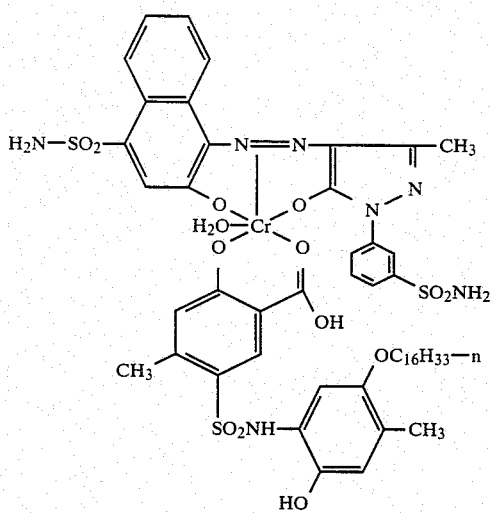
P-21
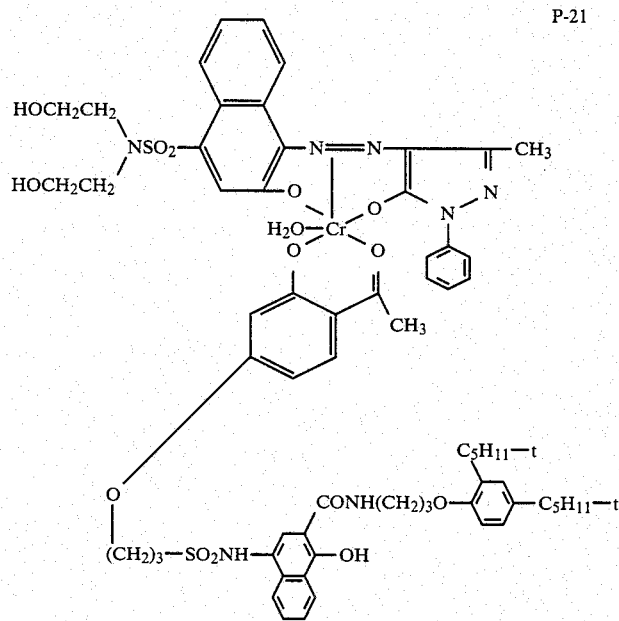

-continued
P-22
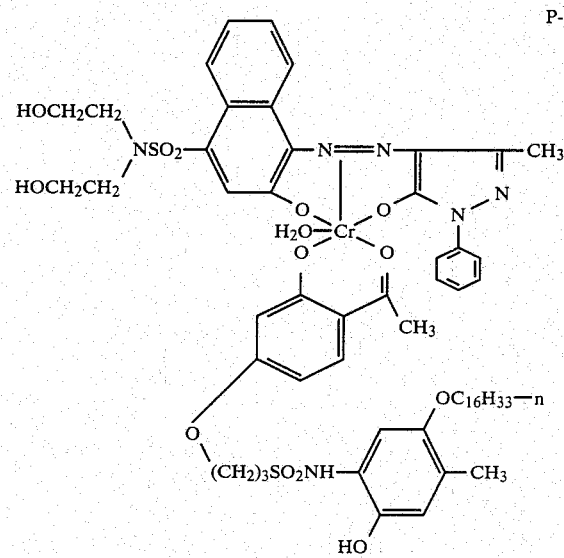
P-23
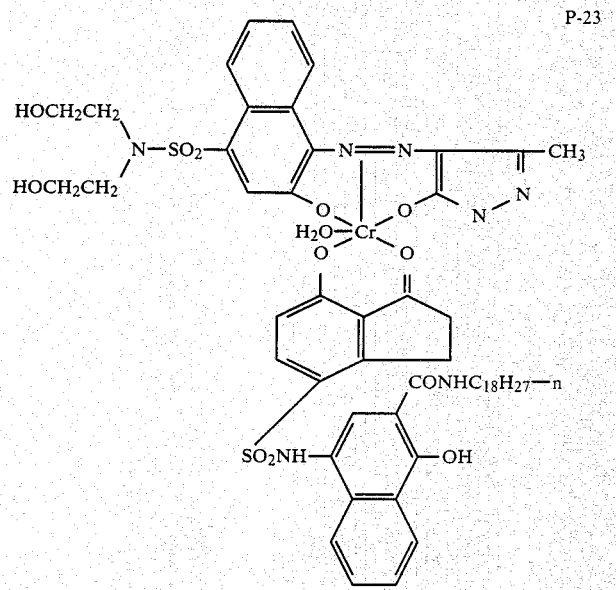
P-24
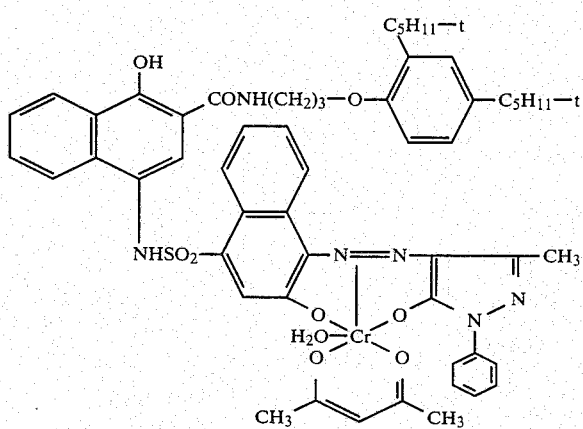
P-25
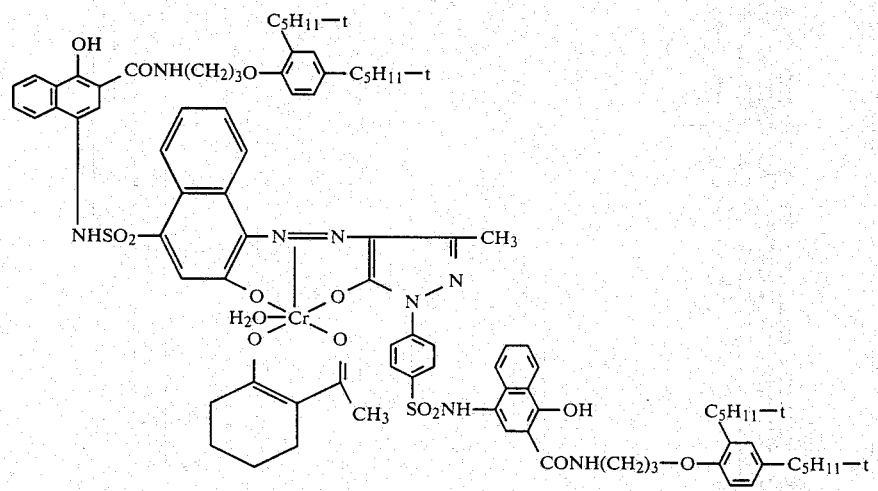

P-26
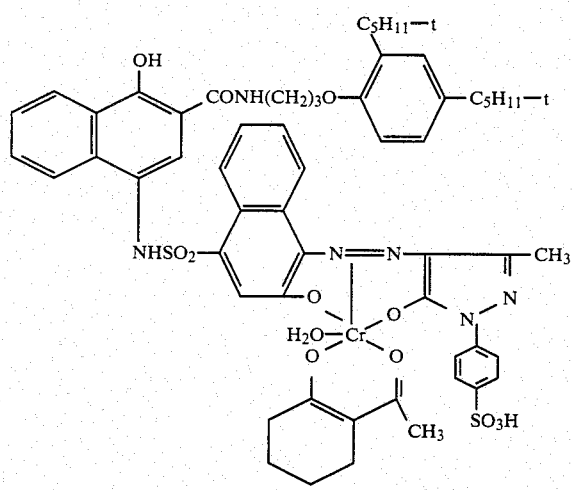
P-27
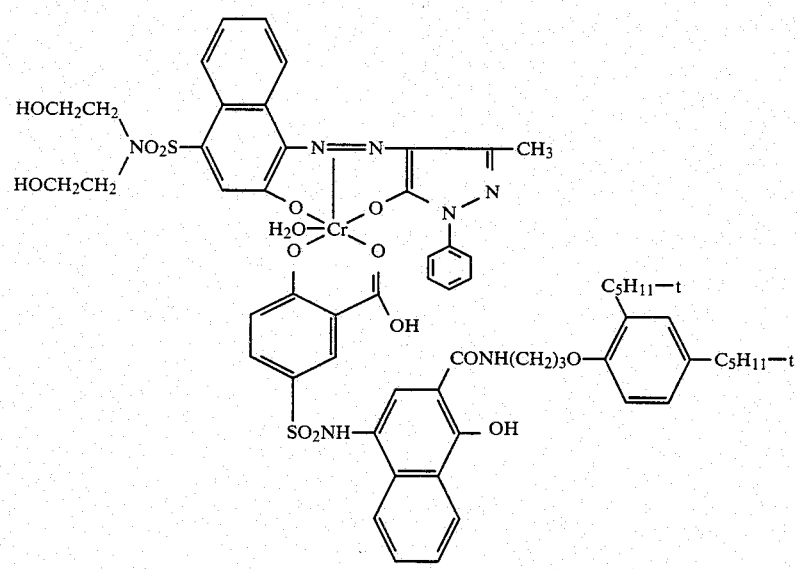
P-28
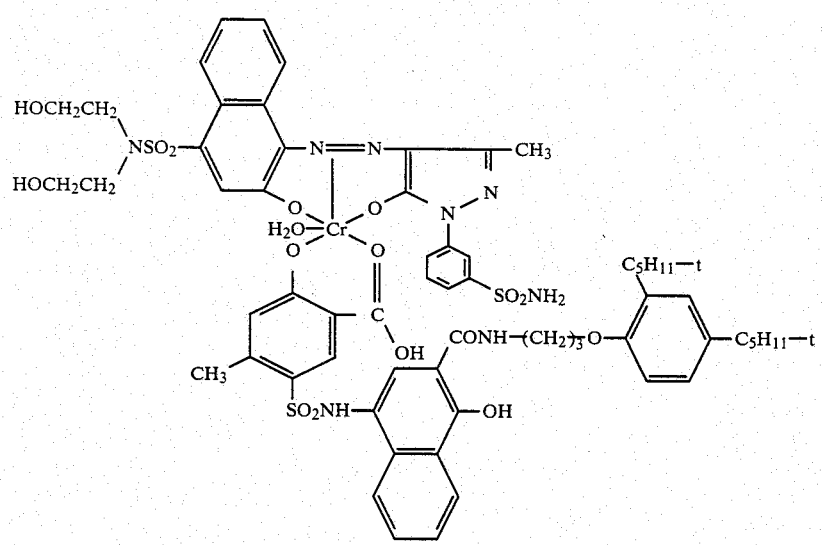

-continued
P-29
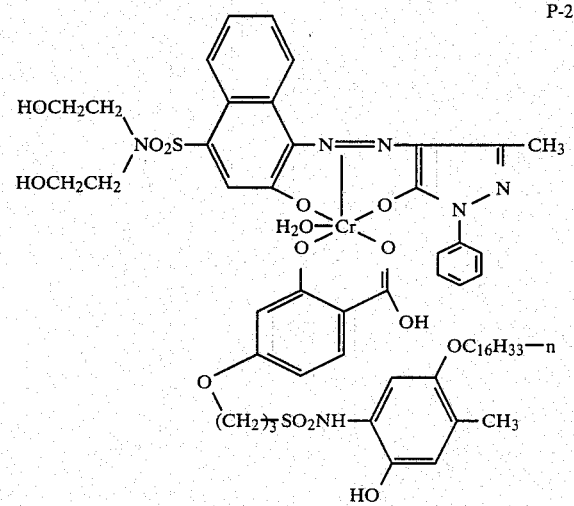
P-30
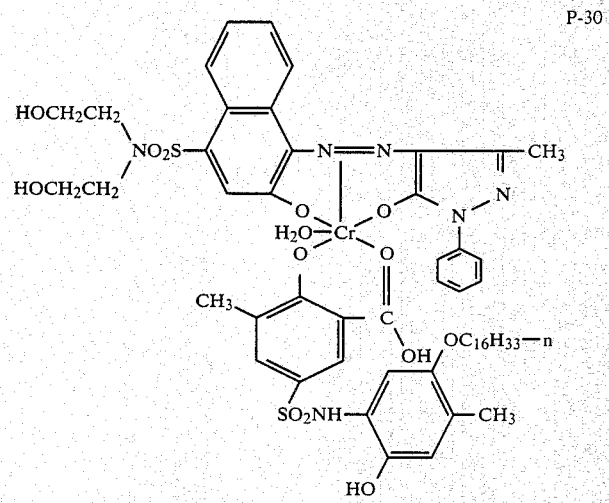
P-31
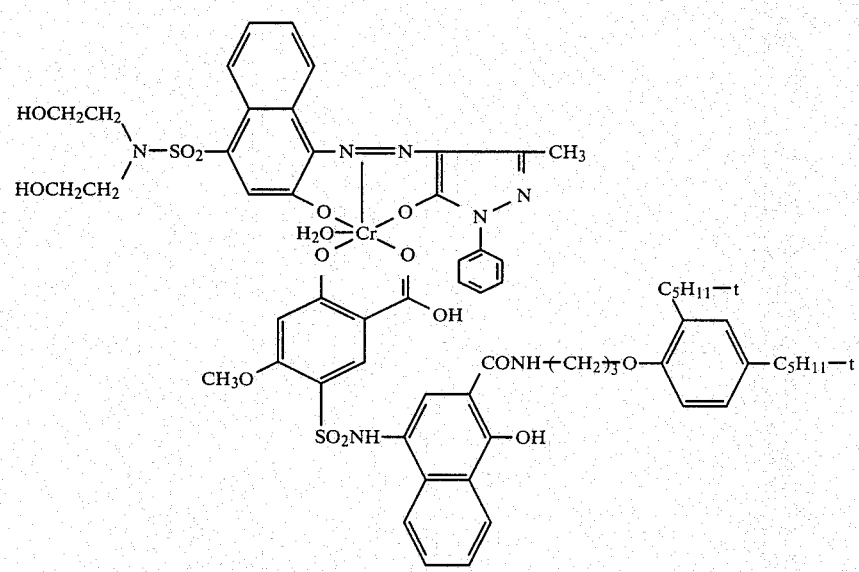
P-32
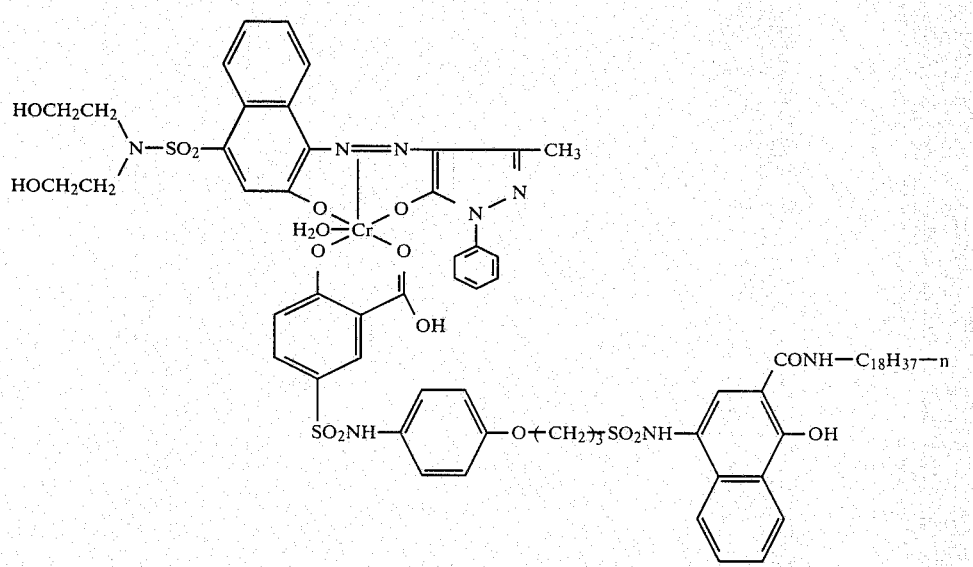

P-33
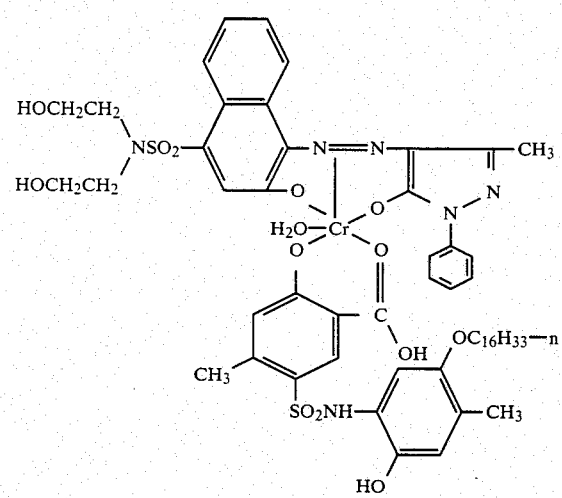
P-34
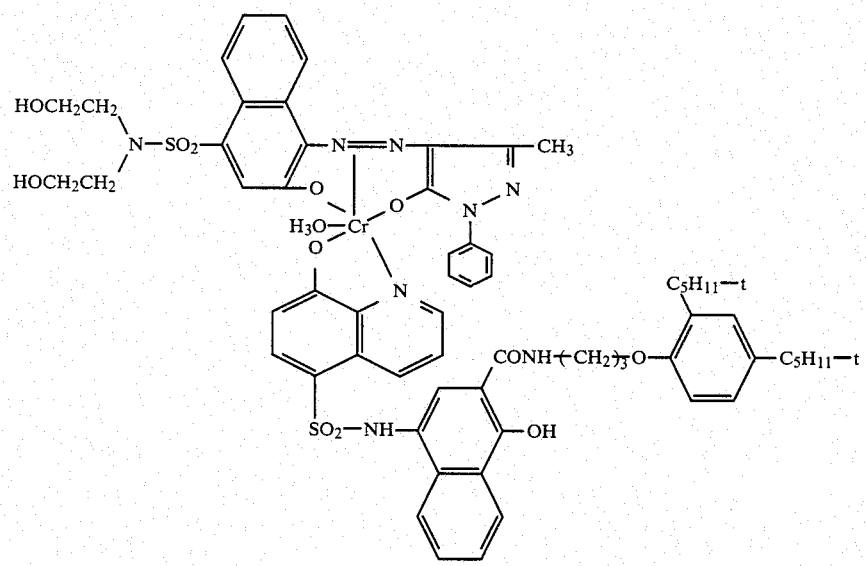
P-35
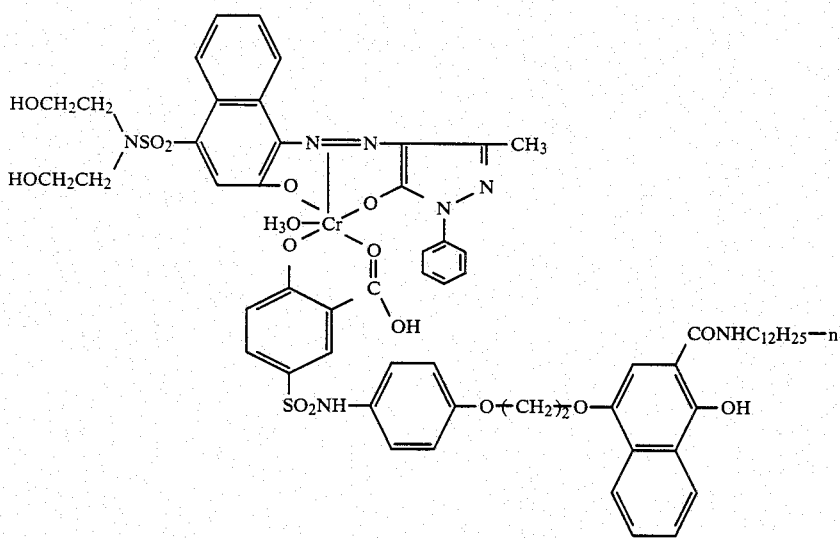

-continued
P-36
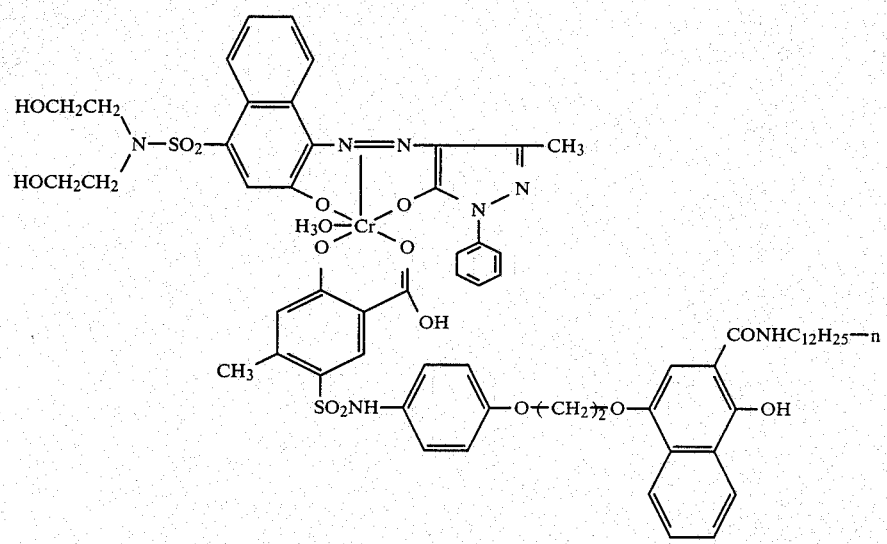
P-37
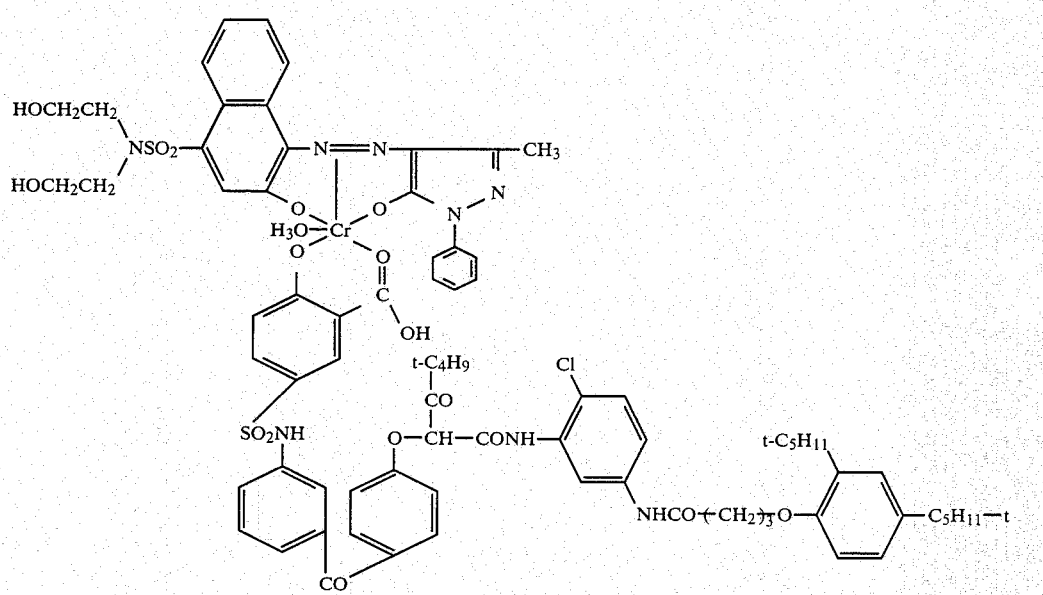
P-38
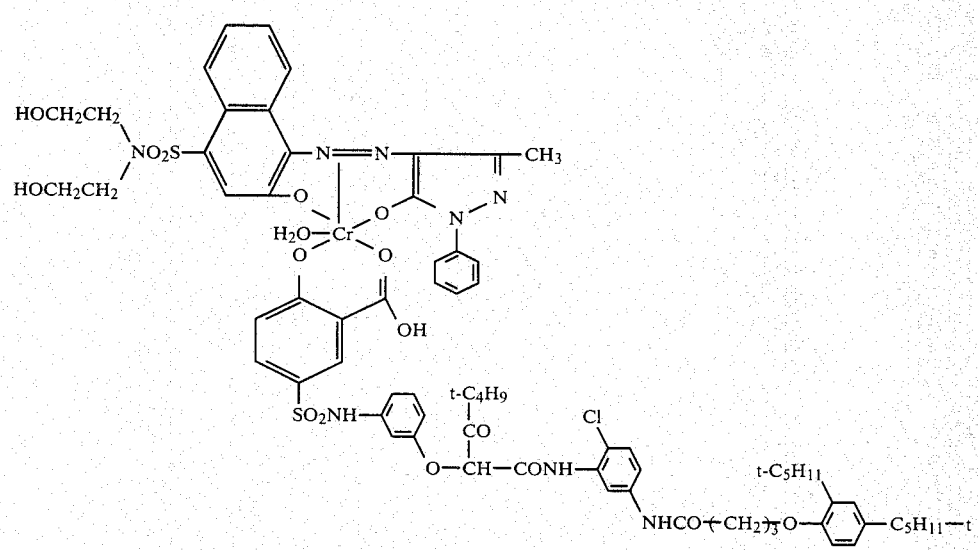

P-39

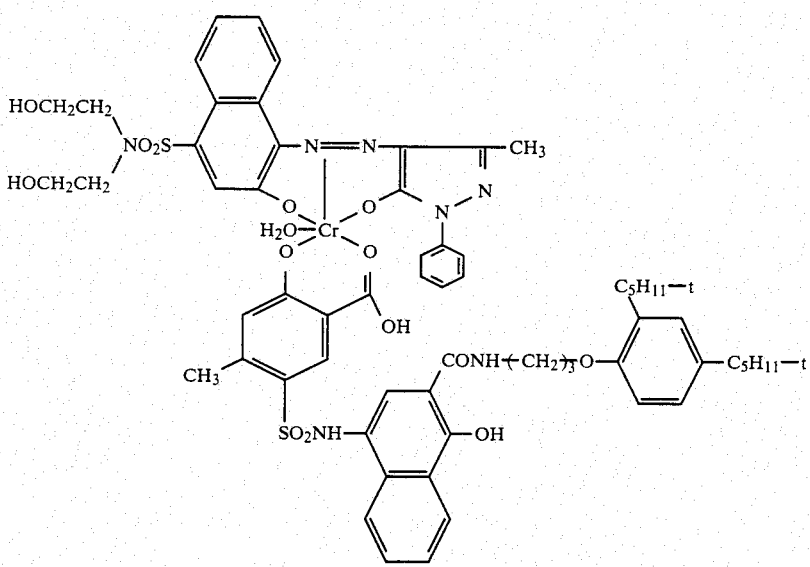

The metal chelate dyes released from the dye releasing compounds of this invention are very stable to light, humidity and heat. Furthermore, the hue of the metal chelate dyes does not change with changes in pH and thus the metal chelate dyes are chemically stable in an alkaline processing liquid composition.

The dye releasing compounds of the present invention generally have high solubility in organic solvents such as alcohols, ketones, amides and esters (e.g., acetone, ethyl acetate, N,N-dimethylformamide, methoxymethanol, etc.) as compared to dyes having a hydroquinone carrier moiety. The dye releasing compounds of the present invention generally have a solubility in 100 ml of the above solvents of 30 g or more at room temperature and most of the dye-releasing compounds of the present invention have a solubility of 50 g or more. As a result of their solubility, they can readily produce clear or transparent solutions at room temperature which can be used to provide color photographic materials capable of providing uniform and clear dye images. Furthermore, the metal chelate dyes released from the redox compounds of the formula (VIII) exhibit good mordantability.

Japanese Patent Publication Nos. 36,896/'73 and 2,618/'74 and U.S. Pat. Nos. 3,551,406; 3,903,169 and 3,789,062 disclose certain kinds of dye developers having metal chelate dye moieties. However, in the photographic system using dye developers, the dye developers which are initially diffusible are rendered nondiffusible by being oxidized at the light exposed areas and the color separation is essentially poor as described before. Furthermore, the photographic system using dye developers has the disadvantage that stains are readily formed since not only the dye moieties but also the developer moieties which tend to be oxidized diffuse into the image-receiving layers of color photographic materials. Therefore, it is very important for the stability of the dye images and color separation to transfer only the metal chelate moieties into image-receiving layers as in this invention.

The dye releasing compounds of this invention represented by the above-described formula (VIII) can be prepared by reacting ligand compounds (ligand-redox compounds or ligand couplers) represented by the following formula (IX)

A-(LINK)-(LIG)-H      (IX)

wherein A, (LINK), and (LIG) have the same significance as in the formula (VIII) and a 1:1 metal complex of an appropriate dye such as, for example, an o,o'-dihydroxyazo dye. A typical example of the "1:1 metal complex" is represented by the following formula (X)

wherein X and Y have the same significance as in formula (III) and (mobile ligand) represents a mono-, bi- or tridentate ligand capable of being readily replaced by the ligand compound represented by the formula (IX) above.

Appropriate examples of the (mobile ligand) are a ligand having an oxygen atom as the coordinating atom, such as water, ethylene glycol, etc., and a ligand having a nitrogen atom as the coordinating atom, such as amines, e.g., $NH_3$, triethylamine, ethylenediamine, diethylenetriamine, pyridine, etc. as well known in coordination chemistry.

The azomethine dye and the metal other than chromium (e.g., cobalt) can be each applied to the azo dye moiety and the chromium metal, respectively, of the formula (X).

The 1:1 metal complex represented by the formula (X) may be prepared by the methods described in, for example, German Pat. No. 479,373, British Pat. Nos. 790,904 and 745,474, M. Idelson et al; *Inorganic Chemistry*, 6,450–458(1967), and G. Schetty; *Helv. Chim. Acta*, 46, 1132(1963), ibid., 47, 2193(1961), and ibid., 44, 2193(1961). In the ligand compounds represented by the formula (IX), the moieties represented by (LIG) can be easily derived from the compounds represented by the above-described formula (IVa), (IVb), or (IVc). More specifically, they can be derived from the compounds illustrated by formulae (L-1) to (L-23) described above and derivatives of these compounds. That is, the ligand compounds used in this invention may be represented by the following formula (XIa), (XIb), (XIc), (XId), or (XIe);

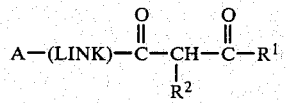  (XIa)

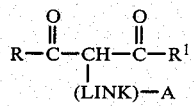  (XIb)

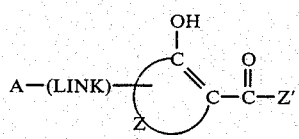  (XIc)

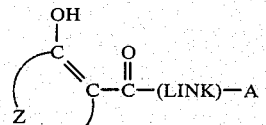  (XId)

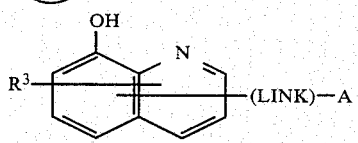  (XIe)

wherein A and (LINK) have the same significance as in the formula (I); R, $R^1$ and $R^2$ have the same significance as in the formula (IVa); $R^3$ has the same significance as in the formula (IVc); and Z and Z' have the same significance as in the formula (IVb).

Particularly preferred ligand compounds which can be used in this invention are derived from the ligands represented by the formula (Va) or (Vb) and are represented by the formula (XIIa) or (XIIb), most preferably, those of the formula (XIIa) on account of ready availability etc.

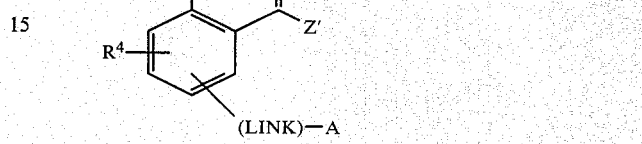  (XIIa)

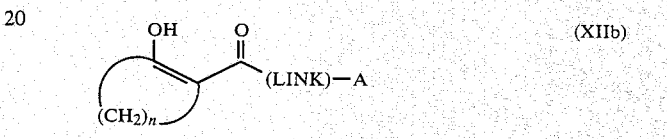  (XIIb)

wherein A and (LINK) have the same significance as in the formula (I); Z' has the same significance as in the formula (IVb); $R^4$ has the same significance as in the formula (Va); and n is 3 or 4.

Specific examples of ligand compounds which can be used in this invention are shown below:

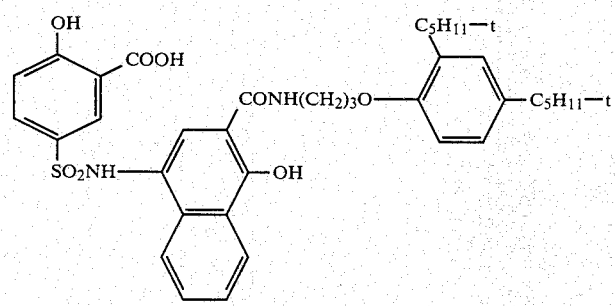  LR-1

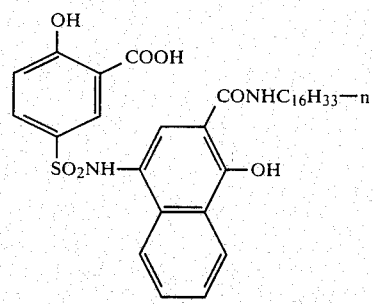  LR-2

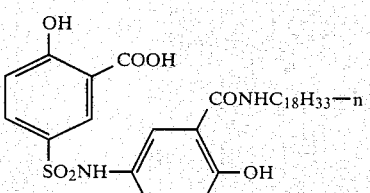  LR-3

LR-4
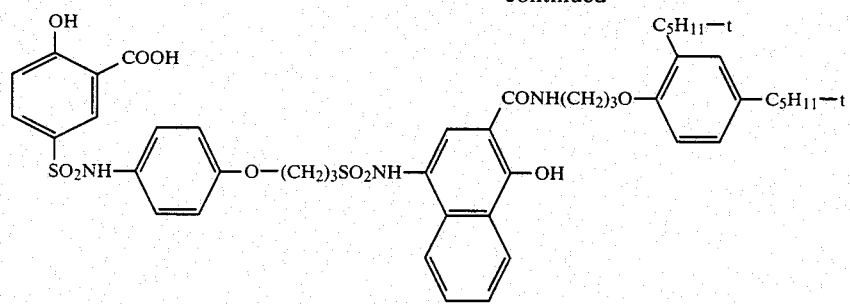
LR-5
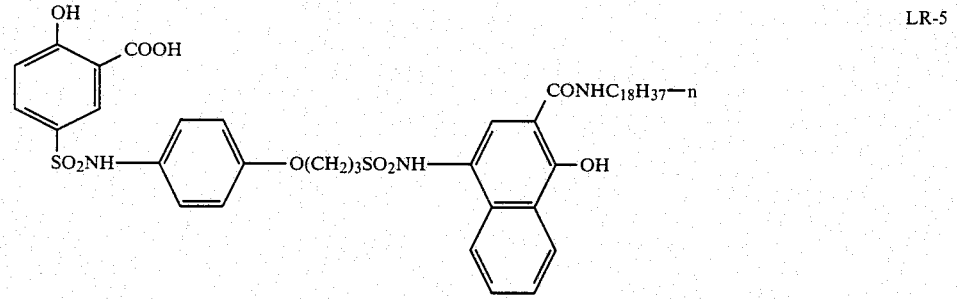
LR-6
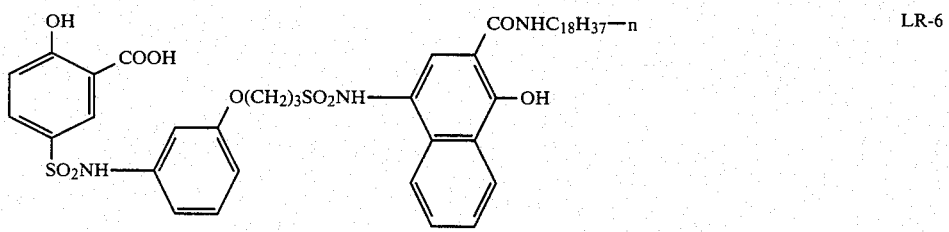
LR-7
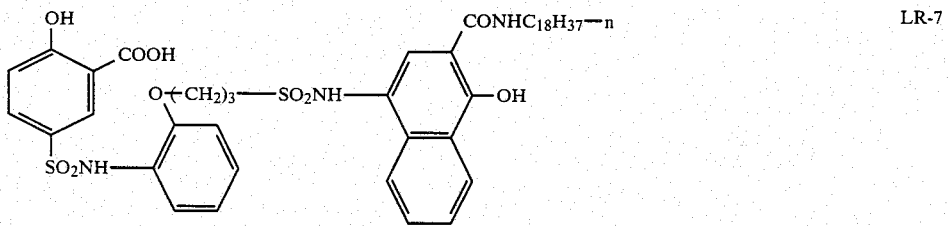
LR-8
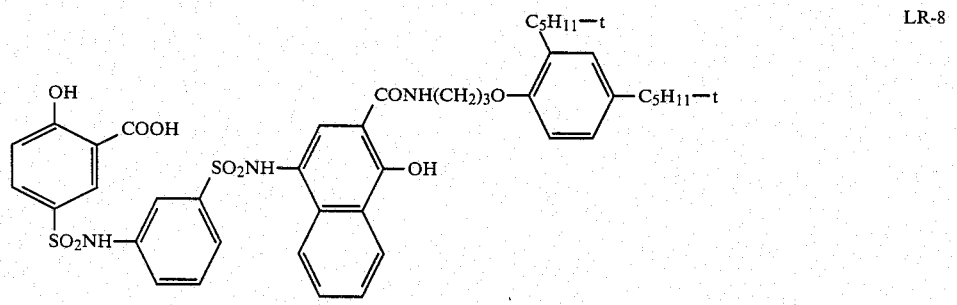
LR-9
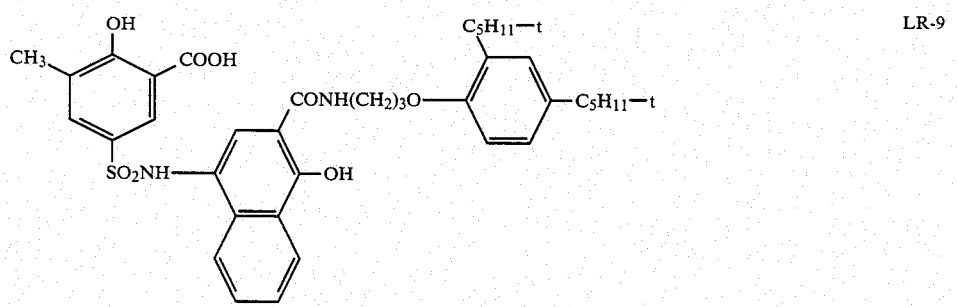

-continued
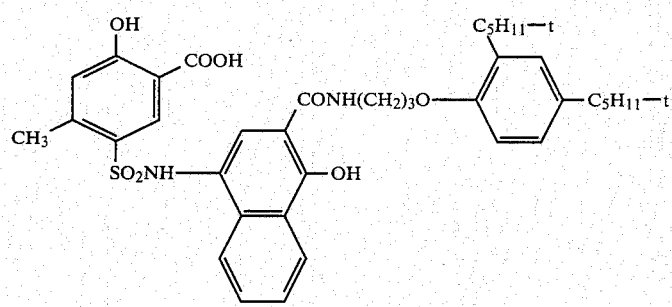 LR-10
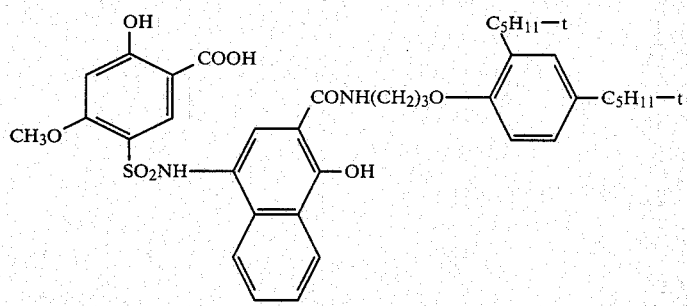 LR-11
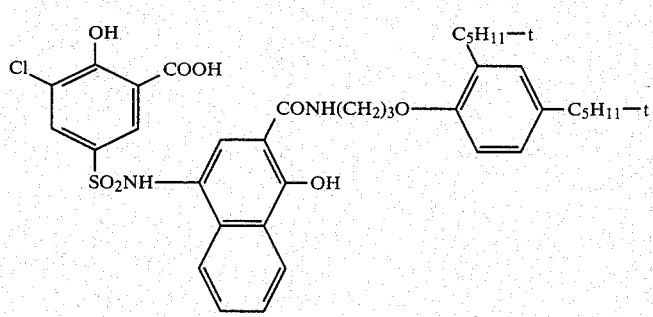 LR-12
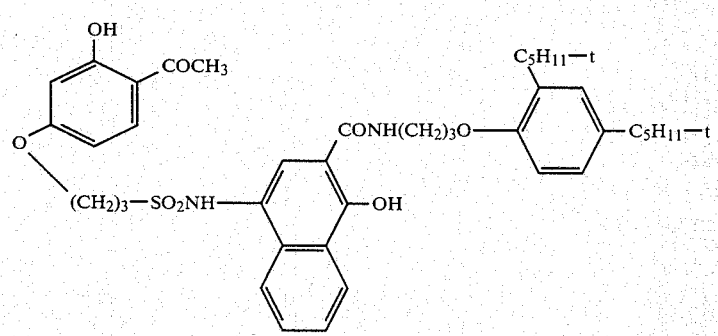 LR-13
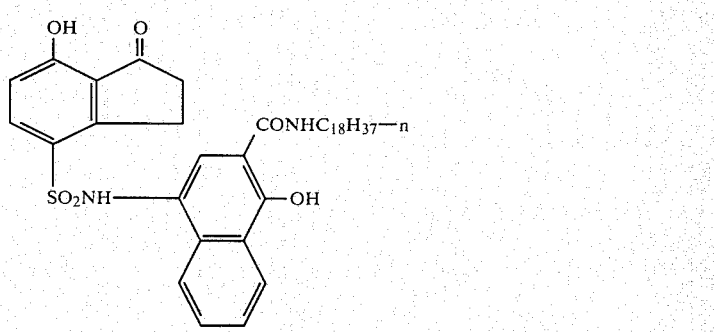 LR-14

-continued
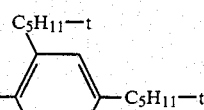
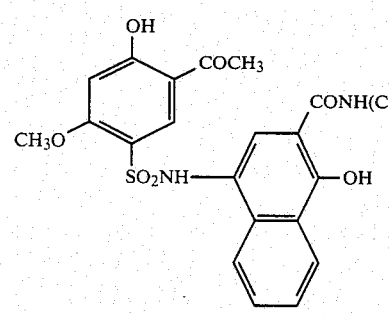
LR-15
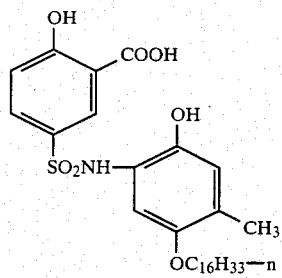 LR-16
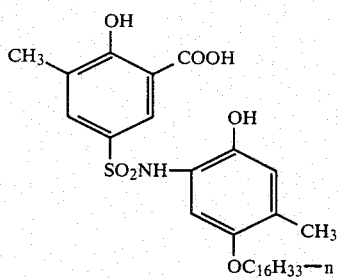 LR-17
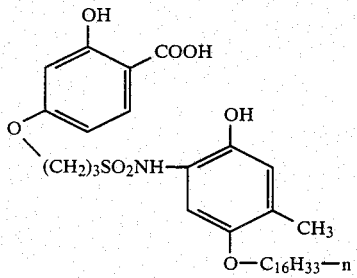 LR-18
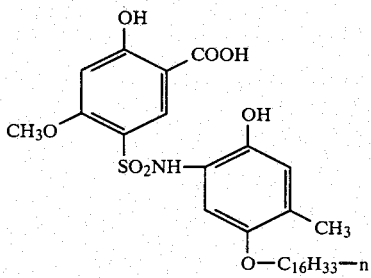 LR-19
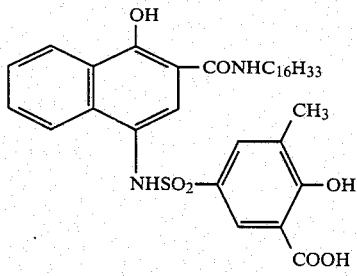 LR-20
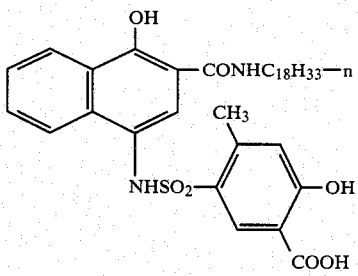 LR-21
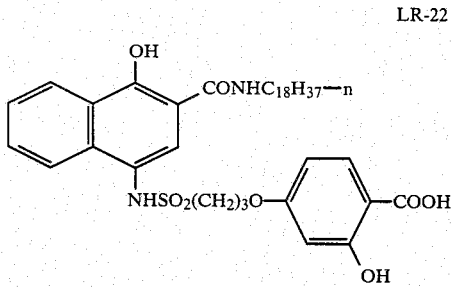 LR-22
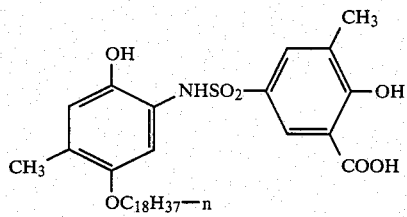 LR-23
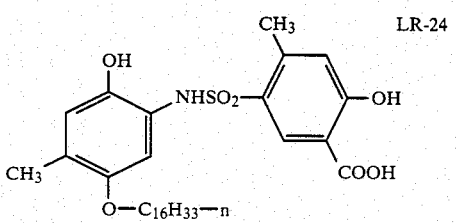 LR-24
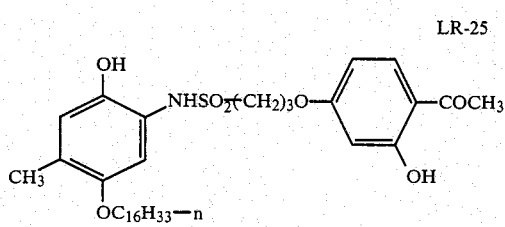 LR-25

-continued
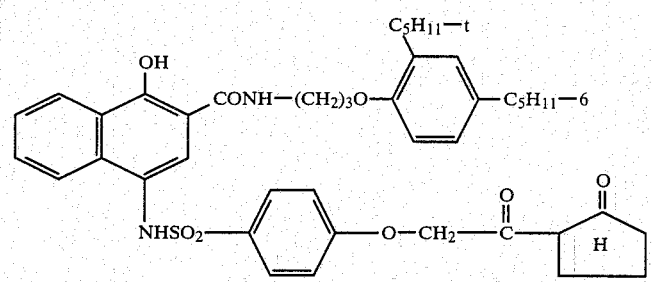
LR-26
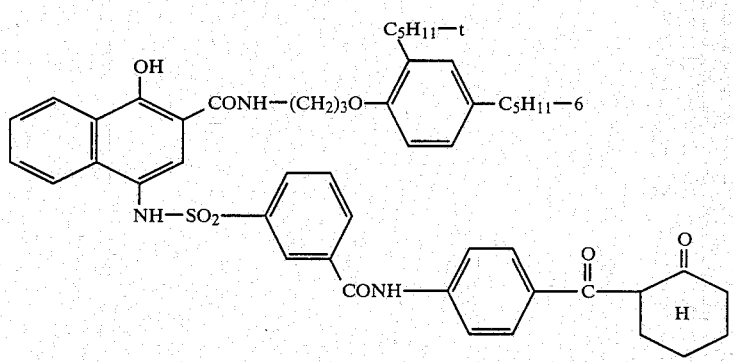
LR-27
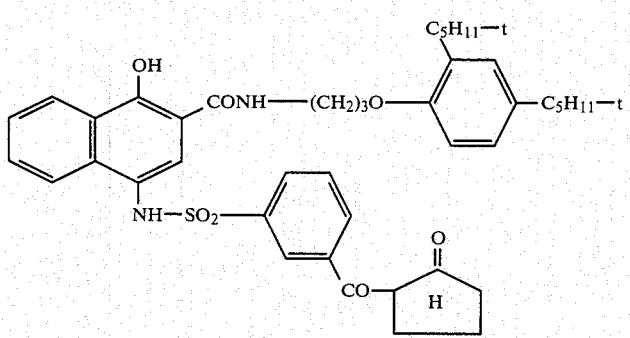
LR-28
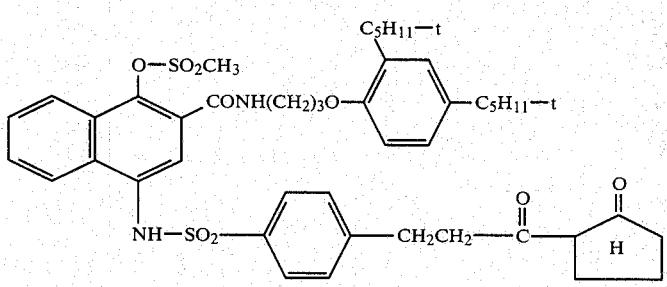
LR-29
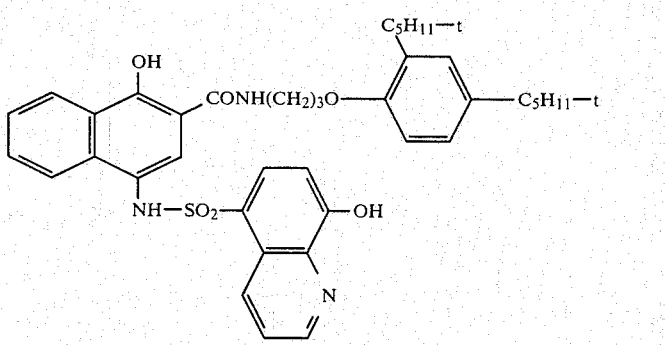
LR-30

-continued

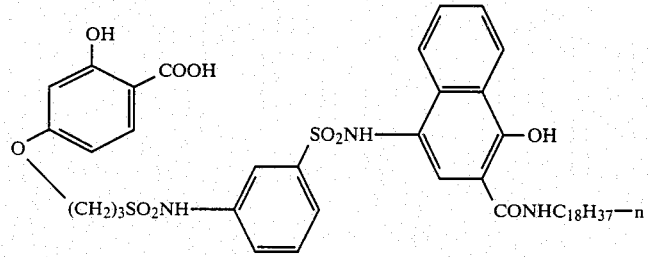

It should also be clearly understood that when A in the formula is a coupler moiety, the same compounds as illustrated above are also important as intermediates for preparing the compounds used in this invention.

The ligand-redox compound used in this invention can be prepared by the condensation reaction of, for example, a sulfonyl halide derived from the ligand represented by the formula (IVa), (IVb) or (IVc) and an amine derived from a redox compound moiety. Examples of sulfonyl halides, in particular the sulfonyl chloride derived from the above-described ligand are 5-chlorosulfonyl-2-hydroxybenzoic acid, 5-chlorosulfonyl-2-hydroxy-3-methylbenzoic acid, 5-chlorosulfonyl-2-hydroxy-4-methylbenzoic acid, 3-chlorosulfonyl-2-hydroxy-5-methylbenzoic acid, 3-chloro-5-chlorosulfonyl-2-hydroxybenzoic acid, 5-chloro-3-chlorosulfonyl-2-hydroxybenzoic acid, etc., described in German Pat. No. 264,786 and 4-acetyl-3-hydroxybenzenesulfonyl chloride, 5-acetyl-4-hydroxy-2-methoxybenzenesulfonyl chloride, etc., described in German patent application (OLS) No. 2,120,443. Furthermore, various sulfonyl chlorides can be prepared in the same manner as in producing 2-hydroxy-4-(γ-chlorosulfonylpropyloxy)acetophenone or 4-chlorosulfonyl-7-hydroxy-1-indanone as described in the production examples shown below.

Examples of amines derived from the redox compound moieties represented by the formula (VIIa) and (VIIb) are the compounds represented by the following formula (XIII)

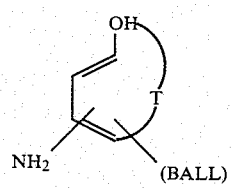

(XIII)

wherein T and (BALL) have the same significance as in the formula (VIIa) and the amino group is at the o-position or p-position to the hydroxy group.

These amines may be prepared by the methods described in German patent application (OLS) Nos. 2,406,653; 2,406,626; and 2,503,443. If necessary for production, the hydroxy group of the formula (XIII) may be protected by a group capable of forming a hydroxy group by hydrolysis, such as alkyl-SO$_2$— (e.g., CH$_3$SO$_2$—), alkyl-CO— (e.g., an acetyl group), etc.

Moreover, the compounds represented by the following formula (XIV) are also useful as the amines for producing the compounds of this invention;

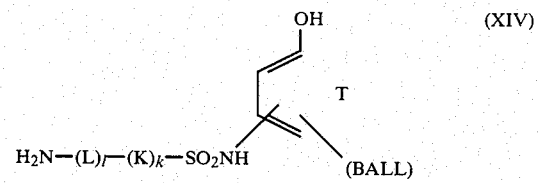

wherein T and (BALL) have the same significance as in the formula (VIIa) and L, K, k, and l have the same significance as in the formula (I).

If necessary for production, the hydroxy group of the formula (XIV) may be protected by alkyl-SO$_2$— (e.g., CH$_3$SO$_2$—), alkyl-CO— (e.g., acetyl group), etc. A typical reaction schematic in the production of amines having such a linkage group is as follows:

(SCHEME I)

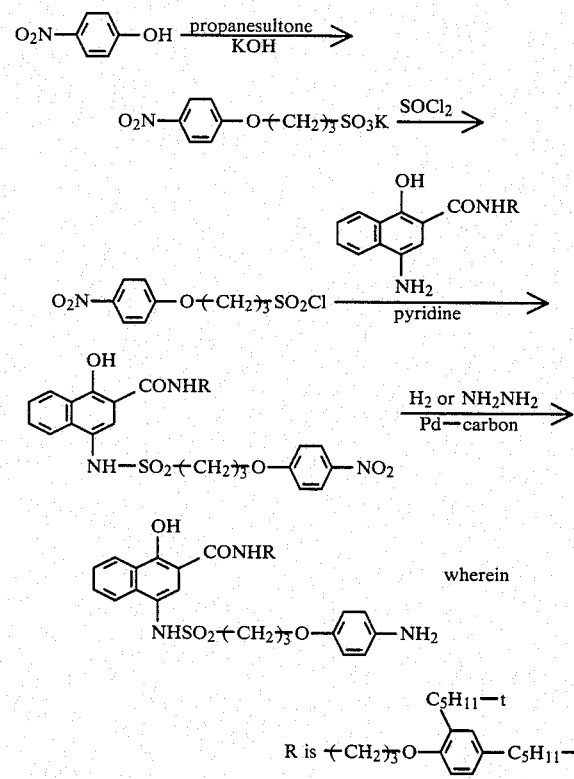

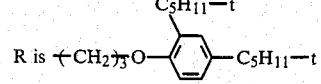

Experimental details of each step of Scheme I above are described in Synthesis Example 4 below.

In the same manner as above, amines having other redox compound moieties than those described above can be also prepared. Furthermore, when o-nitrophenol is used as a starting material in place of the p-nitrophenol used as the starting material in the above-described schematic, an amine having an amino group substituted at the m-position or the o-position can be prepared. It should also be understood that by using other sultones than propanesultone, such as, for example, δ-butanesultone, γ-butanesultone, etc., in place of propanesultone in the above-described schematic, a compound having the corresponding alkylene chain is obtained.

It is usually preferred for the condensation reaction of the sulfonyl halide derived from the ligand and the amine of formula (XIII) or (XIV) derived from the redox compound moiety to be carried out in the presence of a basic material. Examples of suitable basic materials are a hydroxide of an alkali metal or an alkaline earth metal (e.g., sodium hydroxide, potassium hydroxide, barium hydroxide, calcium hydroxide, etc.), an amine (e.g., triethylamine, N,N-diethylaniline, etc.), a heterocyclic aromatic amine (e.g., pyridine, quinoline, α-picoline, β-picoline, γ-piclone, lutidine, collidine, etc.), and a heterocyclic base (e.g., 1,5-diazabicyclo[4,3,0]nonene-5, and 1,8-diazabicyclo[5,4,0]undecene-7, etc.).

The ligand moiety of the sulfonyl halide induced from the ligand represented by the formula (IVa), (IVb) or (IVc) may be protected by an appropriate protective group if necessary for production. A typical reaction schematic for production using the sulfonyl halide derived from such a protected ligand as indicated above is illustrated below:

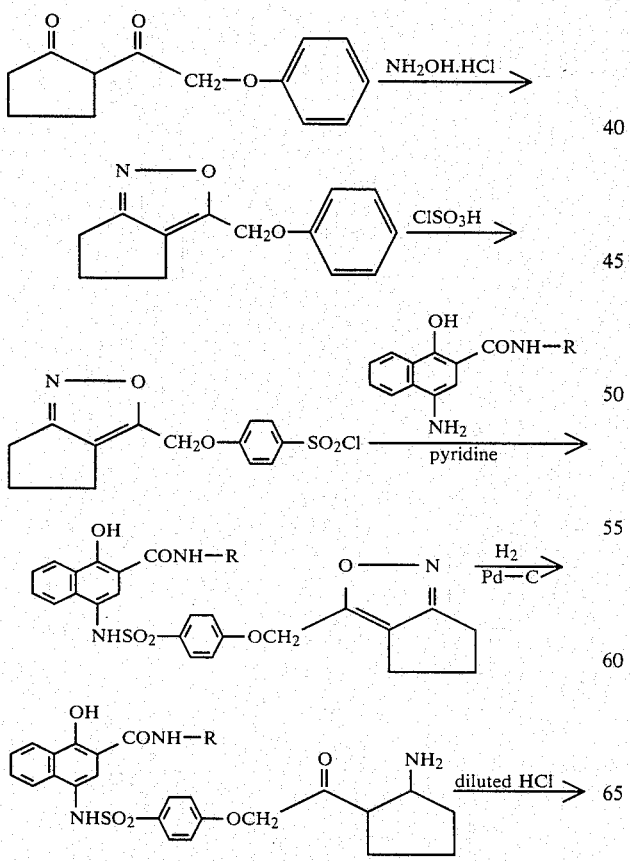

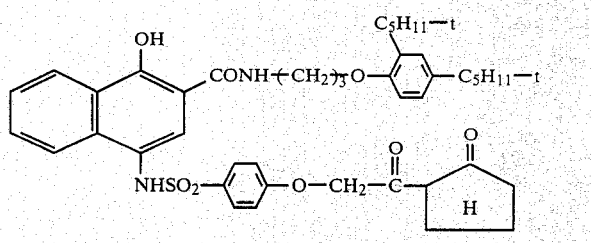

wherein R is

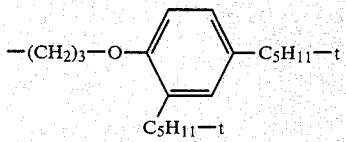

(SCHEME II)

In the above formulae, the β-diketone which is the ligand moiety has been, as a matter of course, protected in the form of isoxazole. Also, as a matter of course, the linkage group, —CH$_2$O— in the above formulae may be replaced with a divalent group represented by L in the formula (XIV) and further other redox compound moieties described above may be used desirably in the above production.

Experimental details of each step of Scheme II above are illustrated in Synthesis Example 8 below.

According to another manner of producing the ligand-redox compound represented by the formula (XIIb) (wherein A is a redox compound moiety), the ligand-redox compound is produced by acylating enamine with the carboxylic acid chloride derived from the redox compound moiety and then hydrolyzing the acylated product. Examples of the carboxylic acid chloride derived from the redox compound moiety, include the compounds represented by the following formula (XV)

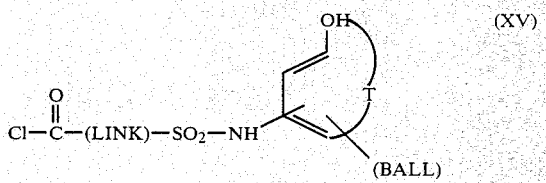

wherein T and (BALL) have the same significance as in the formula (VIIa) and (LINK) has the same significance as in the formula (I).

If necessary for production, the hydroxy group of the formula (XV) may be protected by alkyl-SO$_2$— (e.g., CH$_3$SO$_2$—), alkyl-CO— (e.g., CH$_3$CO—), etc.

A typical production reaction schematic using such a carboxylic acid chloride is illustrated below:

(SCHEME III)

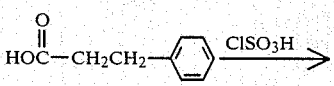

-continued
(SCHEME III)

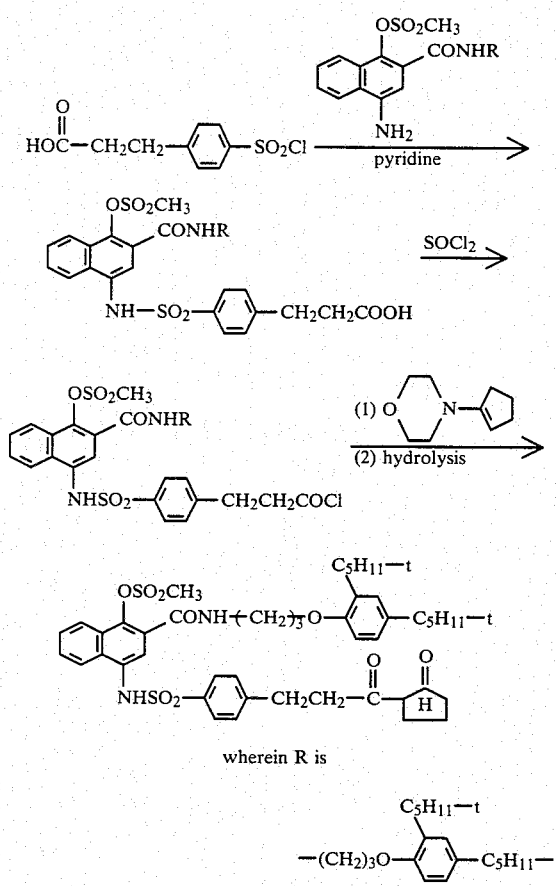

wherein R is

—(CH₂)₃O—⟨C₅H₁₁—t⟩—C₅H₁₁—t

Experimental details of each step of Scheme III above are described in Synthesis Example 9 below.

The production of the enamine, the acylation thereof with the carboxylic acid chloride, and the hydrolysis of the acylated product are described in detail in, for example, Herbert O. Houese; *Modern Synthetic Reactions,* W. A. Benjamin Inc. Menlo Park, Calif. (1972) and Richard S. Monson; *Advanced Organic Synthesis,* 1971, published by Academic Press, Inc., New York.

The production of the ligand-redox compounds which can be used in this invention is explained below in greater detail. Unless otherwise indicated herein, all parts, percents, ratios and the like are by weight.

SYNTHESIS EXAMPLE 1

Synthesis of Compound LR-1

In 300 ml of tetrahydrofuran were dissolved 44.50 g of 1-hydroxy-4-amino-N-[γ-(2,4-di-t-amylphenoxy)-propyl]-2-naphthamide (½ H₂SO₄ salt) and 19.95 g of 5-chlorosulfonyl-2-hydroxybenzoic acid and then after adding 20 ml of pyridine to the solution, the mixture was stirred for 5 hours at room temperature (about 20° to 30° C.) in a nitrogen atmosphere. The reaction mixture obtained was added to diluted hydrochloric acid (about 5 wt%) and the solids precipitated were recovered by filtration and washed with water. The crystals thus recovered were dissolved in 500 ml of ethyl acetate and the solution was dried by adding Na₂SO₄ thereto. The mixture was filtered and the filtrate obtained was concentrated to dryness. To the residue formed were added 100 ml of ethyl acetate and then 250 ml of n-hexane to form crystals, which were recovered by filtration. By air-drying the crystals, 32.60 g of the compound of the formula LR-1 was obtained. Melting point 225°–227° C.

SYNTHESIS EXAMPLE 2

Synthesis of Compound LR-2

By following the same procedure as in Synthesis Example 1, 16.90 g of the compound of formula LR-2 was obtained from 21.4 g of 1-hydroxy-4-amino-N-hexadecyl-2-naphthamide and 11.9 g of 5-chlorosulfonyl-2-hydroxybenzoic acid. Melting point 178°–182° C.

SYNTHESIS EXAMPLE 3

Synthesis of Compound LR-3

By following the same procedure as in Synthesis Example 1, 26.5 g of the compound of formula LR-3 was obtained from 44.0 g of 1-hydroxy-4-amino-N-octadecyl-2-naphthamide and 23.7 g of 5-chlorosulfonyl-2-hydroxybenzoic acid. Melting point 201°–205° C.

SYNTHESIS EXAMPLE 4

Synthesis of Compound LR-4

(a) Synthesis of 3-(4-Nitrophenoxy)propane-1-sulfonic acid Potassium Salt:

To a solution of 160 g of 4-nitrophenol in 1.0 l of 2-propanol was added a solution of 85 g of potassium hydroxide in 1.5 l of methanol. The mixture was stirred and heated at reflux, and 190 g of propanesultone was added dropwise to the mixture over a 1.5 hour period. The stirring and refluxing was continued for an additional 30 min and the precipitated solid was collected by filtration. The solid product (359 g) was used in the next step without further purification.

(b) Synthesis of 3-(4-Nitrophenoxy)propane-1-sulfonyl Chloride:

To a suspension of 90 g of 3-(4-nitrophenoxy)propane-1-sulfonic acid potassium salt, prepared us described above, in 1 l of benzene was added 5 ml of N,N-dimethylformamide (as a catalyst) and subsequently 66 ml of thionyl chloride was added. The mixture was heated under reflux for 3 hr and then poured into ice-water. The resulting benzene layer was separated, dried over sodium sulfate and concentrated under reduced pressure. The oily residue solidified on addition of 100 ml of n-hexane. The solid (59 g) was collected by filtration and used in the following step without further purification.

(c) Synthesis of 1-Hydroxy-4-[γ-(p-nitrophenoxy)-propylsulfonamido]-N-[γ-(2,4-di-t-amylphenoxypropyl]-2-naphthamide:

To a mixture of 16.0 g of 1-hydroxy-4-amino-N-[γ-(2,4-di-t-amylphenoxypropyl]-2-naphthamide, 100 ml of tetrahydrofuran and 8.40 g of 3-(4-nitrophenoxy)-propane-1-sulfonylchloride, prepared as described above, was added in one portion 15 ml of pyridine. The mixture was stirred at 25° C. for 4 hr and then poured into a mixture of 50 ml of 35% hydrochloric acid and 1 l of water. The solid precipitated was collected by filtration and recrystalyzed from ethanol. The crystals (15.1 g) obtained had a melting point of 169°–171° C.

(d) Synthesis of 1-Hydroxy-4-[γ-(p-aminophenoxy)-propylsulfonamido]-N-[γ-2,4-di-t-amylphenoxypropyl]-2-naphthamide:

To a solution of 3.60 g of the nitro compound obtained in Example 4(c) above in 50 ml of ethanol was added 0.1 g of 10% palladium-on-charcoal catalyst and then 4.0 ml of 80% hydrazine hydrate dropwise at 45° C. The mixture was heated at reflux temperature for 2.5 hr. The catalyst was filtered off and the filtrate was concentrated in vacuo. The oily residue was solidified on addition of 30 ml of n-hexane. The crystals (3.20 g) obtained had a melting point of 134°–136° C.

(e) By following the same procedure as in Synthesis Example 1, the compound of formula LR-4 was obtained from 1-hydroxy-4-[γ-(p-aminophenoxy)propylsulfonamido]-N-[γ-(2,4-di-t-amylphenoxypropyl]-2-naphthamide prepared as in Example 4(d) and 5-chlorosulfonyl-2-hydroxybenzoic acid. Melting point 128°–130° C.

SYNTHESIS EXAMPLE 5

Synthesis of Compound LR-13

(a) Synthesis of 2-Hydroxy-4-[γ-potassiumsulfopropyloxy)acetophenone:

In 300 ml of 2-propanol was dissolved 100 g of 2,4-dihydroxyacetophenone and then a solution of 37 g of potassium hydroxide in 500 ml of methanol was added to the solution. While refluxing the mixed solution with stirring, 81 g of propanesultone was added dropwise to the mixed solution over a period of 30 minutes and then the mixture was refluxed for one hour with stirring. Thereafter, the white plate-like crystals thus precipitated were recovered by filtration, washed with 500 ml of acetone and air-dried to obtain 160 g of the desired compound. Melting point 159°–163° C.

(b) Synthesis of 2-Hydroxy-4-(γ-chlorosulfonylpropyloxy)acetophenone:

In one liter of benzene was dispersed 50 g of the compound obtained in Step (a) above and after adding 50 ml of thionyl chloride and 0.5 ml of dimethylformamide to the dispersion, the mixture was refluxed for 30 minutes with stirring. Insoluble materials were filtered off and one liter of ligroin was added to the filtrate followed by cooling (about 0° C.) to form crystals, which were recovered by filtration and air-dried to botain 30 g of the desired compound. Melting point 72°–74° C.

(c) Synthesis of Compound LR-13

In 400 ml of tetrahydrofuran were dissolved 30 g of the compound obtained in Step (b) above and 64 g of 1-hydroxy-4-amino-N-[γ-(2,4-di-t-amylphenoxy)propyl]-2-naphthamide (½ H₂SO₄ salt) and after further adding 40 ml of pyridine to the solution, the resultant mixture was stirred for 2 hours at room temperature in a nitrogen atmosphere. The reaction mixture was poured in 2 liters of 1% hydrochloric acid and the solid materials precipitated were recovered by filtration, washed with water, dissolved in 500 ml of ethyl acetate, and the solution formed was dried by the addition of anhydrous sodium sulfate. After filtering, the filtrate obtained was concentrated under a reduced pressure to about 200 ml and 300 ml of ligroin was added to the concentrate followed by cooling (about 0° C.). The crystals thus formed were recovered by filtration and air-dried to obtain 50 g of the compound of formula LR-13. Melting point 172°–175° C.

SYNTHESIS EXAMPLE 6

Synthesis of Compound LR-14

(a) Synthesis of 7-Hydroxy-4-chlorosulfonyl-indanone:

To 120 ml of chlorosulfonic acid which was ice-cooled beforehand was added gradually 25 g of 7-hydroxyindanone prepared by the method described in D. B. Bruce et al; *Journal of the Chemical Society;* 1953, 2403(1953) so that the reaction temperature was 7°–12° C. The temperature of the reaction mixture was slowly increased to room temperature with stirring and after allowing the reaction mixture to stand for one day, 2 kg of ice water was added to the reaction mixture. The crystals thus precipitated were recovered by filtration, washed with water, and air-dried to obtain 32 g of the desired compound. Melting point 115°–116° C.

(b) Synthesis of Compound LR-14:

By following the same procedure as in Synthesis Example 1, 30 g of the compound of formula LR-14 was obtained from 55 g of 1-hydroxy-4-amino-N-octadecyl-2-naphthamide and 30 g of the compound prepared in Step (a) above, Melting point 141°–142° C.

SYNTHESIS EXAMPLE 7

Synthesis of Compound LR-27

In 100 ml of tetrahydrofuran were dissolved 5 g of 2-[4'-(3''-chlorosulfonylbenzoyl)aminobenzoyl]dichlorohexanone and 6.2 g of 1-hydroxy-4-amino-N-[γ-(2,4-di-t-amylphenoxy)propyl]-2-naphthamide (½ H₂SO₄ salt) and after adding 2 ml of pyridine to the solution, the mixture was stirred for one hour at room temperature in a nitrogen atmosphere. The reaction mixture obtained was added to 500 ml of an aqueous solution of 1% hydrochloric acid and the solid materials precipitated were recovered by filtration, washed with water and dissolved in 100 ml of ethyl acetate. The solution thus formed was dried by the addition of anhydrous sodium sulfate. After filtering, the filtrate was concentrated under a reduced pressure to about 50 ml and then 200 ml of ligroin was added to the concentrate followed by cooling (at about 0° C.). The crystals thus precipitated were recovered by filtration and air-dried to obtain 9 g of the compound of formula LR-27. Melting point 148°–153° C.

SYNTHESIS EXAMPLE 8

Synthesis of Compound LR-26

(a) Synthesis of 5-Phenoxymethyl-3,4-trimethylene-isoxazole:

In 125 ml of acetic acid were dissolved 25.0 g of 2-(phenoxyacetyl)cyclopentane and 15.0 g of hydroxylamine hydrochloride followed by refluxing for 5.5 hours. The reaction mixture obtained was added to water and after neutralizing (to a pH of about 8) the mixture with sodium carbonate, the product was extracted with ethyl acetate. The extract was dried with anhydrous sodium sulfate and distilled under a reduced pressure to obtain 12.1 g of 5-phenoxymethyl-3,4-trimethylene-isoxazole. Boiling point 141°–142° C./1.5 mmHg.

(b) Synthesis of 5-(p-Chlorosulfonylphenoxymethyl)-3,4-trimethylene-isoxazole:

In 35 ml of chlorosulfonic acid was dissolved 10.0 g of the compound obtained in Step (a) above and the solution formed was stirred for 1.5 hours under ice cooling and then for 3.5 hours at room temperature. The reaction mixture obtained was added to ice water and then extracted with ethyl acetate. The extract was dried with anhydrous sodium sulfate and concentrated to obtain 9.80 g of the desired compound. Melting point 96°–98° C.

(c) Synthesis of 1-Hydroxy-4-[p-(3,4-trimethylene-5-isoxazoylmethoxy)benzenesulfonamido]-N-[γ-(2,4-di-t-amylphenoxy)propyl]-2-naphthamide:

By condensing 6.3 g of sulfonyl chloride obtained in Step (b) above and 10.5 g of 1-hydroxy-4-amino-N-[γ-(2,4-di-t-amylphenoxy)propyl]-2-naphthamide ($\frac{1}{2}$ $H_2SO_4$ salt) as in Synthesis Example 1, 12.1 g of the desired compound was obtained. Melting point 164°–167° C.

(d) Synthesis of 1-Hydroxy-4-[p-(2-amino-1-cyclopentenyl-1-carbonylmethoxy)benzenesulfonamido]-N-(γ-(2,4-di-t-amylphenoxy)propyl)-2-naphthamide:

In 200 ml of ethanol was dissolved 2.0 g of the compound obtained in Step (c) above, the solution obtained was placed in an autoclave, and a hydrogenation was carried out at room temperature at an initial hydrogen pressure of 30 kg/cm² to perform a cleavage of the isoxazole ring and to obtain 1.2 g of the desired compound. Melting point 194°–196° C.

(e) Synthesis of Compound of Formula LR-26:

In 30 ml of ethyl acetate was suspended 0.20 g of the compound obtained in Step (d) above and the suspension was stirred at room temperature together with 10 ml of hydrochloric acid of a concentration of about 7%. The ethyl acetate layer formed was recovered, dried with anhydrous sodium sulfate, and concentrated to obtain 0.18 g of the white crystals of the compound of formula LR-26. Melting point 153°–155° C.

SYNTHESIS EXAMPLE 9

Synthesis of Compound LR-29

(a) Synthesis of 1-Methanesulfonyl-4-[4'-(β-carboxyethyl)phenylsulfonylamino]-N-[γ-(2',4'-di-t-amylphenoxy)propyl]-2-naphthamide:

In 300 ml of tetrahydrofuran were dissolved 30 g of 1-methanesulfonyl-4-amino-N-[γ-(2',4'-di-t-amylphenoxy)propyl]-2-naphthamide (acetate) and 17 g of 3-(4'-chlorosulfonyl-phenyl)propionic acid and after adding 20 ml of pyridine thereto, the mixture was stirred for 5 hours at room temperature in a nitrogen atmosphere. The reaction mixture obtained was added to diluted hydrochloric acid (about 5 wt%) and the solid materials precipitated were recovered by filtration, washed with water, and then dissolved in 500 ml of ethyl acetate. After filtering, 300 ml of ethyl acetate was distilled away under a reduced pressure and to the mother liquor was added 200 ml of diethyl ether followed by cooling to precipitate crystals, which were recovered by filtration and air-dried to obtain 30 g of the desired compound. Melting point 228°–232° C.

(b) Chlorination of the Carboxylic Acid:

To a mixture of 200 ml of benzene and 50 ml of thionyl chloride was added 30 g of the carboxylic acid obtained in Step (a) above and the mixture was refluxed with stirring for 30 minutes. The reaction mixture obtained was allowed to cool to room temperature and then 300 ml of ligroin was added to the reaction mixture followed by ice-cooling to form crystals, which were recovered by filtration and air-dried to obtain 30 g of the carboxylic acid chloride. Melting point 176°–177° C.

(c) Synthesis of the Compound of Formula LR-29:

To 400 ml of dried chloroform were added 24 g of the carboxylic acid chloride obtained in Step (b) above and 10.6 g of 1-morpholino-1-cyclopentene and while stirring the mixture at room temperature, 4 g of triethylamine and 200 ml of dried chloroform were added dropwise thereto over a period of 30 minutes. Then, after stirring the mixture for 2 additional hours at room temperature, a solution of 10 ml of concentrated hydrochloric acid (35 wt%) and 400 ml of water was added to the mixture prepared above and the resultant mixture was refluxed with stirring for 30 minutes. The chloroform layer formed was recovered, concentrated to dryness and then to the residue formed were added 100 ml of ethyl acetate and then 250 ml of ligroin to form crystals, which were recovered by filtration and air-dried to obtain 22 g of the compound of formula LR-29. Melting point 127°–130° C.

Examples of producing dye releasing redox compounds which can be used in this invention are shown below.

SYNTHESIS EXAMPLE 10

Synthesis of Compound P-1

A mixture of 1.8 g of 1-phenyl-3-methyl-4-[2-hydroxy-4-sulfamoyl-1-naphthylazo]-5-pyrazolone (D-10 described hereinbefore), 30 g of $CrCl_3 \cdot 6H_2O$, 80 ml of water, and 320 ml of 2-propanol was refluxed under heating for 6 hours and after cooling (about 0° C.), 40 g of diethylenetriamine was added to the mixture followed by stirring for one hour at room temperature. After removing insoluble materials by filtration and then distilling off isopropanol from the filtrate under a reduced pressure, 100 ml of water was added to the residue formed to form crystals, which were recovered by filtration, washed with 300 ml of ethyl acetate, and air-dried to obtain 15 g of the chromium complex of the dye and diethylenetriamine represented by the following formula;

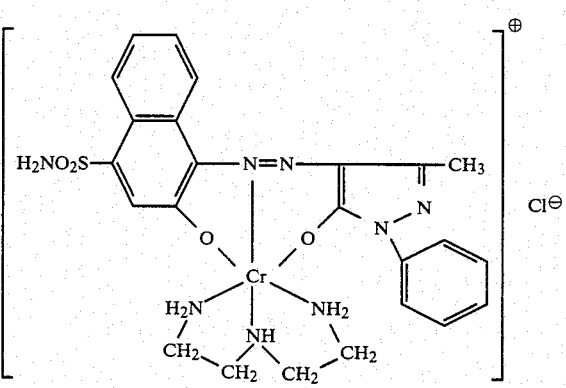

This compound exhibited a $\lambda_{max}$ at 543 nm ($\epsilon - 1.92 \times 10^4$) and a $\lambda_{max}$ at 583 nm ($\epsilon = 2.14 \times 10^4$) in methyl Cellosolve.

In 50 ml of N,N-dimethylformamide were dissolved 5 g of the diethylenetriamine complex described above and 4 g of the above-described compound of formula LR-27 and the solution was refluxed for 30 minutes at a nitrogen atmosphere. After cooling (about 0° C.) the reaction mixture, insoluble materials were filtered off and the filtrate was added to 200 ml of a 1% hydrochloric acid aqueous solution to form crystals, which were recovered by filtration, washed with 500 ml of water, and air-dried to provide 6 g of the compound of the formula P-1. The compound exhibited visible absorptions of $\lambda_{max}$ at 530 nm ($\epsilon = 1.88 \times 10^4$) and $\lambda_{max}$ at 567 nm ($\epsilon = 1.91 \times 10^4$) in methyl Cellosolve.

SYNTHESIS EXAMPLE 11

Synthesis of Compound P-21

By following the same procedure as in Synthesis Example 10 except that 1-phenyl-3-methyl-4-[2-hydroxy-4-(N,N-di-$\beta$-hydroxyethylsulfamoyl)-1-naphthylazo]-5-pyrazolone (D-2) was used in place of the compound of the formula D-10, the corresponding chromium complex of the dye and diethyltriamine was obtained. This compound exhibited a $\lambda_{max}$ at 542 nm ($\epsilon = 2.00 \times 10^4$) and a $\lambda_{max}$ at 581 nm ($\epsilon = 2.00 \times 10^4$) in methyl Cellosolve.

By following the same procedure as in Synthesis Example 10 using 7.2 g of the diethylenetriamine complex described above and 5.4 g of the compound of formula LR-13 prepared in Synthesis Example 5, 8 g of the compound of formula P-21 was obtained. This compound exhibited visible absorptions at 532 nm ($\epsilon = 2.08 \times 10^4$) and at 566 nm ($\epsilon = 2.09 \times 10^4$) as a $\lambda_{max}$.

SYNTHESIS EXAMPLE 12

Synthesis of Compound P-5

(a) Synthesis of the 1:1 Chromium Complex of the Compound of the Formula D-2:

A mixture of 27 g of the compound of the formula D-2, 4 g of $CrCl_3.6H_2O$ and 500 ml of n-propanol containing 17% water was refluxed for 5 hours and thereafter the solvent was distilled off by heating under a reduced pressure. Then, 100 ml of water was added to the residue to form crystals of the 1:1 complex. The amount of the complex obtained was 30 g.

This compound exhibited a $\lambda_{max}$ at 529 nm ($\epsilon = 22,900$) and a $\lambda_{max}$ at 564 nm ($\epsilon = 23,300$).

(b) Synthesis of the Compound of Formula P-5:

Under refluxing, 2 g of the 1:1 complex obtained in Step (a) above, 1.86 g of the compound of the formula LR-1, 12 ml of triethylamine, and 30 ml of ethanol was reacted and after the reaction was over, the reaction mixture thus obtained was added dropwise to hydrochloric acid (about 5 wt%) to precipitate the compound of the formula P-5. The amount of the compound obtained was 3 g.

The compound exhibited a $\lambda_{max}$ at 527 nm ($\epsilon = 22,800$) and at 562 nm ($\epsilon = 22,900$) in methyl Cellosolve.

SYNTHESIS EXAMPLE 13

By following the same procedure as in Synthesis Example 12 using the compounds of formulae LR-29, LR-26, LR-2, LR-3, LR-14, LR-9, LR-30, and LR-10 in place of the compound of formula LR-1, the compounds of formulae P-2, P-3, P-6, P-7, P-23, P-27, P-34, and P-39 respectively were prepared.

The visible maximum absorptions and $\epsilon$-values of the compounds in methyl Cellosolve are shown in Table 1 below.

TABLE 1

| DRR Compound | Visible Absorptions of the Dye Releasing Redox Compounds (DRR compounds) $\lambda_{max}$ in Methyl Cellosolve (in nm) | |
|---|---|---|
| P-2 | 530 (25,400) | 568 (23,500) |
| P-3 | 530 (22,200) | 567 (23,000) |
| P-6 | 527 (22,800) | 562 (22,900) |
| P-7 | 527 (22,800) | 562 (22,900) |
| P-23 | 530 (21,200) | 567 (21,400) |
| P-27 | 525 (23,900) | 563 (23,800) |
| P-34 | 535 (20,800) | 566 (19,900) |
| P-39 | 526 (22,100) | 562 (22,400) |

In the above table, the values shown in the parentheses are the $\epsilon$-values.

SYNTHESIS EXAMPLE 14

Synthesis of the Compound of Formula P-24

(a) Synthesis of the Non-chelate Azo Dye-Redox Compound of Formula D-21:

In 200 ml of tetrahydrofuran were dissolved 9.7 g of 1-phenyl-3-methyl-4-[2-acetoxy-4-chlorosulfonyl-1-naphthylazo]-5-pyrazolone prepared by the method described in M. Schmid and R. Mory; *Helv. Chim. Acta.*, 38, 1329(1955) and 11 g of 1-hydroxy-4-amino-N-[$\gamma$-2,4-di-t-amylphenoxy)propyl]-2-naphthamide ($\frac{1}{2}$ sulfate) and after adding 16 ml of pyridine to the solution, the mixture was stirred for 5 hours at room temperature. The reaction mixture obtained was concentrated and methanol was added to the concentrate to precipitate solids, which were recovered by filtration and dried. To methanol was added 100 g of the solids and then 10 ml of a 1N sodium hydroxide solution was added dropwise to the mixture with stirring under vacuum followed by stirring for 10 minutes. Then, 10 ml of 2N hydrochloric acid was added to the mixture and the solids thus precipitated were recovered by filtration and dried to obtain 6.7 g of the compound of formula D-21.

(b) Synthesis of the Compound of Formula P-24:

In 100 ml of N,N-dimethylformamide were dissolved 6.7 g of the compound of the formula D-21 prepared by the process of Step (a) above, 8.8 g of dichromium acetate hexahydrate, and 7.7 g of acetylacetone and the solution was refluxed for 30 minutes in a nitrogen atmosphere. The reaction mixture was cooled to room temperature and then 600 ml of diluted hydrochloric acid (about 5 wt%) was added to the reaction mixture. The solids thus precipitated were recovered by filtration, dissolved in 200 ml of ethyl acetate, and silica gel powder was added to the solution followed by stirring. After filtering the mixture, the filtrate was concentrated and added to n-hexane to form solids, which were recovered by filtration and dried to obtain 2.8 g of the compound of formula P-24. The compound exhibited visible absorptions at 533 nm ($\epsilon = 1.42 \times 10^4$) and at 571 nm ($\epsilon = 1.51 \times 10^4$) as $\lambda_{max}$.

SYNTHESIS EXAMPLE 15

Synthesis of Compounds of Formulae P-25 and P-26

(a) Synthesis of Metal Chelate Dye:

In 20 ml of N,N-dimethylformamide were dissolved 5.4 g of the compound represented by the following formula prepared in the same manner as in Synthesis Example 10.

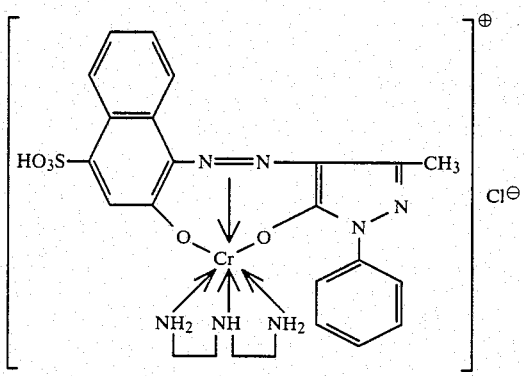

and 3.5 g of acetylcyclohexanone and the solution was refluxed for 2 hours. The reaction mixture obtained was cooled to room temperature and then poured into a mixture of 100 g of crushed ice and 10 ml of hydrochloric acid (35 wt%) with stirring. The solids thus precipitated were recovered by filtration and dried to obtain 2.6 g of the metal chelate dye having the following formula;

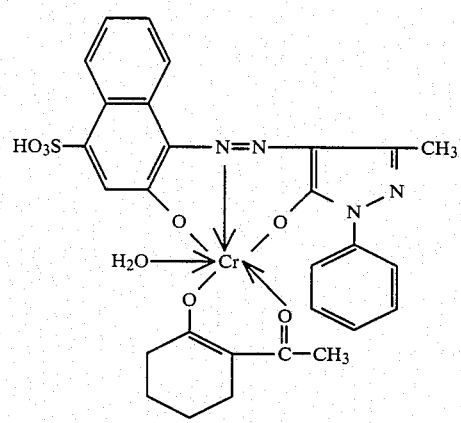

The compound exhibited visible absorptions at 526 nm ($\epsilon = 1.60 \times 10^4$) and at 558 nm ($\epsilon = 1.74 \times 10^4$) as $\lambda_{max}$ in methanol containing about 10% by weight dimethylformamide. Also, the melting point of the compound was higher than 300° C.

(b) Synthesis of the Compounds of Formulae P-25 and P-26:

In a mixture of 10 ml of chlorosulfonic acid and 5 ml of thionyl chloride was dissolved 1.9 g of the compound prepared in Step (a) above and the solution was stirred for one hour at 60° C. The reaction mixture was cooled, added dropwise to 200 g of crushed ice with stirring, and the solids thus formed were recovered by filtration. Then, the solids thus recovered and 1.5 g of 1-hydroxy-4-amino-N-[γ-2,4-di-t-amylphenoxy)-propyl]-2-naphthamide (acetate) were dissolved in 20 ml of tetrahydrofuran. After adding 1 ml of pyridine to the solution, the mixture was stirred for 5 hours at room temperature. The mixture was added to 100 ml of diluted hydrochloric acid (about 5 wt%) and the solids formed were recovered by filtration. The solids were dissolved in 50 ml of ethyl acetate and 20 g of silica gel powder was added to the solution followed by stirring. After removing the silica gel by filtration, the ethyl acetate filtrate was concentrated and added dropwise to 100 ml of n-hexane. The solids thus precipitated were recovered by filtration and dried to obtain 0.5 g of the compound of the formula P-25. The compound exhibited visible absorptions at 532 nm ($\epsilon = 1.34 \times 10^4$) and at 565 nm ($\epsilon = 1.32 \times 10^4$) as $\lambda_{max}$.

On the other hand, the compound of formula P-26 adsorbed on the silica gel was eluted as follows: That is, the silica gel having the compound absorbed thereon was recovered and added to 100 ml of methanol followed by stirring. Then, the methanol layer thus formed was recovered by filtration, concentrated, and cooled (about 0° C.). The solids thus precipitated were recovered by filtration and dried to obtain 1 g of the compound of the formula P-26. This compound exhibited visible absorption spectra at 532 nm ($\epsilon = 1.11 \times 10^4$) and at 565 nm ($\epsilon = 1.07 \times 10^4$) as $\lambda_{max}$.

In the reproduction of natural color by substractive color photography, a color photographic element comprising at least two combinations each of a silver halide emulsion having a selective spectral sensitivity at a certain wavelength region and a compound capable of providing a dye having a selective spectral absorption at the same wavelength region as above is used. In particular, a color photographic element comprising a support having coated thereon a combination of a blue sensitive silver halide emulsion and a compound capable of providing a yellow dye, a combination of a green-sensitive silver halide emulsion and a compound capable of providing a magenta dye, and a combination of a red-sensitive silver halide emulsion and a compound capable of providing a cyan dye. As a matter of course, the diffusible dye releasing coupler or the dye releasing redox compound of this invention can be used as the compounds capable of providing the above-described dyes. These combination units of the silver halide emulsions and the dye providing compounds may be coated on a support in layers in a face-to-face relationship or may be coated on a support as a layer as a mixture of particles thereof.

In a preferred multilayer structure, a support has, in succession thereon, a blue-sensitive silver halide emulsion layer, a green-sensitive silver halide emulsion layer, and a red-sensitive silver halide emulsion layer and in particular, it is desirable that a yellow filter layer is positioned between the blue-sensitive silver halide emulsion layer and the green-sensitive silver halide emulsion layer. The yellow filter layer contains usually a dispersion of yellow colloidal silver, a dispersion of an oil-soluble yellow dye, an acid dye mordanted onto a basic polymer, or a basic dye dyed onto an acid polymer. It is advantageous for the silver halide emulsion layers to be separated from each other by an interlayer. The interlayer acts to prevent the occurence of undesirable interactions between the differently color sensitized silver halide emulsion layers. The interlayer employed in such a case is usually composed of a hydrophilic polymer such as gelatin, polyacrylamide, a partially hydrolyzed product of polyvinyl acetate, etc., a polymer containing fine pores formed from a hydrophilic polymer and a hydrophobic polymer as described in U.S. Pat. No. 3,625,685, or a polymer whose hydrophilic property is gradually increased by the liquid processing composition, such as calcium alginate.

Generally speaking, except where noted otherwise, the silver halide emulsion layers employed in the process of this invention comprise photosensitive silver halide dispersed in gelatin and have a thickness of about 0.5 to about 20μ, preferably 0.6 to 6μ, the dye image providing materials are dispersed in an aqueous alkaline solution-permeable polymeric binder, such as gelatin, as a separate layer of a thickness of about 0.5 to about 20μ, preferably 1 to 7μ, and alkaline solution-permeable polymeric interlayers, e.g., gelatin, have a thickness of about 0.5 to about 20μ, preferably 1 to 5μ. Of course, these thickness are exemplary only and can be modified depending on the product desired.

The silver halide emulsion which can be used in this invention is a dispersion in a hydrophilic colloid of silver chloride, silver bromide, silver chlorobromide, silver iodobromide, silver chloroiodo-bromide or a mixture thereof. The halogen composition is selected depending on the purpose of using the color photographic materials and the processing conditions for the color photographic materials, but a silver iodobromide emulsion or a silver chloroiodobromide emulsion having a halogen composition of about 1 to 10 mole percent iodide, less than about 30 mole percent chloride, and the rest bromide is particularly preferred. The grain size of the silver halide used may be conventional or a fine grain but silver halide having a mean grain size of from about 0.1 micron to about 2 microns is preferred. Furthermore, depending to the specific purpose of using the color photographic materials, it is sometimes desirable to use a silver halide having a uniform grain size. The silver halide used in this invention may have a form of a cubic system, an octahedral system, or mixed system thereof. These silver halide emulsions may be prepared using conventional methods as described in, for example, P. Glafkides; *Chimie Photographique*, Chapters 18–23, 2nd Edition, Paul Montel, Paris, (1957).

It is desirable for the silver halide emulsion used in this invention to be chemically sensitized using the natural sensitizers contained in gelatin; a sulfur sensitizer such as sodium thiosulfate and N,N,N'-triethylthiourea; a gold sensitizer such as a thiocyanate complex salt of monovalent gold and a thiosulfate complex of monovalent gold; or a combination of the use of a reduction sensitizer such as stannous chloride and hexamethylene tetramine and heat treatment. Moreover, in this invention, not only a silver halide emulsion which tends to form a latent image on the surfaces of the grains thereof or a silver halide emulsion which forms a latent image in the grains as described in U.S. Pat. Nos. 2,592,550 and 3,206,313 but also a direct reversal type silver halide emulsion can be used in this invention. A suitable coating amount of the emulsion ranges from about 0.1 g/m² to 10 g/m³, preferably 0.3 g/m² to 4 g/m² (as silver per m² of the support). A suitable amount of the dye-releasing compound of this invention can range from about 0.01 to about 10 mols, preferably 0.05 to 0.5 mol per mol of the silver halide.

The silver halide emulsion used in this invention may be stabilized using conventional stabilizers. Furthermore, the silver halide emulsion may contain a sensitizing compound such as a polyethylene oxide compound.

The silver halide emulsion used in this invention may further be spectrally sensitized, if necessary. Examples of useful spectral sensitizers are cyanines, merocyanines, holopolarcyanines, styryls, hemicyanines, oxanoles, hemioxanoles, etc. Specific examples of suitable spectral sensitizers which can be used in this invention are described in, for example, P. Glafkides; *Chimie Photographique*, supra Chapters 35–41, 2nd Edition and F. M. Hamer; *The Cyanine Dyes and Related Compounds* published by Interscience. A particularly useful spectral sensitizer is a cyanine of which the nitrogen atom of the basic heterocyclic nucleus has been substituted with an aliphatic group (e.g., an alkyl group) having a hydroxy group, a carboxy group, or a sulfo group as described in, for example, U.S. Pat. Nos. 2,503,776; 3,459,553; and 3,177,210.

The dye releasing coupler or the dye releasing redox compound used in this invention can be dispersed in a hydrophilic colloid using various techniques according to the type of dye releasing compound. For example, when the dye releasing compound has a dissociable group such as a sulfo group and a carboxy group, the compound can be added to an aqueous solution of a hydrophilic colloid as a solution in water or an aqueous alkaline solution. On the other hand, when the dye releasing coupler or the dye releasing redox compound is sparingly soluble in aqueous medium but is readily soluble in organic solvents, the dye releasing compound is first dissolved in an organic solvent and then the solution is finely dispersed in an aqueous solution of a hydrophilic colloid with stirring. Such a dispersing method is described in detail in, for example, U.S. Pat. Nos. 2,322,027; 2,801,171; 2,949,360; and 3,396,027.

It is advantageous for stabilizing the dispersion of the dye releasing coupler or the dye releasing redox compound and also for promoting the dye image formation to incorporate the dye releasing coupler or the dye releasing redox compound in an aqueous hydrophilic colloid solution as a solution in a solvent which is substantially insoluble in water and has a boiling point of higher than about 200° C. at normal pressure. Examples of suitable high boiling solvents which can be used for this purpose are aliphatic esters such as the triglycerides of higher fatty acids, the di-octyladipates of higher fatty acids, etc.; phthalic acid esters such as di-n-butyl phthalate, etc.; phosphoric acid esters such as tri-o-cresyl phosphate, tri-n-hexyl phosphate, etc.; amides such as N,N-diethyllaurylamide, etc.; and hydroxy compounds such as 2,4-n-amylphenol. Furthermore, it is also advantageous for stabilizing the dye releasing coupler or the dye releasing redox compound and for promoting the dye image formation to incorporate an oleophilic polymer in the photosensitive layer together with the dye releasing coupler or the dye releasing redox compound. Examples of suitable oleophilic polymers which can be used for this purpose are shellac, a phenol-formaldehyde condensate, poly-n-butyl acrylate, a copolymer of n-butyl acrylate and acrylic acid, an interpolymer of n-butyl acrylate, styrene, and methacrylamide, etc.

Such an oleophilic polymer may be dissolved in an organic solvent together with the dye releasing coupler or the dye releasing redox compound and then may be dispersed in a hydrophilic collid as a solution thereof or may be added to a dispersion in a hydrophilic colloid of the dye releasing coupler or the dye releasing redox compound as the hydrosol of a polymer prepared by emulsion polymerization, etc.

The dispersion of the dye releasing coupler or the dye releasing redox compound can be effectively performed by applying a large shearing force to the system. For example, a high speed rotary mixer, a colloid mill, a high pressure milk homogenizer, the high pressure homogenizer as disclosed in British Pat. No. 1,304,264, a ultrasonic emulsifier, etc., can be used suitably for this purpose.

The dispersion of the dye releasing coupler or the dye releasing redox compound can be greatly promoted by using a surface active agent as an emulsification aid. Examples of suitable surface active agents useful for the dispersion of the dye releasing coupler or the dye releasing redox compound used in this invention are sodium triisopropylnaphthalenesulfonate, sodium dinonylnaphthalenesulfonate, sodium p-dodecylbenzenesulfonate, sodium dioctylsulfosuccinate, sodium cetylsulfate, and the anionic surface active agents as described in Japanese Patent Publication No. 4,295/'64 and British Pat. No. 1,138,514. The use of these anionic surface active agents and the higher fatty acid ester of anhydrohexitol exhibits particularly excellent emulsifying capability as disclosed in U.S. Pat. No. 3,676,141. Furthermore, the dispersing methods disclosed in Japanese Patent Publication No. 13,837/'68 and U.S. Pat. Nos. 2,992,104; 3,044,873; 3,061,428; and 3,832,173 can be effectively employed for dispersing the dye releasing compounds used in this invention.

The photosensitive element used in this invention is prepared by forming a photosensitive layer or layers on a substantially planar material which does not undergo large dimensional changes. Examples of suitable supports are cellulose acetate films, polystyrene films, polyethylene terephthalate films, polycarbonate films, etc., which are used as supports for conventional photographic materials. Other examples of effective supports are papers and papers coated with a water impermeable polymer such as polyethylene.

As an example of a method of forming diffusion transfer color photographic images by using dye releasing redox compounds, the methods described in Japanese Patent Application (OPI) No. 114,424/'74, Belgian Patent No. 788,268 and Japanese Patent Publication No. 33,826/'73 can be employed. These image forming methods can be effectively used in using the dye releasing redox compounds having the formula (VIa) or (VIb).

When the dye releasing redox compounds of the formula (VIa) or (VIb) are subject to cross oxidation, any silver halide developing agents can be used in the above-described methods. These developing agents may be incorporated in an alkaline processing composition or may be incorporated in appropriate photographic layers of color photographic element. Specific examples of developing agents which can be used in this invention are, for example, hydroquinone and aminophenols such as N-methylaminophenol, 1-phenyl-3-pyrazolidone, 1-phenyl-4-methyl-4-oxymethyl-3-pyrazolidone, N,N-diethyl-p-phenylenediamine, 3-methyl-N,N-diethyl-p-phenylenediamine, 3-methoxy-N-ethoxy-p-phenylenediamine, etc.

Of the above-indicated developing agents, black and white developing agents having the capability in generally reducing the occurence of stains in image-receiving layers are particularly preferred.

When the dye releasing redox compounds of this invention represented formula (VIa) or (VIb) are used, the transferred image formed in the image-receiving layer is a negative image and the image remaining in the photosensitive layer or element is a positive image where a so-called ordinary nega-posi type silver halide emulsion, is used. On the other hand, when a so-called direct positive silver halide emulsion of the type where the unexposed portions or areas are developed (for example, an internal latent image forming type silver halide emulsion or a solarization type silver halide emulsion) is employed as the silver halide emulsion in the above-described case, the transferred image formed in the image-receiving layer of a photographic film unit is a positive image.

Solarization type silver halide emulsions as described in C. E. K. Mees, *The Theory of the Photographic Process*, pages 261–297, Macmillan Co., New York (1942) can be used in this invention. These solarization type silver halide emulsions may be prepared using methods described in, for example, British Pat. Nos. 443,245 and 462,730 and U.S. Pat. Nos. 2,005,837; 2,541,472; 3,367,778; 3,501,305; 3,501,306; and 3,501,307.

Also, the internal latent image forming type direct positive silver halide emulsions described in, for example, U.S. Pat. No. 2,592,250, can be advantageously used in this invention. Typical examples of fogging agents which can be used for preparing this type of direct positive silver halide emulsions are the hydrazines described in U.S. Pat. Nos. 2,588,982 and 2,563,785, the hydrazide and hydrazone described in U.S. Pat. No. 3,227,552, and the quaternary salt compounds described in British Pat. No. 1,283,835; Japanese Patent Publication No. 38,164/'74, and U.S. Pat. Nos. 3,734,738; 3,719,494 and 3,615,615.

Furthermore, the diffusion inhibitor releasing (DIR) reversal silver halide emulsion system as described in U.S. Pat. Nos. 3,227,551; 3,227,554; and 3,364,022 or the reversal silver halide system by a dissolution physical development as described in British Pat. No. 904,364 can be employed in the case of using the dye releasing redox compounds of this invention.

U.S. Pat. Nos. 3,227,550 and 3,227,552 and British Pat. No. 1,330,524, describes a series of processes of obtaining diffusion transfer color photographic images using dye releasing couplers and these processes can be also employed in this invention in the case of using the dye releasing couplers represented by the formula (VIc).

In another specific embodiment of this invention wherein the dye releasing couplers of the formula (VIc) capable of forming diffusible metal chelate dyes are employed, these dye releasing couplers are used in combination with the development inhibitor releasing couplers (DIR couplers) as described in U.S. Pat. Nos. 3,227,551; 3,227,554; and 3,364,022 and British Pat. Nos. 932,272 and 1,014,725. In still another embodiment of this invention, the DIR hydroquinones described in British Pat. No. 1,066,352 and U.S. Pat. Nos. 3,297,991 and 3,379,529 can be used in place of the above-described DIR couplers. The reversal silver halide emulsion system using a dissolution physical development as described in British Pat. No. 904,364 can be also employed in the combination with the dye releasing couplers of this invention.

Typical examples of color developing agents which can be used in the above-described specific embodiments using the dye releasing couplers of this invention are the p-phenylenediamine derivatives described in U.S. Pat. Nos. 3,227,552; 2,559,643; and 3,813,244. Furthermore, the p-aminophenol derivatives as described in Japanese Patent Application (OPI) No. 26,134/'73 can be also used advantageously in this invention. It is preferred for such a color developing agent to be incorporated in a liquid alkaline developing composition retained in a rupturable container. The color developing agent may be incorporated in an additional layer formed in the negative image portion of the film unit or may be incorporated in the silver halide emulsion layers of the film unit.

On the other hand, a nondiffusible color developing agent as described in British Pat. No. 1,309,133 and U.S. Defensive Patent Publication No. T900,029 can be used in place of the above-described color developing agent. In this case, it is preferred to use a process wherein a black and white developing agent such as a 3-pyrazolone derivative, N-methylaminophenol, a hydroquinone derivative, a catechol derivative, etc., is used as an auxiliary developing agent and the above-described nondiffusible color developing agent is subject to a cross oxidation by the oxidation product of the auxiliary developing agent formed at development. That is, the oxidation product of the nondiffusible color developing agent thus formed reacts with the dye releasing coupler of the formula (VIc) to release a diffusible dye.

It is necessary for the image-receiving element of the film unit used in this invention to have a dyeable or mordanting layer comprising a mordant such as the poly-4-vinylpyridine latex (in, in particular, polyvinyl alcohol) described in U.S. Pat. No. 3,148,061, the polyvinyl pyrrolidone described in U.S. Pat. No. 3,003,872; and the polymers containing quaternary ammonium salts as described in U.S. Pat. No. 3,239,337. Also, the basic polymers as described in U.S. Pat. Nos. 2,882,156; 3,625,694; and 3,709,690 can be effectively used as the mordant for the image-receiving layer. Other examples of mordants which can be effectively used in this invention are described in U.S. Pat. Nos. 2,484,430; 3,271,417; 3,184,309; etc.

It is preferred for the image-receiving element used in this invention to be capable neutralizing the alkali carried in from the alkaline processing composition. It is advantageous for this purpose to form in the film unit a neutralizing layer containing an acid material in an amount sufficient for neutralizing the alkali in the liquid processing composition, that is, containing an acid material at an area concentration of higher than the equivalent of the alkali in the spread liquid processing composition. Typical examples of preferred acid materials which can be used for the purpose are those described in U.S. Pat. Nos. 2,983,606; 2,584,030; and 3,362,819. The neutralizing layer may further contain a polymer such as cellulose nitrate, polyvinyl acetate, etc., and also the plasticizers as described in U.S. Pat. No. 3,557,237 in addition to the acid material. The acid material may be incorporated in the film unit in a microencapsulated form as described in German Patent Application (OLS) No. 2,038,254.

It is desirable for the neutralizing layer or the acid material-containing layer which can be used in this invention to be isolated from the spread layer of the liquid processing composition by a neutralization rate controlling layer (or spacer layer). As the neutralization rate controlling layer, gelatin, polyvinyl alcohol, or the compounds described in U.S. Pat. No. 3,455,686 can be effectively used. The neutralization rate controlling layer acts to retard the reduction in the pH of the liquid processing composition by the neutralizing layer so that the desired development and transfer of dyes can be sufficiently accomplished.

In a preferred embodiment of this invention, the image-receiving element has a multilayer structure comprising a support, a neutralizing layer, a neutralization rate controlling layer, and a mordanting layer (or image-receiving layer), or alternatively a top sheet with which the light-sensitive element is covered contains a sheet (support) having thereon a neutralizing layer and a neutralization rate controlling layer in this order. The image-receiving elements used in combination with the dye releasing redox compounds of this invention and couplers are described in detail in, for example, Japanese Patent Application (OPI) No. 13,285/'72, U.S. Pat. No. 3,295,970; and British Pat. No. 1,187,502.

The processing composition used in this invention is a liquid composition containing the processing components necessary for developing silver halide emulsions and forming diffusion transfer dye images. The solvent of the processing composition is mainly water and contains, as the case may be, a hydrophilic solvent such as methanol, methyl Cellosolve, etc. The liquid processing composition contains an alkali in an amount sufficient to maintain the necessary pH on developing the silver halide emulsion layers and for neutralizing acids (e.g., a hydrohalic acid such as hydrobromic acid, etc., and a carboxylic acid such as acetic acid, etc.,) formed during the development and the dye image formation. Examples of suitable alkalis are alkali metal hydroxides, alkaline earth metal hydroxides or amines, such as lithium hydroxide, sodium hydroxide, potassium hydroxide, an aqueous dispersion of calcium hydroxide, tetramethylammonium hydroxide, sodium carbonate, trisodium phosphate, diethylamine, etc. It is desirable for the liquid processing composition to contain an alkaline material in a concentration such that the pH thereof can be maintained at above about 12, in particular above 14 at room temperature. Further preferably, the liquid processing composition contains a hydrophilic polymer such as high molecular weight polyvinyl alcohol, hydroxyethyl cellulose, sodium carboxymethyl cellulose, etc. These polymers contribute toward increasing the viscosity of the liquid processing composition above about 1 poise, preferably to 500 to 1,000 poises, at room temperature, which facilitates the uniform spreading of the processing composition at development as well as the formation of a non-fluid film when the aqueous medium diffuses into the photosensitive element and the image-receiving element in processing to concentrate the processing composition, which results in assisting the unification of the film unit after processing. The polymer film also contributes toward preventing coloring components from transferring into the image-receiving layer to stain the dye images formed after the formation of the diffusion transfer dye images is substantially completed.

As the case may be, it is advantageous for the liquid processing composition to further contain a light absorbing material such as $TiO_2$, carbon black, a pH indicating dye, etc., or the densitizer as described in U.S. Pat. No. 3,579,333 for preventing the silver halide emulsion layers from being fogged by external light during processing. Furthermore, the liquid processing composition used in this invention may contain a development inhibitor such as benzotriazole.

It is preferred for the above described processing composition to be retained in a rupturable container as described in U.S. Pat. Nos. 2,543,181; 2,643,886; 2,653,732; 2,723,051; 3,056,491; 3,056,492; 3,152,515; etc. The rupturable container is desirably fixedly positioned to extend transverse a leading edge of the film unit to effect a substantial unidirectional discharge of the content of the container onto the surface of the light-sensitive element.

The photographic film unit used in this invention, that is, the film unit having a construction such that the processing of the film unit is performed by passing it through a pair of juxtaposed pressure-applying members is composed of (1) the photosensitive element as described above, (2) the image-receiving element as described above, and (3) the rupturable container capable of releasing the liquid alkaline processing composition in the film unit and containing a silver halide developing agent.

The photosensitive element of the above-described film unit is, in one embodiment of this invention, imagewise exposed, then superimposed on the image-receiving element in a face-to-face relationship, and processed by spreading generally a liquid alkaline processing composition between both elements. According to another embodiment of this type, the film unit is, for example, an assembly which contains a transparent or opaque support having thereon a neutralizing layer, a neutralization rate controlling layer, a mordanting layer capable of receiving the diffusible metal complex, at least one photosensitive silver halide emulsion layer having associated therewith the redox compound or coupler of this invention and an opaque or transparent support and, if desired, a light-reflecting layer (e.g., a $TiO_2$-containing layer) between the mordanting layer and the photosensitive layer; the processing composition, which may contain a light-reflecting agent (e.g., $TiO_2$, etc.) and/or a light-absorbant (e.g., carbon black, etc.) when the support for the receiving element is transparent, being capable of being spread between the mordanting layer and the photosensitive emulsion layer. In this case the image-receiving element may be stripped off after the transfer of the dye images has been completed or the dye images formed in the image-receiving layer may be observed without stripping the image-receiving element as described in U.S. Pat. No. 3,415,645.

In another embodiment of this invention, the image-receiving layer in the film unit is deposed in a unit with a support and photosensitive silver halide emulsion layers. For example, a suitable photographic film unit is prepared by coating on a transparent support an image-receiving layer, a substantially opaque light reflecting layer which may be covered with a light-intercepting layer containing a light-absorbant (e.g., carbon black, etc.), and a photosensitive element comprising a single silver halide emulsion layer or plurality of silver halide emulsion layers. After exposing the photosensitive element, it is superimposed on an opaque process sheet in a face-to-face relationship and then a liquid alkaline processing composition is spread between them.

Another embodiment of the unified type of film unit is disclosed in Belgian Pat. No. 757,959. According to this embodiment, the film unit is prepared by coating on a transparent support an image-receiving layer, a substantially opaque light reflective layer (as described above), and a photosensitive element comprising a single silver halide emulsion layer or a plurality of silver halide emulsion layers and further superimposing a transparent top sheet on the photosensitive layer in a face-to-face relationship. A rupturable container containing an alkaline processing composition having incorporated therein a light-intercepting agent such as, for example, carbon black, is disposed adjacent to and between the uppermost layer of the above-described photosensitive element and the transparent top sheet. The film unit is imagewise exposed in a camera through the transparent top sheet and then the rupturable container retaining the alkaline processing composition is ruptured by means of the pressure-applying members when the film unit is withdrawn from the camera to spread uniformly the processing composition containing the opacifying agent between the photosensitive layer and the top sheet, whereby the film unit is shielded from light and the development proceeds.

Moreover, other useful embodiments of the unified type of film units wherein the dye releasing couplers or the dye releasing redox compounds of this invention can be used are described in, for example, U.S. Pat. Nos. 3,415,644; 3,415,645; 3,415,646; 3,647,487; and 3,635,707 and German Patent Application (OLS) No. 2,426,980.

The following examples are given to further illustrate this invention in greater detail.

EXAMPLE 1

The following elements were prepared;

Photosensitive Element

In a mixture of 14 ml of N,N-diethyllaurylamide and 35 ml of cyclohexanone was dissolved 7.8 g of the dye releasing redox compound (of the formula P-5 described above) capable of releasing the magenta metal chelate dye and after dispersing by emulsification the solution in 100 g of an aqueous solution of 10% by weight gelatin (containing 0.5 g of sodium dodecylbenzenesulfonate as an emulsifying agent and 0.2 g of sodium hydrogensulfite as an antioxidant), 70 ml of water cooled to about 5° C. was added to the emulsion. The emulsion was then solidied by cooling and preserved. All of the emulsion thus prepared was mixed with 120 g of a silver iodobromide emulsion (containing 0.6 mole/kg of silver and 5 mole percent iodide) and after adding thereto 0.4 g of 2-hydroxy-4,6-dichloro-s-triazine sodium as a hardening agent, the mixture was coated on a cellulose triacetate support having a gelatin subbing layer at a silver coverage of 120 $g/cm^2$. Then, a gelatin layer was coated on the emulsion layer at a dry thickness of about 1 micron to produce the photosensitive element.

Image-Receiving Element

An aqueous solution of 5% by weight gelatin containing 5% by weight of the following polymer as a mordant was coated on a baryta-coated paper at a dry thickness of about 6 microns (the solution contained 2-hydroxy-4,6-dichloro-s-triazine sodium as a hardening agent in an amount of 1% by weight of the gelatin).

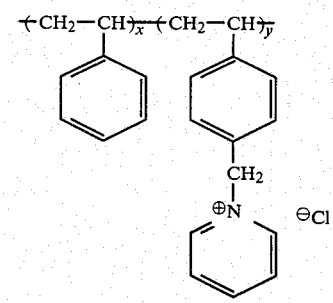

Liquid Processing Composition

A liquid processing composition having the following composition was prepared:
Water: 970 ml
Sodium Hydroxide: 30 g
Hydroxyethyl Cellulose: 50 g
Sodium Hydrogen Sulfite: 0.4 g
5-Methylbenzotriazole: 0.4 g 1-Phenyl-3-pyrazolidone: 1 g The above described photosensitive element was exposed to white light through a step wedge, superposed on the above-prepared image-receiving element, the above-described liquid processing composition was spread between both elements uniformly at a coverage of 1.8 ml/100 cm$^2$, and then the photosensitive element was stripped off after 10 minutes, whereby a good magenta negative transferred image was obtained in the image-receiving element.

Then, the image-receiving element having the magenta dye image was immersed in a buffer solution containing phosphoric acid, glacial acetic acid, boric acid, and sodium hydroxide having a pH of 4, 7, or 11 for 5 minutes and then the spectral absorption of the magenta dye image was measured. The results showed that the hue of the transferred magenta dye image was observed to be the same in each pH.

Furthermore, when an image-receiving element having the transferred magenta dye image was exposed for 100 hours at 30,000 lux using a fluorescent lamp fading test machine, fading was scarecely observed.

When the above procedure was followed using other dye releasing compounds of this invention i.e., of the formula P-1, -2, -3, -6, -7, -23 to -27, -34 and -39 in the place of the dye releasing compound of the formula P-5, substantially similar good results were obtained. Of these compounds, most excellent results were obtained with dye releasing compound of the formula P-5, -6, -21, -23, -27, -34 and -39.

EXAMPLE 2

A mixture of a copolymer of styrene and N-benzyl-N,N-dimethyl-N-(3-maleimidopropyl)ammonium chloride and gelatin was coated on a transparent cellulose triacetate support as an image-receiving layer, a gelatin solution having titanium white dispersed therein was coated on the image-receiving layer as a reflective layer, and then a gelatin layer containing carbon black was formed on the reflective layer as a shielding layer.

Furthermore, a gelatin solution containing the dye releasing redox compound of this invention represented by the formula P-33 was coated on the shielding layer at a coverage of the dye releasing redox compound of 1.2 g/m$^2$ and gelatin of 1.6 g/m$^2$ and further a green-sensitive silver chloroiodobromide emulsion containing formyl-4-methylphenylhydrazine was coated thereon at the following coverages: Ag of 1.8 g/m$^2$, gelatin of 1.00 g/m$^2$, and formyl-4-methylphenylhydrazine of 0.03 g/m$^2$. Thereafter, a gelatin layer was formed thereon as a protective layer to provide a photographic material.

The silver halide emulsion used in this example was the direct reversal silver halide emulsion prepared according to the method described in Belgian Pat. No. 792,264.

Then, a cover sheet was prepared by coating on a transparent cellulose triacetate support polyacrylic acid at a coverage of 18 g/m$^2$ and further a mixture of cellulose acetate and a styrene-maleic acid anhydride copolymer at a coverage of 3.3 g/m$^2$.

The cover sheet was superposed on the above-described photographic material and after imagewise exposing the photographic material in a camera, the assembly was withdrawn from the camera through a pair of rollers equipped in the camera, whereby the following liquid processing composition was spread between the cover sheet and the photosensitive element.

Liquid Processing Composition

Sodium Hydroxide: 20.0 g
4-Hydroxymethyl-4-methyl-1-phenyl-3-pyrazolineidone: 5.0 g
5-Methylbenzotriazole: 2.0 g
(t)-Butylhydroquinone: 0.4 g
Hydroxyethyl Cellulose: 50.0 g
1N H$_2$SO$_4$ Aqueous Solution: 5 ml
Carbon Black: 145 g
Water: 800 ml After 3 minutes, a transferred positive magenta dye image having an excellent hue was observed through the transparent support of the photographic material. When the magenta dye image was allowed to stand for 30 minutes, the magenta dye image scarecely showed any fading.

When the above procedure was followed using other dye releasing compounds of this invention in place of the dye image releasing compound of the formula P-33, substantially same results were obtained.

Also, when the same procedures as in Examples 1 and 2 using multilayer photosensitive layers, that is, using further a blue-sensitive silver halide emulsion layer and a green-sensitive silver halide emulsion layer each in combination with the dye releasing compound of this invention, similar good results were obtained.

While the invention has been described in detail and with reference to specific embodiments thereof, it will be apparent to one skilled in the art that various changes and modifications can be made therein without departing from the spirit and scope thereof.

What is claimed is:

1. A color photographic material for the diffusion transfer process comprising a support having thereon at least one photosensitive silver halide emulsion layer having associated therewith a redox compound of high solubility in organic solvents which is dispersed in a hydrophilic colloid using ethyl acetate, cyclohexanone, 2-methoxy methanol or acetone, and a solvent which is substantially insoluble in water and has a boiling point of higher than about 200° C. at normal pressure, the solvent which is substantially insoluble in water and having a boiling point of higher than about 200° C. at normal pressure remaining in the color photographic material, said redox compound releasing a diffusible metal complex having coordinated therewith a dye or a precursor thereof and a cyclic or chain multidenate ligand by reaction with the oxidation product of a developing agent, wherein the redox compound is a dye releasing compound having formula (VIIIa)

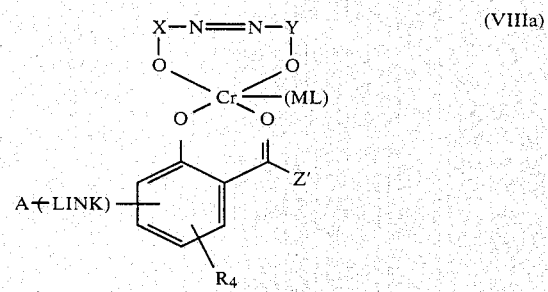

wherein A represents a redox compound represented by formula (VIIa) or (VIIb)

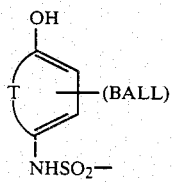

(VIIa)

wherein T represents the atoms necessary to complete a benzene nucleus or a naphthalene nucleus; when T represents the atoms necessary to complete the naphthalene nucleus (BALL) may be connected to either of the rings of the naphthalene nucleus; and (BALL) represents a photographically inert ballast group which renders the compound non-diffusible;

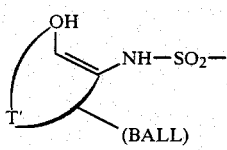

(VIIb)

wherein T' has the same meaning as T in formula (VIIa) and (BALL) is as described above;
X represents an arylene group; Y represents an arylene group for a 5-membered or 6-membered nitrogen-containing heterocyclic ring; (ML) represents a monodentate ligand having a nitrogen atom or an oxygen atom as a coordination atom; (LINK) represents a divalent linking group; $R_4$ represents a lower alkyl group, a lower alkoxy group, a halogen atom or a hydrogen atom; and Z' represents a hydroxy group.

2. The color photographic material as set forth in claim 1, wherein (BALL) is selected from the group consisting of an alkyl group having 8 to 30 carbon atoms, an alkoxy group having 8 to 30 carbon atoms, an amido group having 8 to 30 carbon atoms, an alkylcarbonyl or arylcarbonyl group having 8 to 30 carbon atoms.

3. The color photographic material as set forth in claim 1, wherein (ML) is selected from the group consisting of $H_2O$ and an amine.

4. The color photographic material as set forth in claim 3, wherein said amine is pyridine, triethylamine or $NH_3$.

5. The color photographic material as set forth in claim 1, wherein X is phenylene or naphthalene.

6. The color photographic material as set forth in claim 1, wherein Y is phenylene, naphthalene or an unsaturated heterocyclic group containing 2 nitrogen atoms.

7. A color diffusion transfer film unit which contains a light-sensitive element comprising at least one photosensitive silver halide emulsion layer having associated therewith a redox compound as in claim 1, said redox compound releasing a diffusible metal complex having coordinated therewith a dye or a precursor thereof and a cyclic or straight or branched chain multidentate ligand by reaction with the oxidation product of a developing agent; an image-receiving element capable of fixing the diffusible metal complex and, a processing composition capable of developing said light-sensitive element after exposure.

8. The film unit as set forth in claim 7, wherein the unit is an assembly comprising a transparent support having thereon a mordanting layer capable of receiving the diffusible metal complex, a substantially opaque light-reflecting layer which may be covered with a light-intercepting layer containing a light-absorbant, at least one photosensitive silver halide emulsion layer having associated therewith the redox compound, a neutralization rate controlling layer, a neutralizing layer, and a transparent top sheet; and with the processing composition containing a light-absorbant and being capable of being spread between the neutralization rate controlling layer and the surface of the uppermost layer of the photosensitive emulsion layers following imagewise exposure.

9. The film unit as set forth in claim 8, wherein the unit is an assembly comprising a transparent or opaque support having thereon a neutralizing layer, a neutralization rate controlling layer, a mordanting layer capable of receiving the diffusible metal complex, at least one photosensitive silver halide emulsion layer and an opaque or transparent support and, optionally, a light-reflecting layer between the mordanting layer and the photosensitive emulsion layer; with the processing composition which may contain a light-reflecting agent and/or a light-absorbant when the support for the receiving element is transparent being capable of being spread between the mordanting layer and the photosensitive emulsion layer.

10. The film unit as set forth in claim 8, comprising another hydrophilic colloid layer or layers.

* * * * *